(12) United States Patent
Takao et al.

(10) Patent No.: US 7,443,130 B2
(45) Date of Patent: Oct. 28, 2008

(54) MOTOR DRIVING CONTROL DEVICE

(75) Inventors: Hiroshi Takao, Hirakata (JP); Yoshio Tomigashi, Hirakata (JP)

(73) Assignee: Sanyo Electric Co., Ltd., Moriguchi (JP)

( * ) Notice: Subject to any disclaimer, the term of this patent is extended or adjusted under 35 U.S.C. 154(b) by 141 days.

(21) Appl. No.: 11/633,416

(22) Filed: Dec. 5, 2006

(65) Prior Publication Data

US 2007/0132424 A1   Jun. 14, 2007

(30) Foreign Application Priority Data

Dec. 8, 2005 (JP) ............................. 2005-354506

(51) Int. Cl.
*H02P 27/00* (2006.01)
*H02P 6/08* (2006.01)

(52) U.S. Cl. .................. 318/806; 318/805; 318/720; 318/799; 700/298

(58) Field of Classification Search ............. 318/700, 318/701, 720, 721, 799, 805, 806; 700/298
See application file for complete search history.

(56) References Cited

U.S. PATENT DOCUMENTS 5,825,152 A * 10/1998 Eriksson ................ 318/700
5,959,430 A * 9/1999 Yuki et al. .............. 318/805
6,163,127 A * 12/2000 Patel et al. ............. 318/700
6,492,788 B1 * 12/2002 Agirman et al. ......... 318/700
6,501,243 B1 * 12/2002 Kaneko et al. .......... 318/700
6,703,809 B2 * 3/2004 Royak et al. ........... 318/727
6,831,440 B1 * 12/2004 Royak et al. ........... 318/727
6,861,813 B2 * 3/2005 Yoshimoto et al. ...... 318/432

FOREIGN PATENT DOCUMENTS

| JP | 07-177788 | 7/1995 |
| JP | 2003-189673 | 7/2003 |
| JP | 2003-219682 | 7/2003 |

* cited by examiner

*Primary Examiner*—Paul Ip
(74) *Attorney, Agent, or Firm*—NDQ&M Watchstone LLP; S. Peter Konzel

(57) ABSTRACT

In a motor driving control device, a high-frequency alternating voltage or rotation voltage (having a frequency of $\omega_h$) is applied to a motor so that magnetic saturation occurs in the motor, thereby extracting, from a γ-axis current, a high-frequency second-harmonic component (a frequency component of $2\times\omega_h$) that is obtained by attenuating at least a direct-current component of the γ-axis current. The polarity checker detects the polarity of the magnetic pole of the rotor based on the difference, caused by magnetic saturation, between the positive and negative amplitudes of the high-frequency second-harmonic component.

20 Claims, 28 Drawing Sheets

$\Delta\theta = 0°$ $\Delta\theta \neq 0°$

FUNDAMENTAL COMPONENT OF $v_\gamma^*$

SECOND-HARMONIC COMPONENT OF $v_\gamma^*$

FUNDAMENTAL COMPONENT OF $v_{2h\gamma}^*$

SECOND-HARMONIC COMPONENT OF $v_{2h\gamma}^*$

US 7,443,130 B2

MOTOR DRIVING CONTROL DEVICE

This application is based on Japanese Patent Application No. 2005-354506 filed on Dec. 8, 2005, the contents of which are hereby incorporated by reference.

BACKGROUND OF THE INVENTION

1. Field of the Invention

The present invention relates to a motor driving control device that controls the driving of a motor, and more particularly to a motor driving control device that drives and controls the motor without the use of a magnetic-pole position sensor.

2. Description of Related Art

There have conventionally been developed techniques for detecting the magnetic-pole position of a rotor of a motor without the use of a sensor. Some of such techniques propose to detect the polarity or the position of the magnetic pole of the rotor by exploiting injection of a high-frequency rotation voltage or a high-frequency rotation current.

With reference to FIGS. 41 and 42, a polarity checking technique for a permanent-magnet synchronous motor will be described. Checking of the polarity is performed by exploiting the fact that magnetic saturation of the stator core exhibits anisotropy depending on the rotor direction. FIG. 41 is a conceptual diagram of the magnetic flux when the magnetic flux of the stator and the magnetic flux (d axis) of the rotor are pointing in the same direction, and FIG. 42 is a conceptual diagram of the magnetic flux when the magnetic flux of the stator and the magnetic flux (d axis) of the rotor are facing away from each other.

When the magnetic flux (the magnetic flux of the stator) produced by the passage of a current through an armature winding provided in the stator is pointing in the same direction as the magnetic flux (the magnetic flux of the rotor) produced by the permanent magnet provided in the rotor, the sum of the magnetic flux becomes relatively large, whereby magnetic saturation easily occurs. On the other hand, when the magnetic flux of the stator and the magnetic flux of the rotor are not pointing in the same direction, the sum of the magnetic flux becomes relatively small, whereby magnetic saturation hardly occurs.

When magnetic saturation occurs, the inductance of the motor is decreased, and the current becomes relatively high. As a result, when a voltage with which magnetic saturation occurs is applied to the motor in such a way that the stator produces the magnetic flux in the direction of the d axis (see FIG. 41), the winding current becomes greater than when the voltage is applied in such a way that the stator produces the magnetic flux in the opposite direction (see FIG. 42). By exploiting such characteristics, the direction of the d axis, i.e. the polarity of the magnetic pole of the rotor can be checked by applying, in the respective positive and negative directions of the d axis, a voltage with which magnetic saturation occurs.

Generally, estimation of the magnetic-pole position is performed by estimating the inclination of the d axis. However, such an estimation technique cannot be applied to estimation of the direction of the d axis (i.e. it is impossible to estimate whether the direction of the d axis lies within the range from 0 to $\pi$ or within the range from $\pi$ to $2\pi$ in electrical angle). Thus, checking of the polarity is performed after estimation of the magnetic-pole position, thereby estimating the magnetic-pole position within the range from 0 to $2\pi$ as well as the direction of the d axis.

JP-B-3381408 (hereinafter refereed to as "Patent Document 1"), JP-A-2003-189673 (hereinafter referred to as "Patent Document 2"), JP-A-2003-219682 (hereinafter referred to as "Patent Document 3"), or the like disclose a technique according to which checking of the polarity is performed. With a configuration disclosed in Patent Document 1, a voltage with which a magnetic saturation current is generated is applied between predetermined phases once while the rotor is at standstill so as to perform checking of the polarity. With a configuration disclosed in Patent Document 2, an alternating voltage is applied only to the d axis ($\gamma$ axis), so that checking of the polarity is performed based on the d-axis ($\gamma$-axis) current locus. With a configuration disclosed in Patent Document 3, the voltage vector is made to rotate, so that checking of the polarity is performed based on the magnitude of the current vector of the current locus in the major-axis direction.

FIG. 43 shows a configuration block diagram of a typical conventional motor drive system, which is shared by the techniques disclosed in the Patent Documents described above. In FIG. 44, the waveform of the $\gamma$-axis current (the d axis current estimated for the purpose of control) $i_\gamma$ used for checking of the polarity is shown. The $\gamma$-axis current $i_\gamma$ is fed to a polarity checker 120 shown in FIG. 43, and a high-frequency voltage is applied to a motor. If the positive amplitude of the $\gamma$-axis current $i_\gamma$ is found to be larger than the negative amplitude thereof, the polarity checker 120 judges that the polarity is appropriate; if the positive amplitude of the $\gamma$-axis current $i_\gamma$ is found to be smaller than the negative amplitude thereof, the polarity checker 120 judges that the polarity is inverted. Then the estimated magnetic-pole position is corrected according to the judgment results.

However, in the conventional technique typified by the configuration shown in FIG. 43, as a result of checking of the polarity being performed by using the difference between the positive and negative amplitudes of the $\gamma$-axis current $i_\gamma$ including a direct-current component (and a low-frequency component that can be regarded as a direct-current component), the following problems arise. The influence of the offset of the current sensor is emphasized, and susceptibility to the influence of a drive current or an induction voltage (in other words, electromotive force) is increased when the motor is driven (rotated) or is running freely. In other words, these influences make it impossible to perform checking of the polarity correctly. In addition, to weaken these influences, it is necessary to pass a relatively high current. It should be noted that, since the frequency of the high-frequency voltages $v_{h\gamma}^*$ and $v_{h\delta}^*$ to be superposed for performing checking of the polarity are sufficiently higher than that of the drive current or the like, the frequency of the drive current or the induction voltage as obtained when the motor is driven (rotated) or is running freely can be regarded as being (substantially) a direct-current component with respect to the frequency of the high-frequency voltage used for performing checking of the polarity.

Likewise, also in a case where the magnetic-pole position is estimated by using the high-frequency rotation voltage or the like, development of the method that is less susceptible to the influences of the offset, drive current, and induction voltage described above is keenly sought after.

SUMMARY OF THE INVENTION

A first motor driving control device according to the present invention performs driving control of a motor, and, let an axis parallel to a magnetic flux produced by a permanent magnet forming a rotor of the motor be called a d axis, and let an axis estimated, for the purpose of control, to correspond to the d axis be called a $\gamma$ axis, then the first motor driving control device is provided with: a voltage feeder that applies an alternating voltage or a rotation voltage having a predetermined frequency to the motor as a detection voltage; an extractor that extracts, from a γ-axis component of a motor current that flows through the motor, a partly-extracted γ-axis current obtained by attenuating at least a direct-current component of the γ-axis component; and a detector that detects the polarity of the magnetic pole of the rotor by the use of the partly-extracted γ-axis current.

Specifically, for example, in the first motor driving control device, the detector detects the polarity based on the positive and negative amplitudes of the partly-extracted γ-axis current.

Such a first motor driving control device embodying the invention will be described later as a first embodiment.

For example, in the first motor driving control device, the detector detects the polarity based on a value obtained by multiplying the partly-extracted γ-axis current by a signal having a frequency twice the predetermined frequency.

Specifically, for example, in the first motor driving control device, the detector detects the polarity based on a γ-axis component of the detection voltage that is obtained when the detection voltage is controlled so that the difference between the positive and negative amplitudes of the partly-extracted γ-axis current is reduced close to zero.

Such a first motor driving control device embodying the invention will be described later as a third embodiment.

For example, in the first motor driving control device, the detector detects the polarity based on the positive and negative amplitudes of the γ-axis component of the detection voltage.

For example, in the first motor driving control device, the detector detects the polarity based on a value obtained by multiplying the γ-axis component of the detection voltage by a signal having a frequency twice the predetermined frequency.

A second motor driving control device according to the present invention performs driving control of a motor, and, let arbitrary two axes that are at right angles to one another be called an x axis and a y axis, then the second motor driving control device is provided with: a voltage feeder that applies a rotation voltage having a predetermined frequency to the motor as a detection voltage; an extractor that extracts, from an x-axis component of a motor current that flows through the motor, a partly-extracted x-axis current obtained by attenuating at least a direct-current component of the x-axis component, and that extracts, from a y-axis component of the motor current, a partly-extracted y-axis current obtained by attenuating at least a direct-current component of the y-axis component; and a detector that performs at least one of detection of the polarity of the magnetic pole of a rotor of the motor and detection of the magnetic-pole position within the range of±π/2 by the use of the partly-extracted x-axis current and the partly-extracted y-axis current.

Specifically, for example, in the second motor driving control device, the detector detects the polarity based on the magnitude of the combined current of the partly-extracted x-axis current and the partly-extracted y-axis current.

Specifically, for example, in the second motor driving control device, the detector detects the magnetic-pole position within the range of±π/2 based on the inclination of a major axis of a current vector locus of the partly-extracted x-axis current and the partly-extracted y-axis current on the x-y axes.

Such a second motor driving control device embodying the invention will be described later as a second embodiment.

For example, in the second motor driving control device, the voltage vector locus, on the x-y axes, of the rotation voltage serving as the detection voltage describes a perfect circle, or an ellipse having its minor-axis direction or its major-axis direction running on the x-axis direction.

For example, in the second motor driving control device, the detector detects the polarity based on the magnitude of the rotation voltage that is obtained when the rotation voltage is controlled so that the difference between the positive and negative amplitudes of the partly-extracted x-axis current and the difference between the positive and negative amplitudes of the partly-extracted y-axis current are reduced close to zero.

For example, in the second motor driving control device, the detector detects the magnetic-pole position within the range of±π/2 based on the inclination of a minor axis of a voltage vector locus of the rotation voltage on the x-y axes, the inclination obtained when the rotation voltage is controlled so that the difference between the positive and negative amplitudes of the partly-extracted x-axis current and the difference between the positive and negative amplitudes of the partly-extracted y-axis current are reduced close to zero.

Such a second motor driving control device embodying the invention will be described later as a fourth embodiment.

For example, in the first and second motor driving control devices, by the application of the same detection voltage, detection of the polarity and estimation of the magnetic-pole position of the rotor within the range from 0 to 2π by the use of the detection of the polarity are performed.

For example, in the first and second motor driving control devices, the frequency of the detection voltage applied by the voltage feeder is different from the frequency of the drive voltage with which the motor is driven, and the drive voltage and the detection voltage are applied to the motor with different timing or at the same time.

A third motor driving control device according to the present invention performs driving control of a motor, and, let an axis parallel to a magnetic flux produced by a permanent magnet forming a rotor of the motor be called a d axis, and let an axis estimated, for the purpose of control, to correspond to the d axis be called a γ axis, then the third motor driving control device is provided with: a voltage feeder that applies to the motor a voltage to pass therethrough an alternating current or a rotation current having a predetermined frequency as a detection current; an extractor that extracts, from a γ-axis component of the voltage applied by the voltage feeder, a partly-extracted γ-axis voltage obtained by attenuating at least a direct-current component of the γ-axis component; and a detector that detects the polarity of the magnetic pole of the rotor by the use of the partly-extracted γ-axis voltage.

Specifically, for example, in the third motor driving control device, the voltage feeder applies to the motor the voltage with which the difference between the positive and negative amplitudes of a γ-axis component of the detection current is reduced close to zero.

Such a third motor driving control device embodying the invention will be described later as a fifth embodiment.

For example, in the third motor driving control device, the detector detects the polarity based on the positive and negative amplitudes of the partly-extracted γ-axis voltage.

Specifically, for example, in the third motor driving control device, detector detects the polarity of the rotor based on a γ-axis component of the detection current that is obtained when the detection current is controlled so that the difference between the positive and negative amplitudes of the partly-extracted γ-axis voltage is reduced close to zero.

Such a third motor driving control device embodying the invention will be described later as a seventh embodiment.

For example, in the third motor driving control device, the detector detects the polarity based on the positive and negative amplitudes of the γ-axis component.

A fourth motor driving control device according to the present invention performs driving control of a motor, and, let arbitrary two axes that are at right angles to one another be called an x axis and a y axis, then the fourth motor driving control device is provided with: a voltage feeder that applies to the motor a voltage to pass therethrough a rotation current having a predetermined frequency as a detection current; an extractor that extracts, from an x-axis component of the voltage applied by the voltage feeder, a partly-extracted x-axis voltage obtained by attenuating at least a direct-current component of the x-axis component, and that extracts, from a y-axis component of the voltage, a partly-extracted y-axis voltage obtained by attenuating at least a direct-current component of the y-axis component; and a detector that performs at least one of detection of the polarity of the magnetic pole of a rotor of the motor and detection of the magnetic-pole position within the range of±π/2 by the use of the partly-extracted x-axis voltage and the partly-extracted y-axis voltage.

Specifically, for example, in the fourth motor driving control device, the voltage feeder applies to the motor the voltage with which the difference between the positive and negative amplitudes of the x-axis component of the detection current and the difference between the positive and negative amplitudes of the y-axis component of the detection current are reduced close to zero.

Such a fourth motor driving control device embodying the invention will be described later as a sixth embodiment.

For example, in the fourth motor driving control device, the detector detects the polarity based on the magnitude of the combined voltage of the partly-extracted x-axis voltage and the partly-extracted y-axis voltage.

For example, in the fourth motor driving control device, the detector detects the magnetic-pole position within the range of±π/2 based on the inclination of a minor axis of a voltage vector locus of the partly-extracted x-axis voltage and the partly-extracted y-axis voltage on the x-y axes.

Specifically, for example, in the fourth motor driving control device, the detector detects the polarity based on the magnitude of the rotation current that is obtained when the rotation current is controlled so that the difference between the positive and negative amplitudes of the partly-extracted x-axis voltage and the difference between the positive and negative amplitudes of the partly-extracted y-axis voltage are reduced close to zero.

For example, in the fourth motor driving control device, the detector detects the magnetic-pole position within the range of±π/2 based on the inclination of a major axis of a current vector locus of the rotation current on the x-y axes, the inclination obtained when the rotation current is controlled so that the difference between the positive and negative amplitudes of the partly-extracted x-axis voltage and the difference between the positive and negative amplitudes of the partly-extracted y-axis voltage are reduced close to zero.

Such a fourth motor driving control device embodying the invention will be described later as an eighth embodiment.

In the second and fourth motor driving control devices, for example, the two axes are rotation axes that rotate as the motor rotates, or fixed axes fixed to a stator of the motor.

In the first to fourth motor driving control devices, for example, the extractor extracts a frequency band including a frequency component having a frequency twice the predetermined frequency.

Specifically, for example, in the first to fourth motor driving control devices, the extractor performs the above-described extraction in such a way as to attenuate frequency components having frequencies equal to or lower than a predetermined elimination frequency lower than the frequency twice the predetermined frequency. Note that the predetermined elimination frequency is so set as to be higher than the frequency of the drive current with which the motor is driven.

DETAILED DESCRIPTION OF PREFERRED EMBODIMENTS

Figure 1:
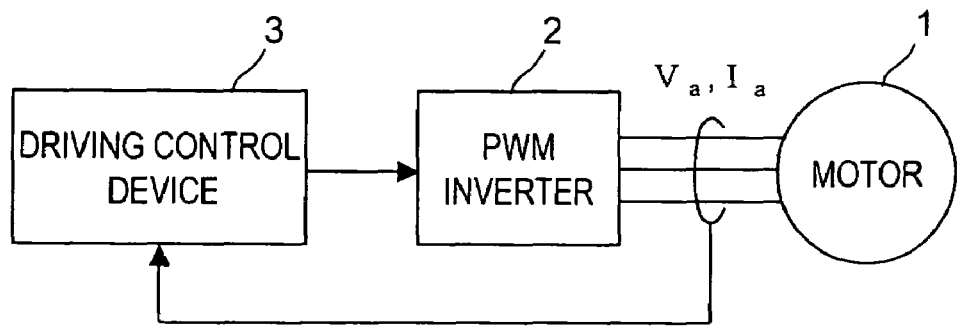
FIG. 1 is a block diagram showing the overall configuration of the motor drive system of the present invention.

Hereinafter, embodiments of the present invention will be described. First, the features shared by the embodiments described below will be described. FIG. 1 is a configuration block diagram of the motor drive system to which the present invention is applied. The motor drive system of the embodiments described below can be used when the motor is at standstill or is rotating.

Reference numeral 1 represents a three-phase permanent-magnet synchronous motor 1 (hereinafter also referred to simply as the "motor 1") that has a permanent magnet provided in a rotor (unillustrated) and has an armature winding provided in a stator (unillustrated). The motor 1 is, for example, a salient-pole motor having a salient pole. In the motor 1, the d-axis inductance is smaller than the q-axis inductance.

Reference numeral 2 represents a PWM (pulse-width modulation) inverter, which feeds the motor 1 with a three-phase alternating-current voltage, in U, V, and W phases, according to the control of the driving control device 3. This voltage fed to the motor 1 is called the motor voltage (armature voltage) $V_a$, and the current fed from the inverter 2 to the motor 1 is called the motor current (armature current) $I_a$.

Reference numeral 3 represents a driving control device, which estimates, based on the motor current $I_a$, the magnetic-pole position or the like of the rotor of the motor 1, and, for example, feeds the PWM inverter 2 with a signal for rotating the motor 1 at a desired rotation speed.

Figure 2:
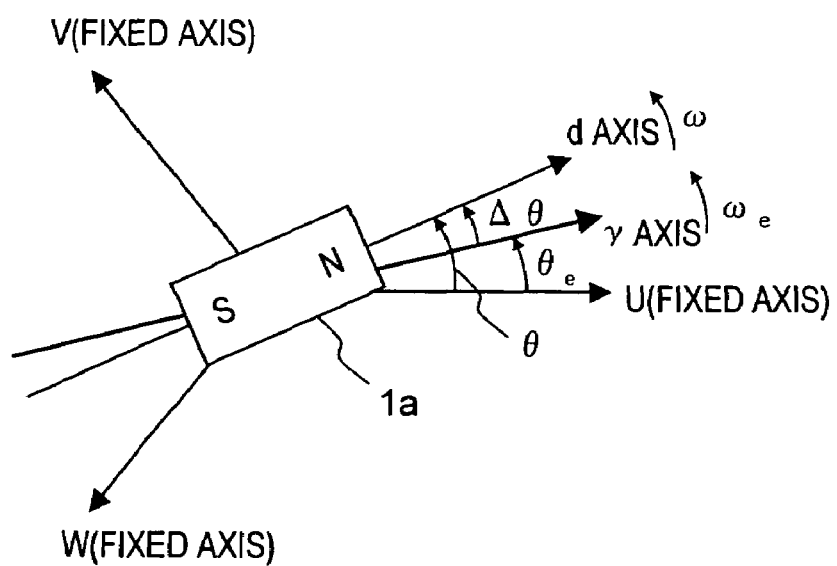
FIG. 2 is an analysis model diagram for the vector control of the motor shown in FIG. 1.

FIG. 2 is an analysis model diagram for the vector control of the motor 1. In the following description, what is referred to as "armature winding" always refers to that provided in the motor 1. FIG. 2 shows, as fixed axes, the U-phase, V-phase, and W-phase armature winding fixed axes. Reference numeral 1a represents the permanent magnet that forms the rotor of the motor 1. In a rotating coordinate system that rotates at the same speed as the magnetic flux produced by the permanent magnet 1a, the direction of the magnetic flux produced by the permanent magnet 1a is called the d axis, and the axis estimated, for the purpose of control, to correspond to the d axis is called the γ axis. Though omitted from illustration, the axis that leads the d axis by an electrical angle of 90 degrees in phase is called the q axis, and the axis estimated to lead the γ axis by an electrical angle of 90 degrees in phase is called the δ axis. The rotating coordinate system has, as its coordinate axes, the d and q axes, which are collectively called the d-q axes. The rotating coordinate system estimated for the purpose of control (estimated rotating coordinate system) has, as its coordinate axes, the γ and δ axes, which are collectively called the γ-δ axes.

The d-q axes rotates, and their rotation speed is called the real motor speed ω. The γ-δ axes also rotates, and their rotation speed is called the estimated motor speed $ω_e$. With respect to the rotating d-q axes, the phase of the d axis at a given moment is represented by θ (the magnetic-pole position θ) relative to the U-phase armature winding fixed axis. Likewise, with respect to the rotating γ-δ axes, the phase of the γ axis at a given moment is represented by $\theta_e$ (the estimated magnetic-pole position $\theta_e$) relative to the U-phase armature winding fixed axis. Then, the axis error Δθ between the d axis and the γ axis (the axis error Δθ between the d-q axes and the γ-δ axes) is expressed by $\Delta\theta = \theta - \theta_e$. In the following embodiments, the axis error Δθ is so controlled as to converge to zero.

In the following description, the γ-axis component and the δ-axis component of the motor current $I_a$ are called the γ-axis current $i_\gamma$ and the δ-axis current $i_\delta$, respectively. Moreover, in the following description, $L_d$ and $L_q$ represent the d-axis inductance and the q-axis inductance (the d-axis component and the q-axis component of the inductance of the armature winding of the motor 1), respectively. Furthermore, the unit of "π" used to indicate an electrical angle is radian.

First Embodiment

Figure 3:
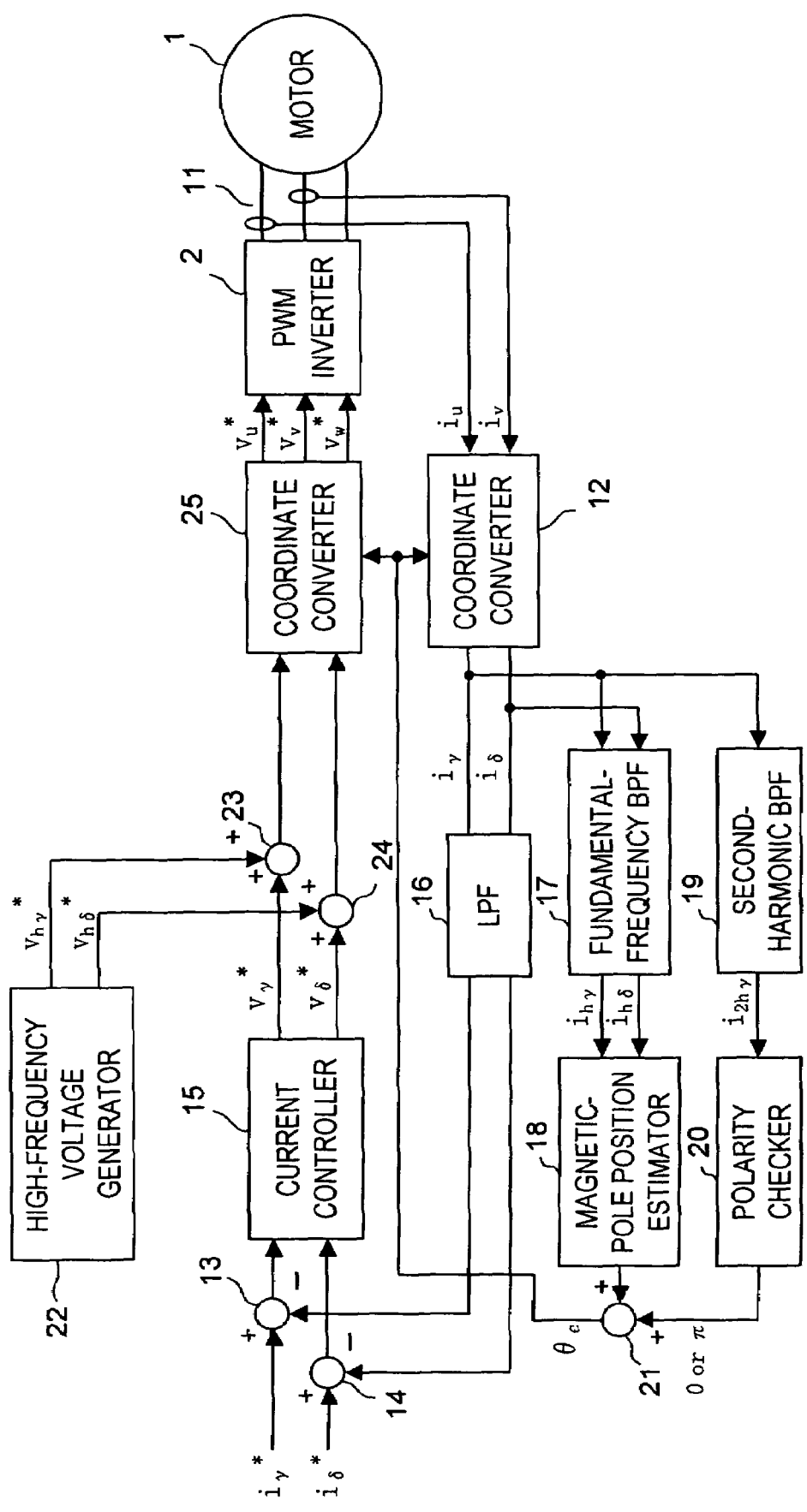
FIG. 3 is a configuration block diagram of the motor drive system of a first embodiment of the present invention.

FIG. 3 is a configuration block diagram of the motor drive system of a first embodiment of the present invention. The driving control device of this embodiment is composed of a current detector 11, a coordinate converter 12, subtracters 13 and 14, a current controller 15, an LPF (low-pass filter) 16, a fundamental-frequency BPF (band-pass filter) 17, a magnetic-pole position estimator 18, a second-harmonic BPF (band-pass filter) 19, a polarity checker 20, an adder 21, a high-frequency voltage generator 22, an adder 23, an adder 24, and a coordinate converter 25. The individual functional blocks of the driving control device of this embodiment and all the embodiments described hereinafter can freely use, whenever necessary, all the values generated within the driving control device.

The current detector 11 is implemented with, for example, a Hall device, and detects the U-phase current $i_u$ and the V-phase current $i_v$ of the motor current $I_a$ fed from the PWM inverter 2 to the motor 1. The detection results from the current detector 11, namely the U-phase current $i_u$ and the V-phase current $i_v$, are fed to the coordinate converter 12, which then converts them, by using the estimated magnetic-pole position $\theta_e$ fed from the adder 21, into a γ-axis current $i_\gamma$ and a δ-axis current $i_\delta$. The conversion here is performed according to formula (1) below.

$$\begin{bmatrix} i_\gamma \\ i_\delta \end{bmatrix} = \sqrt{2} \begin{bmatrix} \sin(\theta_e + \pi/3) & \sin\theta_e \\ \cos(\theta_e + \pi/3) & \cos\theta_e \end{bmatrix} \begin{bmatrix} i_u \\ i_v \end{bmatrix} \quad (1)$$

The LPF 16 removes a high-frequency component (in this embodiment, a high-frequency voltage component outputted from the high-frequency voltage generator 22) from the γ-axis current $i_\gamma$ and the δ-axis current $i_\delta$, and then outputs the resultant γ-axis current $i_\gamma$ and δ-axis current $i_\delta$ having the high-frequency component removed therefrom to the subtracters 13 and 14, respectively.

The subtracter 13 calculates the current error between a specified γ-axis current value $i_\gamma^*$ and the γ-axis current $i_\gamma$ having the high-frequency component removed therefrom by the LPF 16. The subtracter 14 calculates the current error between a specified δ-axis current value $i_\delta^*$ and the δ-axis current $i_\delta$ having the high-frequency component removed therefrom by the LPF 16. The specified γ-axis current value $i_\gamma^*$ and the specified δ-axis current value $i_\delta^*$ are set, for example, based on an externally-fed specified motor speed value (a target rotation speed of the motor 1) or the like.

Upon receiving the current errors calculated by the subtracters 13 and 14, the current controller 15 outputs a specified γ-axis voltage value $v_\gamma^*$ and a specified δ-axis voltage value $v_\delta^*$ such that each current error keeps up with zero. At this point, the γ-axis current $i_\gamma$ and the δ-axis current $i_\delta$ outputted from the LPF 16 with the high-frequency component removed therefrom are referable.

The high-frequency voltage generator 22 generates a high-frequency γ-axis voltage (a high-frequency specified γ-axis voltage value) $v_{h\gamma}^*$ and a high-frequency δ-axis voltage (a high-frequency specified δ-axis voltage value) $v_{h\delta}^*$, and then outputs them to the adders 23 and 24, respectively. The high-frequency γ-axis voltage $v_{h\gamma}^*$ and the high-frequency δ-axis voltage $v_{h\delta}^*$ are a γ-axis component and a δ-axis component, respectively, of a high-frequency voltage serving as a detection voltage that is applied for the purpose of checking the polarity of the rotor, for example. Hereinafter, the high-frequency γ-axis voltage $v_{h\gamma}^*$ and the high-frequency δ-axis voltage $v_{h\delta}^*$ will be referred to simply as the high-frequency voltage $v_{h\gamma}^*$ and the high-frequency voltage $v_{h\delta}^*$, respectively. The high-frequency voltages $v_{h\gamma}^*$ and $v_{h\delta}^*$ can be regarded as a superposed voltage to be superposed on the specified γ-axis voltage value $v_\gamma^*$ and a superposed voltage to be superposed on the specified δ-axis voltage value $v_\delta^*$, respectively.

The adder 23 calculates the sum $(v_\gamma^* + v_{h\gamma}^*)$ of the specified γ-axis voltage value $v_\gamma^*$ from the current controller 15 and the high-frequency γ-axis voltage $v_{h\gamma}^*$ from the high-frequency voltage generator 22. The adder 24 calculates the sum $(v_\delta^* + v_{h\delta}^*)$ of the specified δ-axis voltage value $v_\delta^*$ from the current controller 15 and the high-frequency δ-axis voltage $v_{h\delta}^*$ from the high-frequency voltage generator 22.

Based on the estimated magnetic-pole position $\theta_e$ fed from the adder 21, the coordinate converter 25 converts backward the two-phase specified voltage values, $(v_\gamma^* + v_{h\gamma}^*)$ and $(v_\delta^* + v_{h\delta}^*)$; thereby the coordinate converter 25 produces specified three-phase voltage values consisting of a specified U-phase voltage value $v_u^*$, a specified V-phase voltage value $v_v^*$, and a specified W-phase voltage value $v_w^*$, which represent the U-phase component, the V-phase component, and the W-phase component of the motor voltage $V_a$, and then outputs them to the PWM inverter 2. The backward conversion here is performed according to formula (2), consisting of two equations, below.

$$\begin{bmatrix} v_u^* \\ v_v^* \end{bmatrix} = \sqrt{\frac{2}{3}} \begin{bmatrix} \cos\theta_e & -\sin\theta_e \\ \cos(\theta_e - 2\pi/3) & -\sin(\theta_e - 2\pi/3) \end{bmatrix} \begin{bmatrix} v_\gamma^* + v_{h\gamma}^* \\ v_\delta^* + v_{h\delta}^* \end{bmatrix} \quad (2)$$

$$v_w^* = -(v_u^* + v_v^*)$$

Based on the specified three-phase voltage values ($v_u^*$, $v_v^*$, and $v_w^*$), which represent the voltage to be applied to the motor 1, the PWM inverter 2 produces pulse-width-modulated signals, and feeds the motor 1 with a motor current $I_a$ commensurate with those specified three-phase voltage values to drive the motor 1.

The current represented by the specified γ-axis current value $i_\gamma^*$ and the specified δ-axis current value $i_\delta^*$ is the drive current for driving the motor 1, and the voltage represented by the specified γ-axis voltage value $v_\gamma^*$ and the specified δ-axis voltage value $v_\delta^*$ is the drive voltage applied to the motor 1 to pass therethrough the drive current.

The high-frequency voltage composed of $v_{h\gamma}^*$ and $v_{h\delta}^*$ generated by the high-frequency voltage generator 22 is a high-frequency alternating voltage or a high-frequency rotation voltage, which serves as a detection voltage used to detect the polarity (and the magnetic-pole position) of the rotor of the motor 1. Here, "high frequency" denotes that the frequency of the high-frequency voltages $v_{h\gamma}^*$ and $v_{h\delta}^*$ is sufficiently higher than that of the drive voltage. Hereinafter, the frequency of the high-frequency voltages $v_{h\gamma}^*$ and $v_{h\delta}^*$ is represented by $\omega_h$.

Moreover, "rotation voltage" denotes a voltage of which the voltage vector locus describes a circle on a given coordinate axes (in this embodiment, on the $\gamma$-$\delta$ axes) as indicated by voltage vector loci 70$v$, 77$v$, and 79$v$ in FIG. 8 and FIGS. 21 to 23. For example, in three-phase terms, a rotation voltage is a three-phase balanced voltage, and with such a three-phase balanced voltage, its voltage vector locus describes a perfect circle having its center at the origin of the $\gamma$-$\delta$ axes, like the voltage vector locus 70$v$ shown in FIGS. 8 and 21. Since the rotation voltage is a high-frequency voltage that is not synchronous with the motor 1, applying the rotation voltage to the motor 1 does not cause it to rotate (or hardly causes it to rotate).

A high-frequency current flows through the motor 1 according to the superposition of the high-frequency voltages $v_{h\gamma}^*$ and $v_{h\delta}^*$. The amplitude and frequency of the high-frequency voltages $v_{h\gamma}^*$ and $v_{h\delta}^*$ are so set that, when the direction of the magnetic flux of the rotor (the magnetic flux produced by the permanent magnet 1$a$) coincides with the direction of the magnetic flux of the stator (the magnetic flux produced by the armature winding provided in the stator of the motor 1), a $\gamma$-axis component of the high-frequency current causes magnetic saturation in the motor 1.

Figure 4:
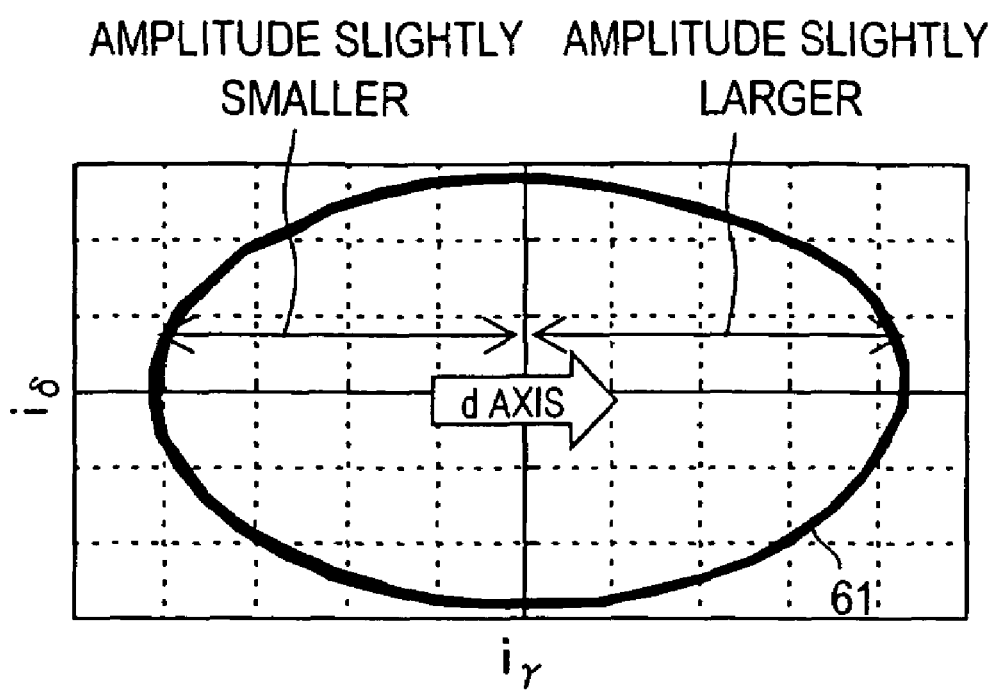
FIG. 4 is a diagram showing the vector locus of the current flowing through the motor shown in FIG. 3.

Now, how checking of the polarity is performed will be described, taking up a case in which the voltage vector locus of the high-frequency voltages $v_{h\gamma}^*$ and $v_{h\delta}^*$ describes a perfect circle. A locus 61 shown in FIG. 4 represents a current vector locus of the $\gamma$-axis current $i_\gamma$ and the $\delta$-axis current $i_\delta$ (a current vector locus of the resultant vector). Despite the perfect circle described by the voltage vector locus of the high-frequency voltages, there is a difference between the positive and negative amplitudes of the $\gamma$-axis current $i_\gamma$. More specifically, a comparison between the positive and negative amplitudes of the $\gamma$-axis current $i_\gamma$ indicates that the positive amplitude thereof is slightly larger than the negative amplitude thereof. This is because, due to the influence of magnetic saturation, a greater amount of $\gamma$-axis component current flows when the direction of the magnetic flux of the rotor coincides with the direction of the magnetic flux of the stator than when these magnetic fluxes are opposite in direction. It is to be noted that this embodiment deals with a case where the directions of the $\gamma$ axis and the d axis (substantially) coincide with each other.

In addition to a direct-current component, a frequency component of a drive current (corresponding to $i_\gamma^*$ and $i_\delta^*$), and a frequency component ($1\times\omega_h$) of the high-frequency voltages $v_{h\gamma}^*$ and $v_{h\delta}^*$, the $\gamma$-axis current $i_\gamma$ outputted from the coordinate converter 12 contains a higher-order frequency component of the high-frequency voltages $v_{h\gamma}^*$ and $v_{h\delta}^*$, that is, a second-harmonic component ($2\times\omega_h$), a fourth-harmonic component ($4\times\omega_h$), . . . , due to the influence of magnetic saturation.

The second-harmonic BPF 19 is a band-pass filter that receives as an input signal the $\gamma$-axis current $i_\gamma$ outputted from the coordinate converter 12 and that has a passband including a frequency of ($2\times\omega_h$). The second-harmonic BPF 19 extracts (enhances) the high-frequency second-harmonic component (a frequency component of $2\times\omega_h$) of the $\gamma$-axis current $i_\gamma$, and outputs the signal obtained by the extraction as a second-harmonic-extracted $\gamma$-axis current $i_{2h\gamma}$. The second-harmonic BPF 19 does not necessarily have to have a frequency of ($2\times\omega_h$) as its passband center frequency, but should not allow low frequencies to pass therethrough including a frequency of the direct current and the drive current (corresponding to $i_\gamma^*$ and $i_\delta^*$). For example, the lower cutoff frequency of the passband of the second-harmonic BPF 19 is chosen from a frequency range below $2\times\omega_h$ and above a frequency of the drive current of the motor 1.

The magnetic-pole position estimator 18 estimates the magnetic-pole position of the rotor within the range of $\pm\pi/2$. The waveform of the second-harmonic-extracted $\gamma$-axis current $i_{2h\gamma}$ and the current vector locus described by the second-harmonic-extracted $\gamma$-axis current $i_{2h\gamma}$ and the second-harmonic-extracted $\delta$-axis current $i_{2h\delta}$, the waveform and the current vector locus obtained when the polarity of the magnetic-pole position estimated by the magnetic-pole position estimator 18 is correct, that is, when, for example, the absolute value of $\Delta\theta$ is equal to or smaller than a few degrees (more broadly, when $-\pi/2 < \Delta\theta < \pi/2$), are indicated by a waveform 62 in FIG. 5D and a locus 64$i$ in FIG. 6, respectively. In FIG. 6, the horizontal axis represents a value of the second-harmonic-extracted $\gamma$-axis current $i_{2h\gamma}$, and the vertical axis represents a value of the second-harmonic-extracted $\delta$-axis current $i_{2h\delta}$. As is the case with the second-harmonic-extracted $\gamma$-axis current $i_{2h\gamma}$ extracted from the $\gamma$-axis current $i_\gamma$, the second-harmonic-extracted $\delta$-axis current $i_{2h\delta}$ is obtained by extracting a second-harmonic component from the $\delta$-axis current $i_\delta$ (how it is extracted will be described in detail in a second embodiment).

Depending on how the second-harmonic-extracted $\gamma$-axis current $i_{2h\gamma}$ is extracted (depending on the configuration of the second-harmonic BPF 19), the amount of phase displacement of the second-harmonic component (a frequency component of $2\times\omega_h$) with respect to the fundamental component of the current (a frequency component of $\omega_h$) varies, and the amount of phase displacement can be changed as appropriate. Here, assume that the passband center frequency of the second-harmonic BPF 19 is ($2\times\omega_h$), and the second-harmonic BPF 19 makes the phase of the frequency component of $\omega_h$ lead by about $\pi/2$ (or by $\pi/2$) (the phase of the frequency component of $2\times\omega_h$ does not change). As a result, as indicated by the waveform 62 in FIG. 5D and the locus 64$i$ in FIG. 6, the negative amplitude of the second-harmonic-extracted $\gamma$-axis current $i_{2h\gamma}$ is larger than the positive amplitude thereof.

Figure 5A:
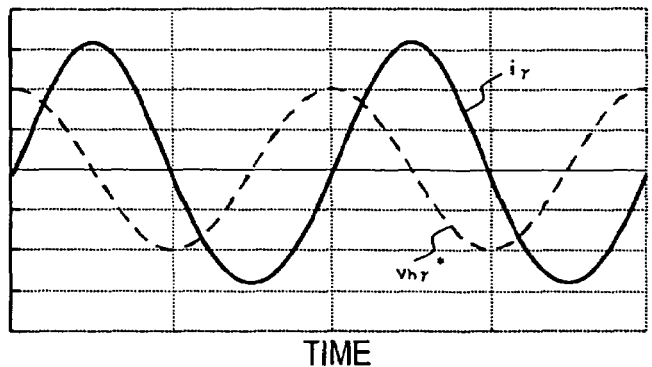
FIG. 5 is a diagram showing, for example, the waveform of the second-harmonic-extracted γ-axis current obtained by enhancing a second-harmonic component of a γ-axis component of the current flowing through the motor shown in FIG. 3.
Figure 5B:
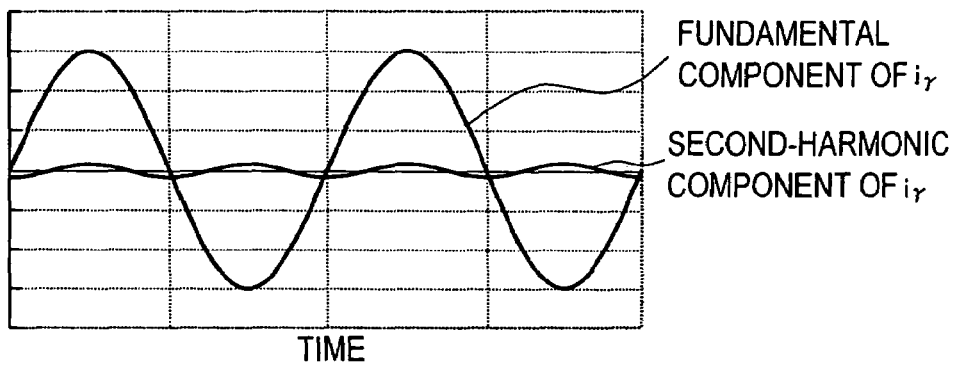

The operation of the second-harmonic BPF 19 will be described further in detail, taking up a case in which the $\gamma$ axis and the d axis (substantially) coincide with each other, the motor 1 is at standstill, and no drive voltage is applied. In this case, as shown in FIG. 5A, the phase of $i_\gamma$ lags the phase of $v_{h\gamma}^*$ by $\pi/2$, and the positive amplitude of $i_\gamma$ is slightly larger the negative amplitude thereof. If $i_\gamma$ is resolved into a fundamental component (a frequency component of $1\times\omega_h$) and a second-harmonic component (a frequency component of $2\times\omega_h$), the waveform shown in FIG. 5B results. Conversely, if the fundamental and second-harmonic components of $i_\gamma$ shown in FIG. 5B are synthesized, the waveform of $i_\gamma$ whose positive amplitude is larger than the negative amplitude results.

Figure 5C:
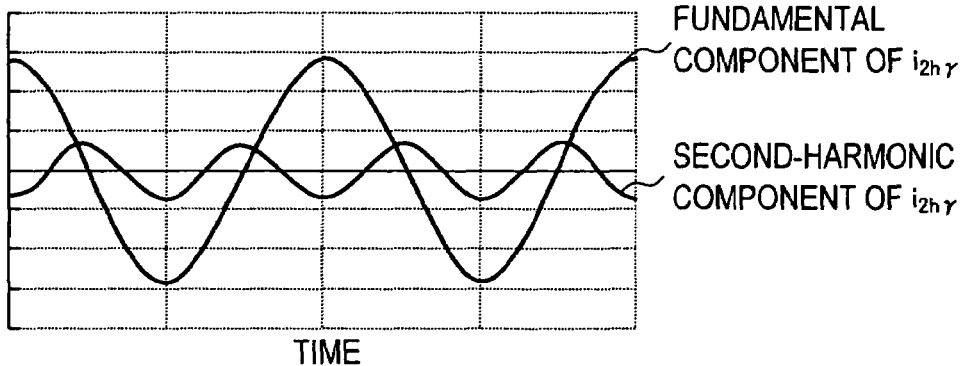

The second-harmonic BPF 19 is provided to enhance the second-harmonic component of $i_\gamma$. FIG. 5C shows the waveforms of the fundamental component and the second-harmonic component of the second-harmonic-extracted $\gamma$-axis current $i_{2h\gamma}$ obtained by enhancing the second-harmonic component of $i_\gamma$. The amplitude of the second-harmonic component of $i_{2h\gamma}$, which serves as the passband center frequency of the second-harmonic BPF 19, is amplified, and the phase thereof is the same as that of the second-harmonic component of $i_\gamma$. The phase of the fundamental component of $i_{2h\gamma}$, which is not the center frequency, leads the phase of the fundamental component of $i_\gamma$ by about $\pi/2$. Since the frequency of the high-frequency voltages $v_{h\gamma}{}^*$ and $v_{h\delta}{}^*$ is $1\times\omega_h$, the fundamental component clearly remains in the second-harmonic-extracted γ-axis current $i_{2h\gamma}$ obtained by enhancing the second-harmonic component.

Figure 5D:
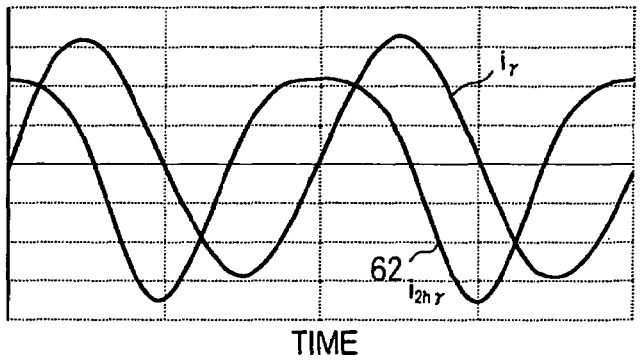
Figure 6:
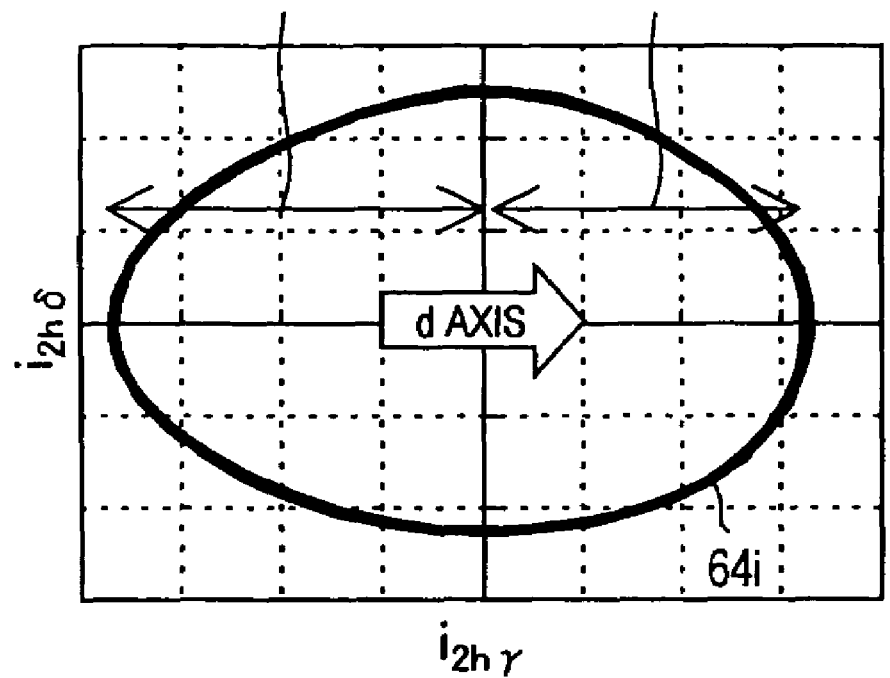
FIG. 6 is a diagram showing the vector locus of the second-harmonic component of the current flowing through the motor shown in FIG. 3.

The waveform obtained by synthesizing (mainly) the fundamental and second-harmonic components of $i_{2h\gamma}$ corresponds to $i_{2h\gamma}$ indicated by the waveform 62 in FIG. 5D. The phase of $i_{2h\gamma}$ thus obtained leads the phase of $i_\gamma$ by about $\pi/2$, and the phases of $i_{2h\gamma}$ and $v_{h\gamma}{}^*$ are substantially the same. The negative amplitude of $i_{2h\gamma}$ is larger than the positive amplitude thereof, and the difference between the positive and negative amplitudes is enhanced. Incidentally, since the induction voltage that appears when the motor 1 is rotated and the drive voltage have sufficiently lower frequencies than that of the detection voltage, the influence of those components becomes almost negligible by passing them through the second-harmonic BPF 19.

Based on the waveform of the second-harmonic-extracted γ-axis current $i_{2h\gamma}$, the polarity checker 20 checks the polarity of the magnetic pole of the rotor of the motor 1 (hereinafter also referred to simply as the "polarity of the rotor" or the "polarity"). Specifically, the polarity checker 20 compares the positive and negative amplitudes of the waveform 62 of the second-harmonic-extracted γ-axis current $i_{2h\gamma}$ to determine which is larger than the other. If the negative amplitude is larger than the positive amplitude as indicated by the waveform 62, the polarity checker 20 judges that the polarity of the magnetic-pole position estimated by the magnetic-pole position estimator 18 is correct, and makes the magnetic-pole position estimator 18 output, as it is, the magnetic-pole position estimated thereby via the adder 21 to the coordinate converter 12 or the like as an estimated magnetic-pole position $\theta_e$. On the other hand, if the negative amplitude is smaller than the positive amplitude, the polarity checker 20 judges that the polarity of the magnetic-pole position estimated by the magnetic-pole position estimator 18 is incorrect (that is, the estimated magnetic-pole position is displaced by π), performs correction by making the adder 21 add an electrical angle π to the magnetic-pole position estimated by the magnetic-pole position estimator 18, and then makes the adder 21 output the corrected magnetic-pole position to the coordinate converter 12 or the like as an estimated magnetic-pole position $\theta_e$. The estimated magnetic-pole position $\theta_e$ has a phase angle between 0 and $2\pi$ ($0 \leq \theta_e < 2\pi$).

As described above, distortion of the current waveform caused by magnetic saturation is extracted by extracting the second-harmonic component of the γ-axis current $i_\gamma$, and, by detecting the distortion thus extracted, checking of the polarity is performed. Since polarity checking is performed based on the distortion of the current waveform (by using the second-harmonic-extracted component of the current from which the direct-current component or the low-frequency component is removed) instead of the direct-current component, the influence of the drive current or the induction voltage and of the offset of the current sensor (current detector 11) on the polarity checking is suppressed. This makes it possible to perform stable polarity checking not only when the motor is at standstill but also when it is rotating.

The fundamental-frequency BPF 17 is a band-pass filter that receives as an input signal the γ-axis current $i_\gamma$ and the δ-axis current $i_\delta$ outputted from the coordinate converter 12 and that has a passband including a frequency of $(1\times\omega_h)$. The fundamental-frequency BPF 17 outputs a fundamental-frequency-extracted γ-axis current $i_{h\gamma}$ obtained by extracting (enhancing) a high-frequency fundamental component (a frequency component of $1\times\omega_h$) of the γ-axis current $i_\gamma$ and a fundamental-frequency-extracted δ-axis current $i_{h\delta}$ obtained by extracting (enhancing) a high-frequency fundamental component of the δ-axis current $i_\delta$. The fundamental-frequency BPF 17 rejects a frequency of $(2\times\omega_h)$ or higher, and has a frequency of $(1\times\omega_h)$, for example, as its passband center frequency.

Figure 7:
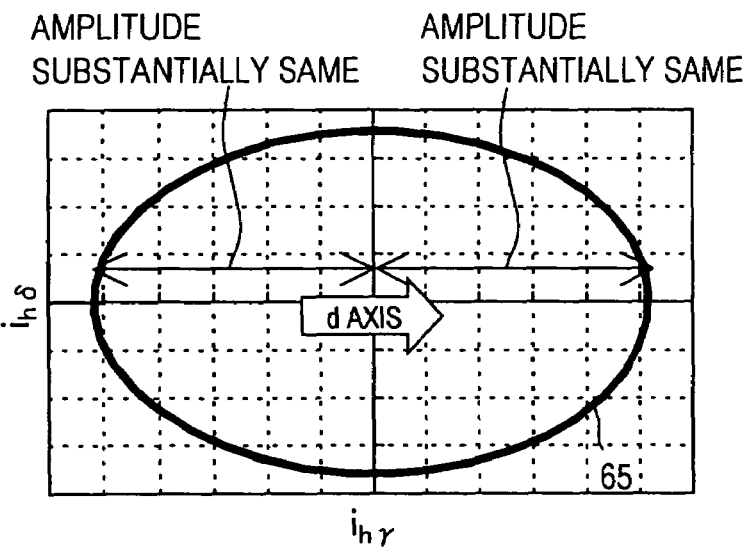
FIG. 7 is a diagram showing the vector locus of the fundamental component of the current flowing through the motor shown in FIG. 3.

The current vector locus of the fundamental-frequency-extracted γ-axis current $i_{h\gamma}$ and the fundamental-frequency-extracted δ-axis current $i_{h\delta}$ on the γ-δ axes is indicated by a locus 65 in FIG. 7. As a result of the high-frequency second-harmonic component being removed, there is almost no difference between the positive and negative amplitudes of the fundamental-frequency-extracted γ-axis current $i_{h\gamma}$.

Based on the fundamental-frequency-extracted γ-axis current $i_{h\gamma}$ and the fundamental-frequency-extracted δ-axis current $i_{h\delta}$, the magnetic-pole position estimator 18 estimates the magnetic-pole position of the rotor within the range of $\pm\pi/2$. Various methods have been proposed for estimating the magnetic-pole position of the rotor within the range of $\pm\pi/2$ based on the fundamental-frequency-extracted γ-axis current $i_{h\gamma}$ and the fundamental-frequency-extracted δ-axis current $i_{h\delta}$, and any of those methods can be adopted in the embodiments. Hereinafter, a configuration of the magnetic-pole position estimator 18 proposed by the applicant of the present invention is taken up as an example. First, the principle will be described by using FIGS. 8 to 11.

Figure 8:
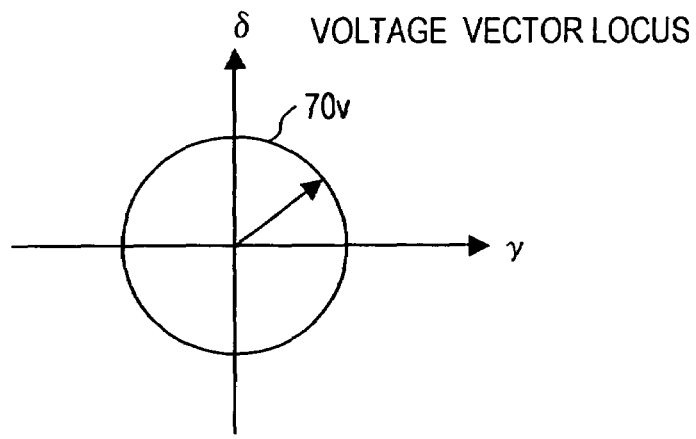
FIG. 8 is a diagram showing the vector locus of the high-frequency voltage generated by the high-frequency voltage generator shown in FIG. 3.
Figure 9:
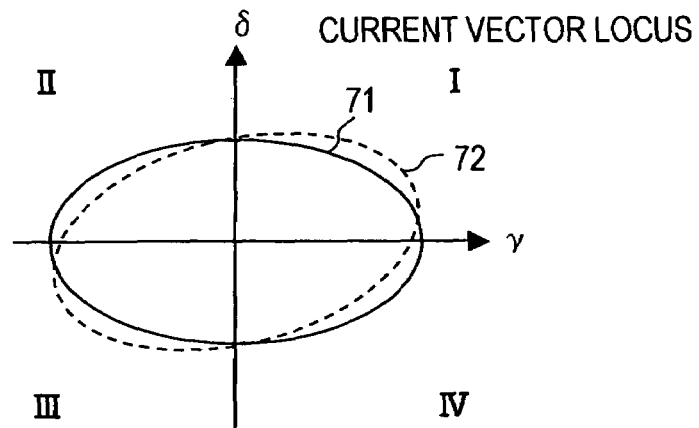
FIG. 9 is a diagram showing the vector locus of the current fundamental component outputted from the fundamental-frequency BPF shown in FIG. 3 when the high-frequency voltage of FIG. 8 is applied.

In a case where the motor 1 is an interior permanent-magnet synchronous motor or the like and where $L_d < L_q$ holds, the current vector locus of the high-frequency current that is made to flow through the motor 1 by the high-frequency voltage exhibiting the voltage vector locus 70v (FIG. 8) describing a perfect circle describes, as indicated by a current vector locus 71 in FIG. 9, an ellipse that has its center at the origin on the γ-δ axes (in the γ-δ coordinate system) and that has its major-axis direction running on the γ-axis direction and its minor-axis direction running on the δ-axis direction. It should be noted that the current vector locus 71 is one observed when the axis error $\Delta\theta$ is zero. When the axis error $\Delta\theta$ is non-zero, the current vector locus describes an ellipse as indicated by a current vector locus 72, and its major-axis direction (or minor-axis direction) does not coincide with the γ-axis (or δ-axis) direction. That is, when the axis error $\Delta\theta$ is non-zero, on the γ-δ axes (in the γ-δ coordinate system), the current vector locus 71 is inclined about the origin so as to describe the current vector locus 72 instead.

The arithmetic product $(i_{h\gamma} \times i_{h\delta})$ contains a direct-current component that depends on the inclination of the ellipse described by the current vector locus 72. The arithmetic product $(i_{h\gamma} \times i_{h\delta})$ is positive in the first and third quadrants of the current vector locus and negative in the second and fourth quadrants thereof. Thus, when the ellipse is not inclined (when the current vector locus 71 is observed), the arithmetic product contains no direct-current component; when the ellipse is inclined (when the current vector locus 72 is observed), the arithmetic product contains a direct-current component. In FIG. 9, the roman numerals I, II, III, and IV represent the first, second, third, and fourth quadrants on the γ-δ axes (in the γ-δ coordinate system).

Figure 10:
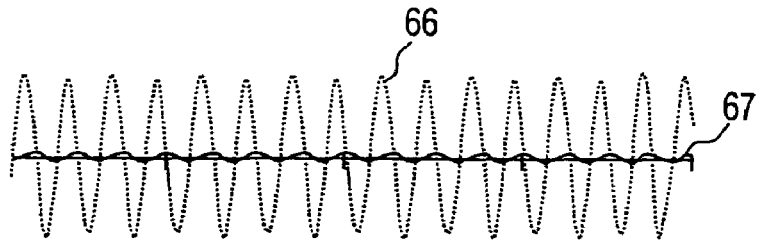
FIG. 10 is a diagram illustrating the operation of the magnetic-pole position estimator shown in FIG. 3.
Figure 11:
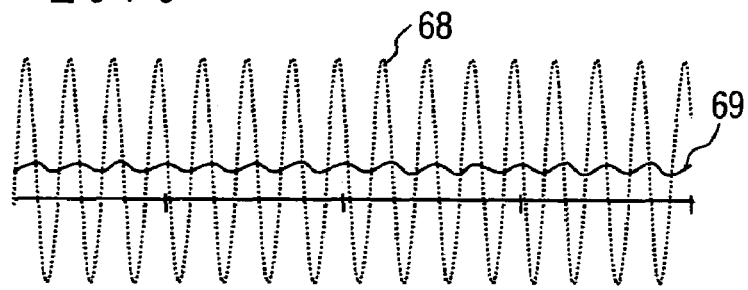
FIG. 11 is a diagram illustrating the operation of the magnetic-pole position estimator shown in FIG. 3.

In FIG. 10, where the horizontal axis represents time, the arithmetic product $(i_{h\gamma} \times i_{h\delta})$ and the direct-current component contained therein as observed when the axis error $\Delta\theta$ is zero are indicated by curves 66 and 67, respectively. In FIG. 11, where the horizontal axis represents time, the arithmetic product $(i_{h\gamma} \times i_{h\delta})$ and the direct-current component contained therein as observed when the axis error $\Delta\theta$ is non-zero are indicated by curves 68 and 69, respectively. As will be understood from FIGS. 10 and 11, the direct-current component of the arithmetic product ($i_{h\gamma} \times i_{h\delta}$) is zero when $\Delta\theta = 0°$, and is non-zero when $\Delta\theta \neq 0°$. Moreover, the direct-current component increases as the magnitude of the axis error $\Delta\theta$ increases (is largely proportional to the axis error $\Delta\theta$). Thus, when the direct-current component is so controlled as to converge to zero, the axis error $\Delta\theta$ converges to zero.

Exploiting this relationship, the magnetic-pole position estimator 18 corrects the γ-δ axes so that the direct-current component of the arithmetic product ($i_{h\gamma} \times i_{h\delta}$) converges to zero, and thereby estimates the magnetic-pole position of the rotor within the range of $\pm\pi/2$. In the configuration shown in FIG. 3, the estimated magnetic-pole position can be corrected by the polarity checker 20 and the adder 21. Thus, the magnetic-pole position estimated by the magnetic-pole position estimator 18 can be regarded as a tentatively estimated magnetic-pole position.

Figure 12:
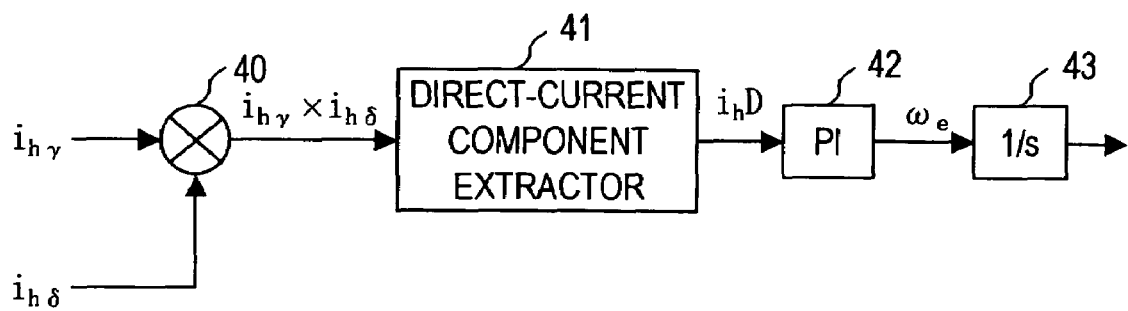
FIG. 12 is a diagram showing an example of the internal configuration of the magnetic-pole position estimator shown in FIG. 3.

FIG. 12 is a block diagram showing an example of the internal configuration of the magnetic-pole position estimator 18. The magnetic-pole position estimator 18 shown in FIG. 12 is composed of a multiplier 40, a direct-current component extractor 41, a proportional-plus-integral calculator 42, and an integrator 43.

The multiplier 40 calculates the arithmetic product ($i_{h\gamma} \times i_{h\delta}$) of the fundamental-frequency-extracted γ-axis current $i_{h\gamma}$ and the fundamental-frequency-extracted δ-axis current $i_{h\delta}$ extracted by the fundamental-frequency BPF 17. The direct-current component extractor 41 removes a high-frequency component from the arithmetic product ($i_{h\gamma} \times i_{h\delta}$), and thereby extracts the direct-current component $i_hD$ contained in the arithmetic product ($i_{h\gamma} \times i_{h\delta}$). The direct-current component extractor 41 is a low-pass filter, an integrator that integrates the arithmetic product ($i_{h\gamma} \times i_{h\delta}$) of an integral-multiple-period worth of the high-frequency voltages $v_{h\gamma}^*$ and $v_{h\delta}^*$, a moving averager that calculates the direct-current component $i_hD$ from the moving averages of the arithmetic product ($i_{h\gamma} \times i_{h\delta}$) of an integral-multiple-period worth of the high-frequency voltages $v_{h\gamma}^*$ and $v_{h\delta}^*$, or a combination of those functional blocks.

To achieve PLL (phase-locked loop) control, the proportional-plus-integral calculator 42, while cooperating with the individual functional blocks of the driving control device of FIG. 3, performs proportional-plus-integral control, and thereby calculates the estimated motor speed $\omega_e$ such that the direct-current component $i_hD$ outputted from the direct-current component extractor 41 converges to zero (i.e. so that the axis error $\Delta\theta$ converges to zero). The integrator 43 integrates the estimated motor speed $\omega_e$ outputted from the proportional-plus-integral calculator 42 to calculate the tentatively estimated magnetic-pole position.

The tentatively estimated magnetic-pole position calculated by the integrator 43 is corrected by the adder 21, whereby the final estimated magnetic-pole position $\theta_e$ is calculated. The estimated motor speed $\omega_e$ outputted from the proportional-plus-integral calculator 42 and the estimated magnetic-pole position $\theta_e$ outputted from the adder 21 are fed to the relevant functional blocks of the driving control device that need them.

With the configuration shown in FIGS. 3 and 12, the axis error $\Delta\theta$ can be made to converge to zero. Moreover, here, the processing required to estimate the magnetic-pole position is simple (the amount of computational operation required to do that is small), and the magnetic-pole position estimator 18 is easy to realize. This offers high practicality. In particular, when the motor 1 is at standstill or is rotating at low speed, the magnetic-pole position can be properly estimated.

The example shown in FIG. 3 deals with a configuration in which the magnetic-pole position estimator 18 tentatively estimates the magnetic-pole position, and then the adder 21 corrects the tentatively estimated magnetic-pole position. However, it is also possible to perform checking of the polarity before or during estimation of the magnetic-pole position, and estimate the magnetic-pole position within the range from 0 to $2\pi$ by using the checking result thus obtained. In either case, the magnetic-pole position estimator cooperates with the polarity checker so as to detect the magnetic-pole position of the rotor within the range from 0 to $2\pi$.

Figure 13:
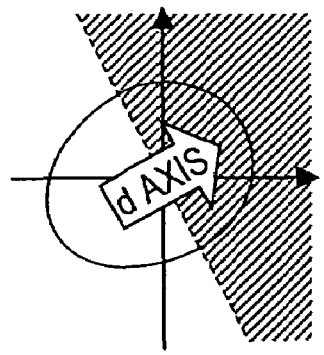
FIG. 13 is a diagram illustrating a correction method for the estimated magnetic-pole position by using the result of checking of the polarity.

In a case where polarity checking is performed before estimation of the magnetic-pole position, the magnetic-pole position is set (estimated) within the range of $\pm\pi/2$ about the direction judged to be the direction of the d axis as shown in FIG. 13, for example. That is, the magnetic-pole position is set (estimated) within the range of $\pm\pi/2$ about the phase angle obtained by adding (or subtracting) $\pi$ to (from) the phase angle at which the absolute value (magnitude) of the second-harmonic-extracted γ-axis current $i_{2h\gamma}$ becomes maximum. It should be noted that the method shown in FIG. 13 can be adopted in second, fourth, sixth, and eighth embodiments described later. In that case, since the magnetic-pole position with correct polarity is estimated by the magnetic-pole position estimator within the range from 0 to $2\pi$, there is no need to provide the adder 21.

Figure 14:
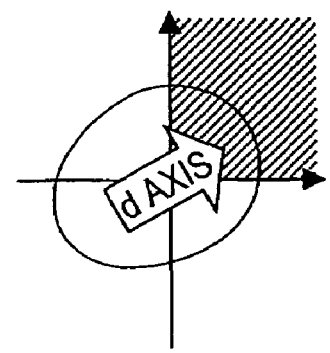
FIG. 14 is a diagram illustrating a correction method for the estimated magnetic-pole position by using the result of checking of the polarity.
Figure 15:
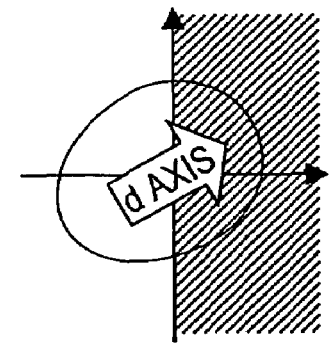
FIG. 15 is a diagram illustrating a correction method for the estimated magnetic-pole position by using the result of checking of the polarity.
Figure 16:
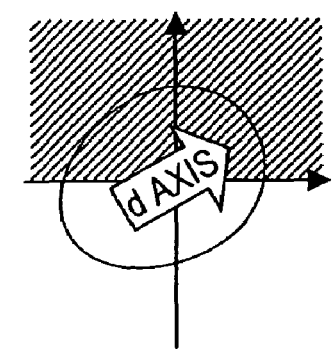
FIG. 16 is a diagram illustrating a correction method for the estimated magnetic-pole position by using the result of checking of the polarity.

In a case where polarity checking is performed before estimation of the magnetic-pole position, the range in which the magnetic-pole position is estimated may be narrowed by referring not only to the difference between the positive and negative amplitudes of the second-harmonic-extracted γ-axis current $i_{2h\gamma}$ (i.e. which is larger than the other) but also, whenever necessary, to the difference between the positive and negative amplitudes of the second-harmonic-extracted δ-axis current $i_{2h\delta}$ (i.e. which is larger than the other). For example, the range in which the magnetic-pole position is estimated may be narrowed to one quadrant as shown in FIG. 14. Alternatively, the range in which the magnetic-pole position is estimated may be narrowed to two quadrants with respect to the γ-axis component as shown in FIG. 15, or to two quadrants with respect to the δ-axis component as shown in FIG. 16.

In a case where polarity checking is performed during estimation of the magnetic-pole position so as to perform correction of the magnetic-pole position, it is necessary simply to adopt one or a combination of the methods by which polarity checking is performed before or after estimation of the magnetic-pole position.

Figure 17:
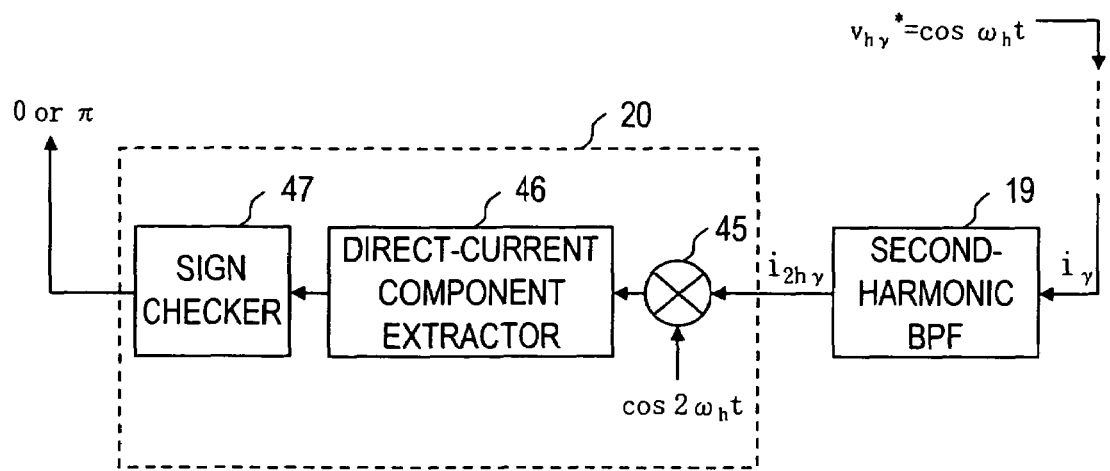
FIG. 17 is a diagram showing an example of the internal configuration of the polarity checker shown in FIG. 3.

Moreover, polarity checking may be performed by comparing the absolute values of the minimum and maximum values (positive and negative peak values) of the second-harmonic-extracted γ-axis current $i_{2h\gamma}$ over one cycle or more. Alternatively, polarity checking may be performed with the polarity checker 20 configured as shown in FIG. 17. FIG. 17 is a diagram showing an example of the internal configuration of the polarity checker 20 when a high-frequency voltage $v_{h\gamma}^*$ represented by $\cos 2\omega_h t$ (where t is time) is applied.

Figure 18:
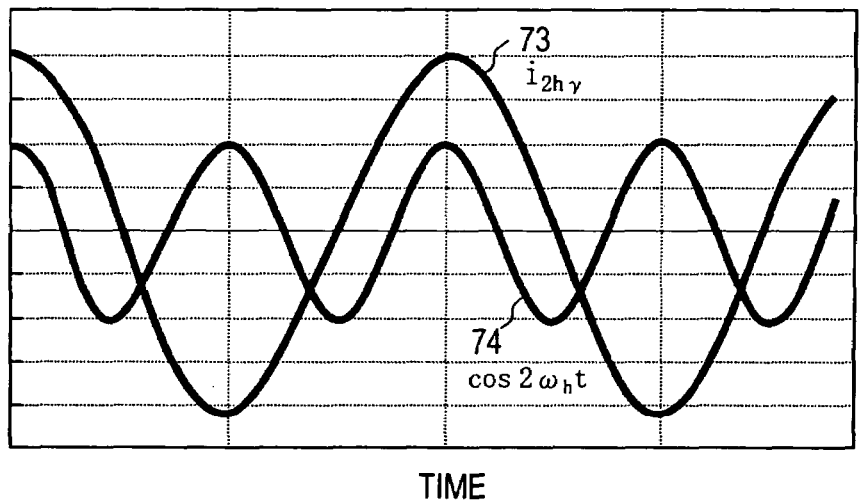
FIG. 18 is a diagram illustrating the operation of the polarity checker shown in FIG. 17.

The polarity checker 20 shown in FIG. 17 is composed of a multiplier 45, a direct-current component extractor 46, and a sign checker 47. The multiplier 45 multiplies a second-harmonic-extracted γ-axis current $i_{2h\gamma}$ indicated by a waveform 73 in FIG. 18 by $\cos 2\omega_h t$ indicated by a waveform 74 in FIG. 18.

Figure 19:
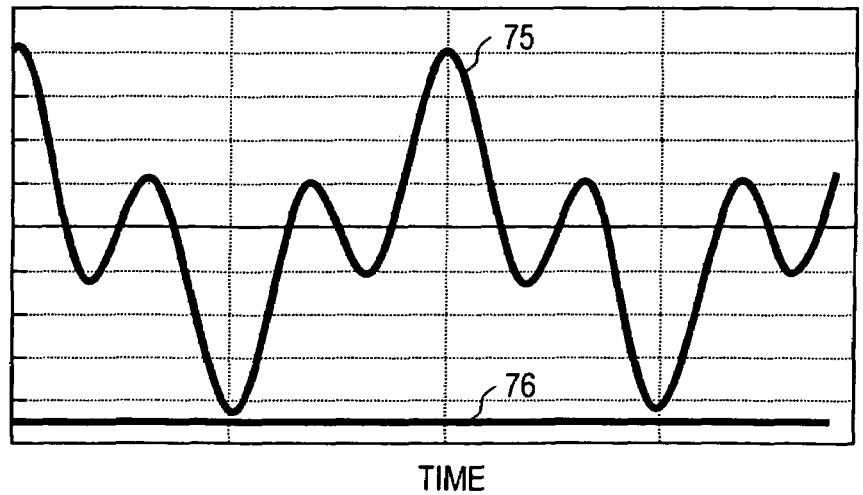
FIG. 19 is a diagram illustrating the operation of the polarity checker shown in FIG. 17.

The direct-current component extractor 46 extracts the direct-current component of the multiplication result ($i_{2h\gamma} \times \cos 2\omega_h t$) of the multiplier 45 indicated by a waveform 75 in FIG. 19. The direct-current component thus extracted has a waveform 76 in FIG. 19. If the negative amplitude of the second-harmonic-extracted γ-axis current $i_{2h\gamma}$ is larger than the positive amplitude thereof, the direct-current component is negative; if the positive amplitude of the second-harmonic-extracted γ-axis current $i_{2h\gamma}$ is larger than the negative amplitude thereof, the direct-current component is positive. In this way, distortion of the waveform due to the second-harmonic component is extracted as a direct current. It should be noted that the scale of the vertical axis of the waveform 76 is enlarged.

If the direct-current component extracted by the direct-current component extractor 46 is negative, the sign checker 47 judges that the polarity of the estimated magnetic-pole position is correct, and makes the magnetic-pole position estimator 18 output, as it is, the magnetic-pole position estimated thereby via the adder 21 to the coordinate converter 12 or the like as an estimated magnetic-pole position $\theta_e$. On the other hand, if the direct-current component extracted by the direct-current component extractor 46 is positive, the sign checker 47 performs correction by making the adder 21 add an electrical angle π to the magnetic-pole position estimated by the magnetic-pole position estimator 18, and then makes the adder 21 output the corrected magnetic-pole position to the coordinate converter 12 or the like as an estimated magnetic-pole position $\theta_e$.

As described above, the polarity checker 20 shown in FIG. 17 extracts the difference between the positive and negative amplitudes (difference in amplitude) of the second-harmonic-extracted γ-axis current $i_{2h\gamma}$ as a direct current. Incidentally, the direct-current component extractor 46 is a low-pass filter, an integrator that integrates the arithmetic product ($i_{2h\gamma} \times \cos 2\omega_h t$) of an integral-multiple-period worth of the second harmonic ($2 \times \omega_h$), a moving averager that calculates the moving averages of the arithmetic product ($i_{2h\gamma} \times \cos 2\omega_h t$) of an integral-multiple-period worth of the second harmonic ($2 \times \omega_h$), or a combination of those functional blocks. In a case where the second-harmonic-extracted γ-axis current $i_{2h\gamma}$ is multiplied by $\cos(2\omega_h t+\pi)$ instead of $\cos 2\omega_h t$, the direct current having an inverted sign is extracted. Moreover, in a case where a high-frequency voltage $v_{h\gamma}^*$ represented by $\sin 2\omega_h t$ is applied, the direct current is extracted by multiplying the second-harmonic-extracted γ-axis current $i_{2h\gamma}$ by $\sin 2\omega_h t$ or $\sin(2\omega_h t+\pi)$ of the second harmonic.

Figure 20:
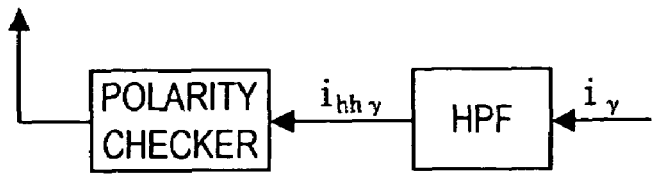
FIG. 20 is a diagram of a portion of the configuration shown in FIG. 3, illustrating a modified example thereof.

Instead of the band-pass filter (in FIG. 3, the second-harmonic BPF 19), a high-pass filter (HPF) may be adopted to extract from the γ-axis current $i_\gamma^*$ a signal used for polarity checking (see FIG. 20). The high-pass filter extracts, from the γ-axis current $i_\gamma$, an extracted current $i_{hh\gamma}$ obtained by attenuating relatively low frequency components of the γ-axis current $i_\gamma$ including a direct-current component and a frequency component of the drive current, and then feeds the extracted current $i_{hh\gamma}$ to the polarity checker as a signal used for polarity checking. In that case, the polarity checker performs polarity checking by treating the extracted current $i_{hh\gamma}$ the same as the second-harmonic-extracted γ-axis current $i_{2h\gamma}$. Needless to say, a frequency of $(2 \times \omega_h)$ lies within the passband of the high-pass filter.

Figure 21:
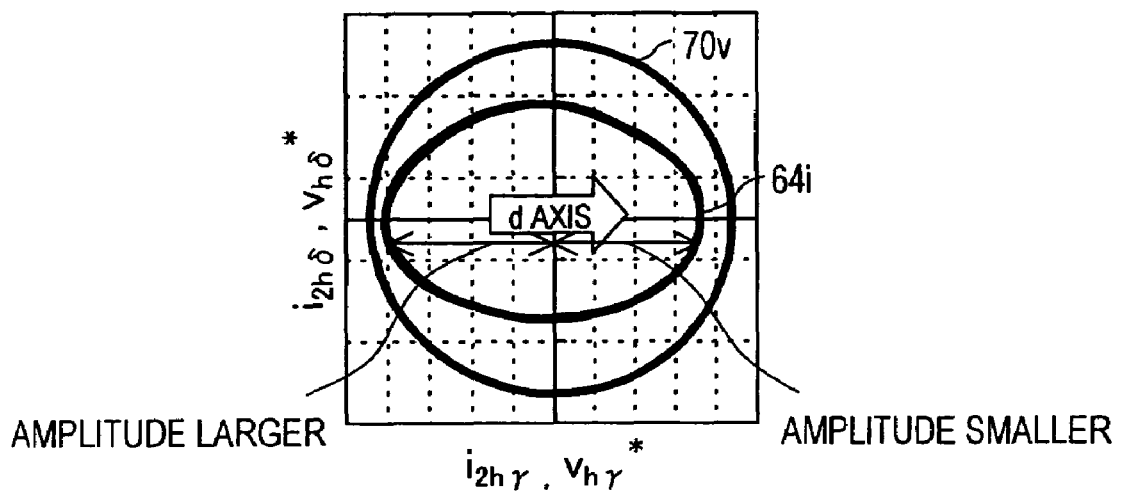
FIG. 21 is a diagram showing a first example of the relationship between the vector locus of the high-frequency voltage (the rotation voltage) generated by the high-frequency voltage generator shown in FIG. 3 and the vector locus of the current second-harmonic component.

The descriptions heretofore deal with the polarity checking method, taking up a case in which the voltage vector locus of the high-frequency voltages $v_{h\gamma}^*$ and $v_{h\delta}^*$ describes, on the γ-δ axes, a perfect circle, like the locus 70v shown in FIG. 21. In a case where a rotation voltage is applied as a detection voltage (a high-frequency voltage composed of $v_{h\gamma}^*$ and $v_{h\delta}^*$) for polarity checking, the amplitudes of the high-frequency voltages $v_{h\gamma}^*$ and $v_{h\delta}^*$ of the rotation voltage may be different.

Figure 22:
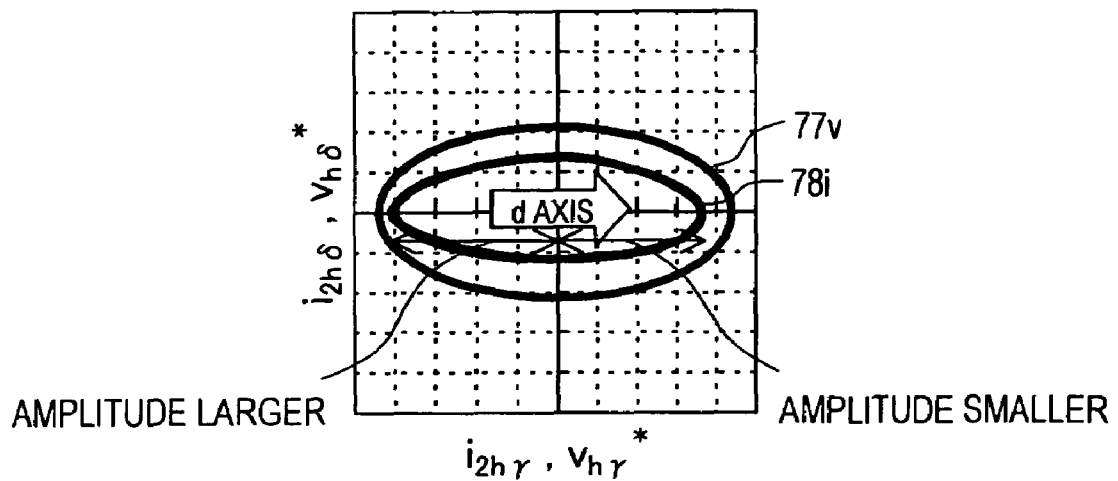
FIG. 22 is a diagram showing a second example of the relationship between the vector locus of the high-frequency voltage (the rotation voltage) generated by the high-frequency voltage generator shown in FIG. 3 and the vector locus of the current second-harmonic component.

FIG. 22 shows a locus 77v, which is the voltage vector locus of a rotation voltage as observed in a case where the amplitude of the high-frequency γ-axis voltage $v_{h\gamma}^*$ is made larger than the amplitude of the high-frequency δ-axis voltage $v_{h\delta}^*$, and a locus 78i of the second-harmonic-extracted γ-axis current $i_{2h\gamma}$ and the second-harmonic-extracted δ-axis current $i_{2h\delta}$, the current vector locus corresponding to the locus 77v. The voltage vector locus 77v describes an ellipse that has its center on the γ-δ axes (in the γ-δ coordinate system) and that has its major-axis direction running on the γ-axis direction and its minor-axis direction running on the δ-axis direction.

Figure 23:
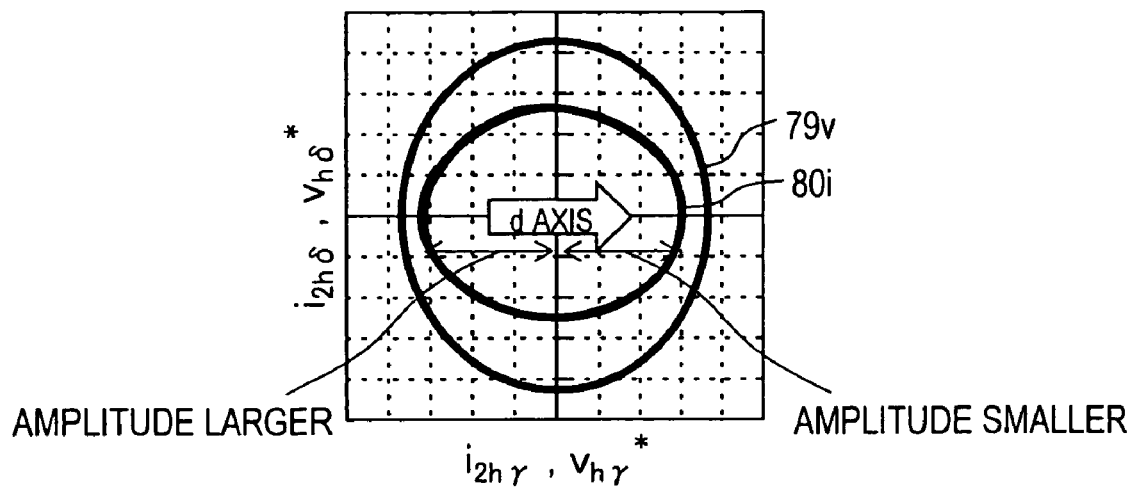
FIG. 23 is a diagram showing a third example of the relationship between the vector locus of the high-frequency voltage (the rotation voltage) generated by the high-frequency voltage generator shown in FIG. 3 and the vector locus of the current second-harmonic component.

FIG. 23 shows a locus 79v, which is the voltage vector locus of a rotation voltage as observed in a case where the amplitude of the high-frequency γ-axis voltage $v_{h\gamma}^*$ is made smaller than the amplitude of the high-frequency δ-axis voltage $v_{h\delta}^*$, and a locus 80i of the second-harmonic-extracted γ-axis current $i_{2h\gamma}$ and the second-harmonic-extracted δ-axis current $i_{2h\delta}$, the current vector locus corresponding to the locus 79v. The voltage vector locus 79v describes an ellipse that has its center on the γ-δ axes (in the γ-δ coordinate system) and that has its minor-axis direction running on the γ-axis direction and its major-axis direction running on the δ-axis direction.

Figure 24:
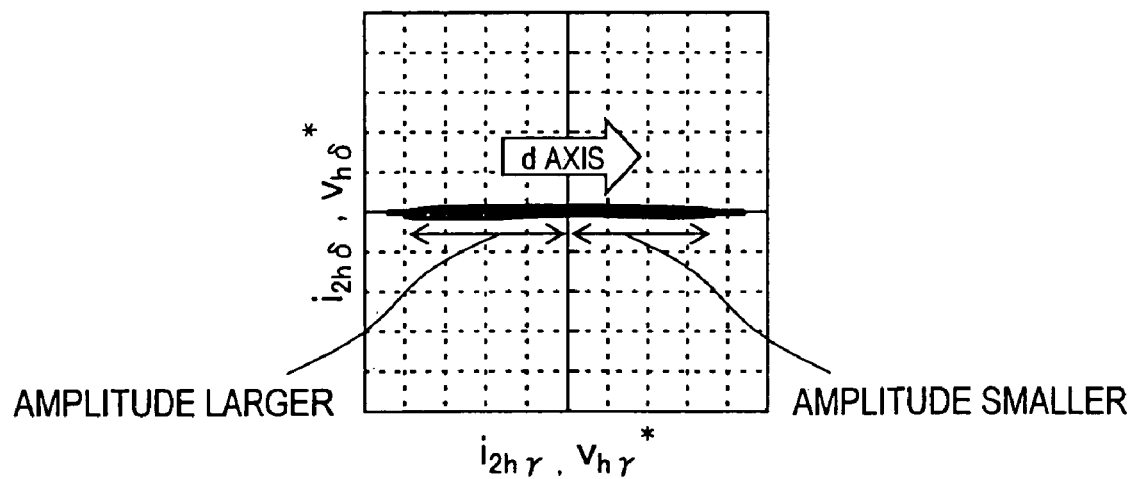
FIG. 24 is a diagram showing a fourth example of the relationship between the vector locus of the high-frequency voltage (the alternating voltage) generated by the high-frequency voltage generator shown in FIG. 3 and the vector locus of the current second-harmonic component.

Moreover, as shown in FIG. 24, as a detection voltage used for polarity checking, an alternating voltage having only a γ-axis component may be applied (i.e. $v_{h\delta}^*$ may be made zero). Application of any of the high-frequency voltages shown in FIGS. 21 to 24 (the rotation voltage and the alternating voltage) causes the difference between the positive and negative amplitudes of the second-harmonic-extracted γ-axis current $i_{2h\gamma}$. It should be noted that the locus 70v of the voltage vector shown in FIG. 8 is identical to that shown in FIG. 21, and the locus 64i of the current vector shown in FIG. 6 is identical to that shown in FIG. 21.

FIGS. 22 and 23 show examples in which the rotation voltage describes an ellipse. In the elliptical voltage vector locus of the rotation voltage, the γ-axis direction does not necessarily have to coincide with the minor-axis or major-axis direction of the ellipse. The major or minor axis of the ellipse may be displaced from the γ axis. Furthermore, FIG. 24 shows an example of the alternating voltage. Any alternating voltages may be applied as a detection voltage unless it is an alternating voltage on the δ-axis (that is, so long as $v_{h\gamma}^* \ne 0$).

Checking of the polarity and estimation of the magnetic-pole position can be performed simultaneously with current appearing as a result of application of high-frequency voltages having the same pattern. That is, based on the second-harmonic-extracted γ-axis current $i_{2h\gamma}$ (and the second-harmonic-extracted δ-axis current $i_{2h\delta}$), the fundamental-frequency-extracted γ-axis current $i_{h\gamma}$, and the fundamental-frequency-extracted δ-axis current $i_{h\delta}$ that appear as a result of application of the identical high-frequency voltages $v_{h\gamma}^*$ and $v_{h\delta}^*$, polarity checking by the polarity checker 20 and estimation of the magnetic-pole position by the magnetic-pole position estimator 18 (in other words, polarity checking and estimation of the magnetic-pole position of the rotor within the range from 0 to 2π through the use of the polarity checking result) can be performed simultaneously.

Since checking of the polarity does not necessarily always have to be performed, it may be performed independently of estimation of the magnetic-pole position (before, after, or during estimation of the magnetic-pole position). In that case, the amplitudes or frequencies of the "high-frequency voltages $v_{h\gamma}^*$ and $v_{h\delta}^*$ applied to perform estimation of the magnetic-pole position" and the "high-frequency voltages $v_{h\gamma}^*$ and $v_{h\delta}^*$ applied to perform checking of the polarity" may be different. With consideration given to the fact that checking of the polarity requires injection of a relatively high current to cause temporary magnetic saturation in the motor 1, while estimation of the magnetic-pole position requires no injection of such a high current, the amplitude of the high-frequency voltage for estimation of the magnetic-pole position may be made smaller than the amplitude of the high-frequency voltage for checking of the polarity, for example.

Although the descriptions heretofore are based on the assumption that driving control of the motor 1 and checking of the polarity are performed simultaneously by superposing, on the drive voltage represented by $v_\gamma^*$ and $v_\delta^*$, the high-frequency voltages $v_{h\gamma}^*$ and $v_{h\delta}^*$ with the frequency and amplitude having no influence on the driving control of the motor 1, it is not always necessary to perform them simultaneously. That is, the high-frequency voltage composed of $v_{h\gamma}^*$ and $v_{h\delta}^*$ used as a detection voltage and the drive voltage may be applied with different timing.

Moreover, driving control by the application of the drive voltage, checking of the polarity by the application of the high-frequency voltages $v_{h\gamma}^*$ and $v_{h\delta}^*$, and estimation of the magnetic-pole position by the application of the high-frequency voltages $v_{h\gamma}^*$ and $v_{h\delta}^*$ may be performed simultaneously, or may be performed independently.

Second Embodiment

Figure 25:
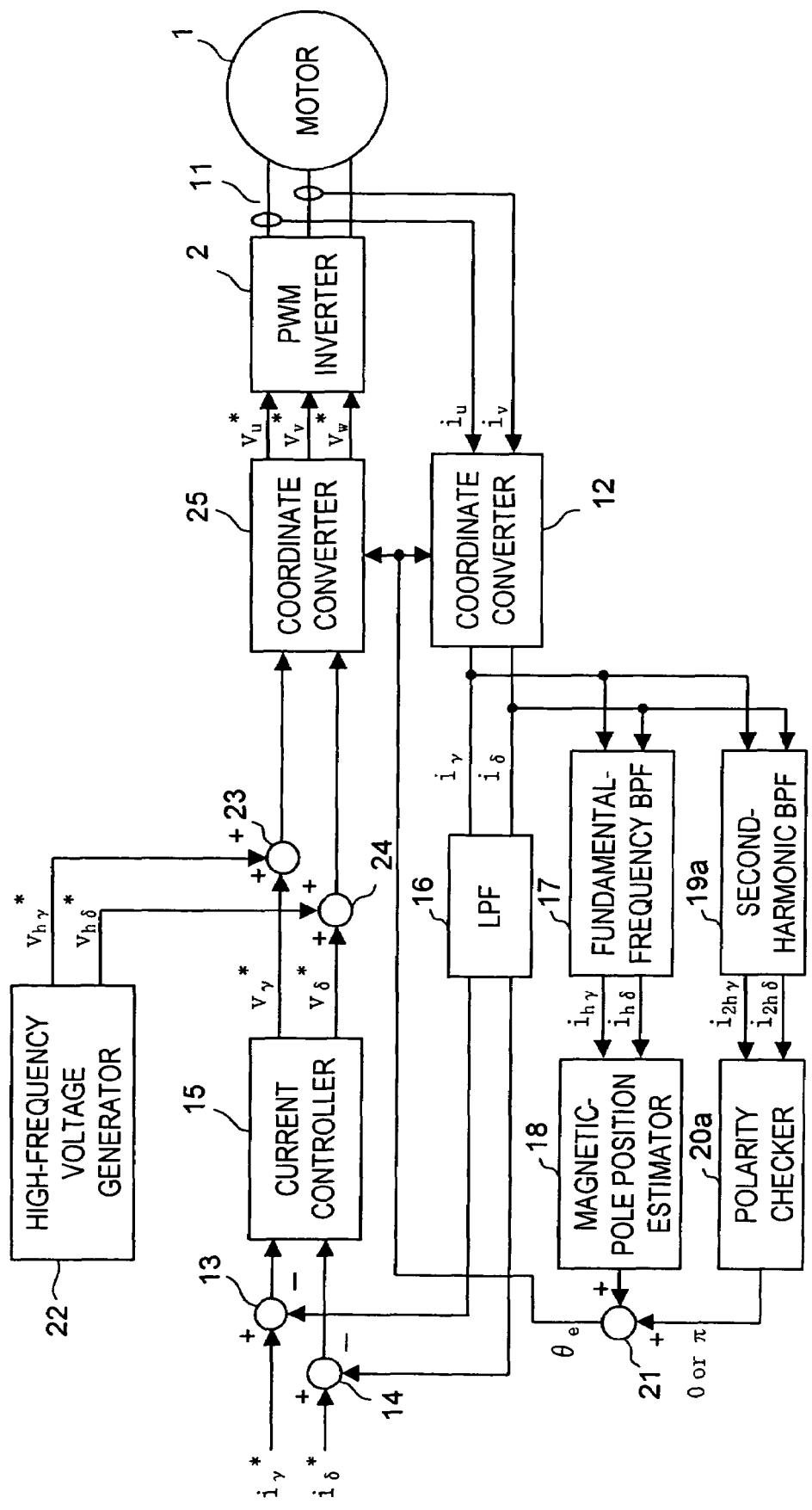
FIG. 25 is a configuration block diagram of the motor drive system of a second embodiment of the present invention.

Next, a second embodiment of the present invention will be described. FIG. 25 is a configuration block diagram of the motor drive system of the second embodiment. The driving control device of this embodiment differs from the driving control device shown in FIG. 3 only in that a second-harmonic BPF 19 and a polarity checker 20 shown in FIG. 3 are replaced with a second-harmonic BPF 19a and a polarity checker 20a. In other respects, the driving control device of this embodiment is the same as the driving control device (of the first embodiment) shown in FIG. 3. In FIG. 25, such functional blocks as are found also in FIG. 3 are identified with the same reference numerals, and their explanations in principle will not be repeated.

The second-harmonic BPF 19a shown in FIG. 25 realizes not only the function of the second-harmonic BPF 19 shown in FIG. 3 that extracts the second-harmonic-extracted γ-axis current $i_{2h\gamma}$ but also the function of extracting the second-harmonic-extracted δ-axis current $i_{2h\delta}$ mentioned in the first embodiment.

That is, the second-harmonic BPF 19a is a band-pass filter that receives as an input signal the γ-axis current $i_\gamma$ and the δ-axis current $i_\delta$ outputted from the coordinate converter 12 and that has a passband including a frequency of $(2\times\omega_h)$. As is the case with the second-harmonic BPF 19, the second-harmonic BPF 19a extracts the second-harmonic-extracted γ-axis current $i_{2h\gamma}$. The second-harmonic BPF 19a also extracts (enhances) a high-frequency second-harmonic component (a frequency component of $2\times\omega_h$) of the δ-axis current $i_\delta$, and outputs the signal obtained as a result of extraction as a second-harmonic-extracted δ-axis current $i_{2h\delta}$.

For example, the filter characteristics of the second-harmonic BPF 19a used for extraction of the second-harmonic-extracted γ-axis current $i_{2h\gamma}$ from the γ-axis current $i_\gamma$ are assumed to be the same as the filter characteristics used for extraction of the second-harmonic-extracted δ-axis current $i_{2h\delta}$ from the δ-axis current $i_\delta$. Also, the filter characteristics of the second-harmonic BPF 19a used for extraction of the second-harmonic-extracted γ-axis current $i_{2h\gamma}$ from the γ-axis current $i_\gamma$ are assumed to be the same as the filter characteristics of the second-harmonic BPF 19 shown in FIG. 3. The second-harmonic BPF 19a does not necessarily have to have a frequency of $(2\times\omega_h)$ as its passband center frequency, but should not allow low frequencies to pass therethrough including a frequency of the direct current and the drive current (corresponding to $i_\gamma^*$ and $i_\delta^*$). For example, the lower cutoff frequency of the passband of the second-harmonic BPF 19a is chosen from a frequency range below $2\times\omega_h$ and above a frequency of the drive current of the motor 1.

Figure 26:
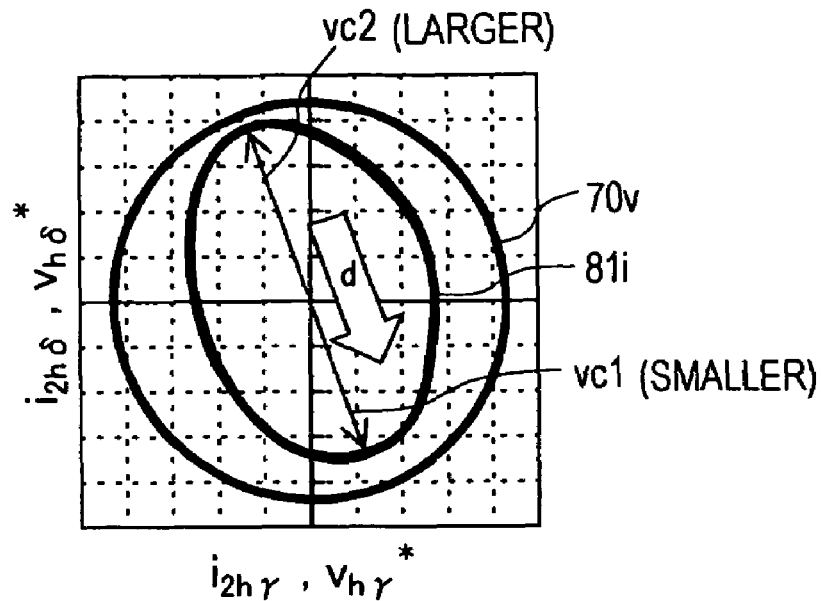
FIG. 26 is a diagram showing the relationship between the vector locus of the high-frequency voltage generated by the high-frequency voltage generator shown in FIG. 25 and the vector locus of the current second-harmonic component.

Incidentally, in a case where the γ axis and the d axis are displaced from each other to a relatively large extent, it may be impossible to correctly perform checking of the polarity based on the difference between the positive and negative amplitudes of the second-harmonic-extracted γ-axis current $i_{2h\gamma}$ as described in the first embodiment. In FIG. 26, the locus of the current vector (resultant vector) of the second-harmonic-extracted γ-axis current $i_{2h\gamma}$ and the second-harmonic-extracted δ-axis current $i_{2h\delta}$ as observed when the γ axis and the d axis are displaced from each other to a relatively large extent and when the high-frequency voltages $v_{h\gamma}^*$ and $v_{h\delta}^*$ describing, on the γ-δ axes, the voltage vector locus 70v in the shape of a perfect circle are applied is indicated by a locus 81i. As will be understood from the locus 81i, when the γ axis and the d axis are displaced from each other to a relatively large extent, the difference between the positive and negative amplitudes of the second-harmonic-extracted γ-axis current $i_{2h\gamma}$ is eliminated, or the sign of the difference is inverted. This makes it difficult to perform checking of the polarity correctly.

Thus, in this embodiment, to perform checking of the polarity correctly even when the γ axis and the d axis are displaced from each other to a relatively large extent, the polarity checker 20a performs checking of the polarity based on both the second-harmonic-extracted γ-axis current $i_{2h\gamma}$ and the second-harmonic-extracted δ-axis current $i_{2h\delta}$ extracted by the second-harmonic BPF 19a. In the following description, explanations will be given of the polarity checker 20a, taking up a case in which the high-frequency voltages $v_{h\gamma}^*$ and $v_{h\delta}^*$ describing, on the γ-δ axes, the voltage vector locus 70v in the shape of a perfect circle are applied.

As shown in FIG. 26, the locus 81i of the current vector describes substantially an ellipse on the γ-δ axes, and the major-axis direction of the ellipse coincides with the d axis direction (this equally applies to a case where the motor 1 is a non-salient pole motor). Due to magnetic saturation, differences occur in the magnitudes of the two vectors vc1 and vc2 that make up the locus 81i and lie along the major-axis direction of the ellipse.

The vectors vc1 and vc2 are each a resultant vector of the second-harmonic-extracted γ-axis current $i_{2h\gamma}$ and the second-harmonic-extracted δ-axis current $i_{2h\delta}$, the resultant vector having its tail at the origin and extending along the major-axis direction of the ellipse described by the locus 81i. In FIG. 26, the vector vc1 extends in the γ-δ coordinate system from the origin toward the fourth quadrant, and the vector vc2 extends in the γ-δ coordinate system from the origin toward the second quadrant. Now, as shown in FIG. 26, when the direction of the d-axis is a direction that points from the origin to the fourth quadrant, the magnitude of the vector vc1 is made smaller than the magnitude of the vector vc2 due to magnetic saturation.

Figure 27:
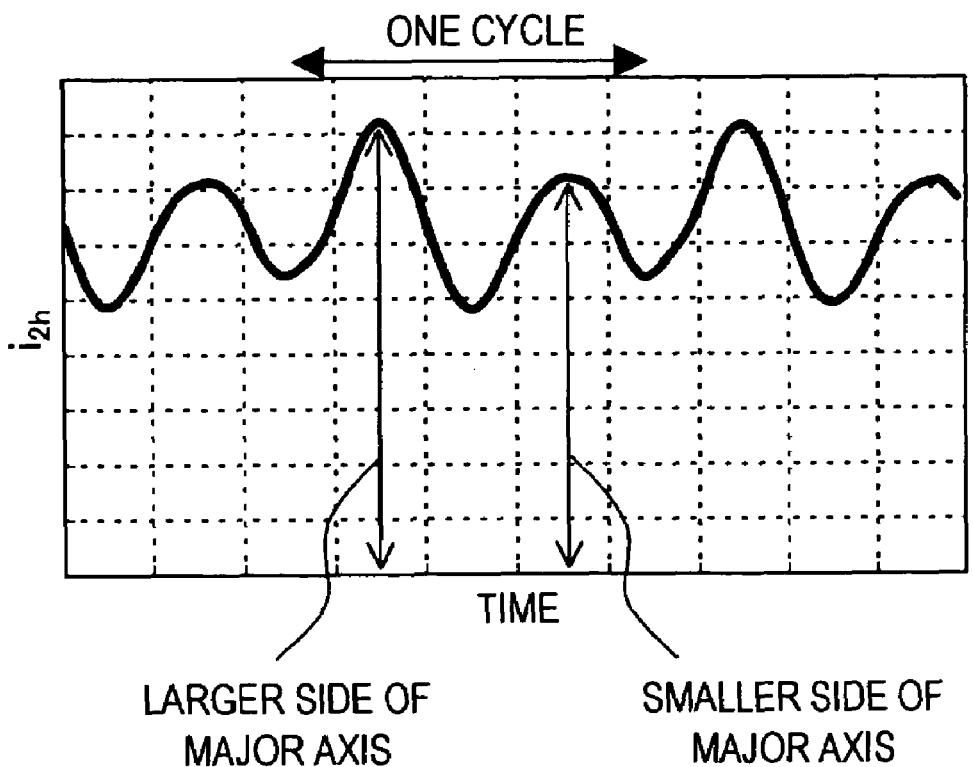
FIG. 27 is a diagram showing the time variation of the magnitude of the current second-harmonic component shown in FIG. 26.

Exploiting this relationship, the polarity checker 20a performs checking of the polarity, and feeds to the adder 21 a correction phase angle of 0 or π. In FIG. 27, where the horizontal axis represents time, the time variation of the magnitude of the resultant vector $i_{2h}$ (the vector making up the locus 81i) of $i_{2h\gamma}$ and $i_{2h\delta}$ is shown. Based on the magnitude of the resultant vector $i_{2h}$ (the magnitude of the combined current) in one cycle of the high-frequency voltages $v_{h\gamma}^*$ and $v_{h\delta}^*$, the polarity checker 20a performs checking of the polarity. More specifically, the polarity checker 20a judges that the direction of the phase angle (in FIG. 26, the direction of the vector vc1) obtained by adding π to the phase angle at which the magnitude of the resultant vector $i_{2h}$ becomes maximum in one cycle of the high-frequency voltages $v_{hγ}^*$ and $v_{hδ}^*$ is the direction of the d-axis (this equally applies to a case where the motor 1 is a non-salient pole motor). In the example shown in FIG. 26, when the resultant vector $i_{2h}$ coincides with the vector vc2, the magnitude of the resultant vector $i_{2h}$ becomes maximum.

Even with the configuration of this embodiment, checking of the polarity is performed by using a second-harmonic-extracted component of current. This makes it possible to achieve the same effects as those achieved in the first embodiment, and thereby offer stable polarity checking.

The descriptions heretofore deal with the polarity checking method, taking up a case in which the voltage vector locus of the high-frequency voltages $v_{hγ}^*$ and $v_{hδ}^*$ describes, on the γ-δ axes, a perfect circle. However, the circular locus of the rotation voltage may be deformed unless the amplitude of the resultant vector $i_{2h}$ in the d-axis direction is equal to or smaller than the amplitude thereof in the q-axis direction. That is, the amplitude of the high-frequency γ-axis voltage $v_{hγ}^*$ of the rotation voltage and the amplitude of the high-frequency δ-axis voltage $v_{hδ}^*$ thereof may be different so long as the d-axis direction coincides with the major-axis direction of the locus 81i of the current vector. For example, the voltage vector locus of the high-frequency voltages $v_{hγ}^*$ and $v_{hδ}$ may describe an ellipse that has its center at the origin on the γ-δ axes (in the γ-δ coordinate system) and that has its major-axis direction or its minor-axis direction running on the γ-axis direction.

Figure 45:
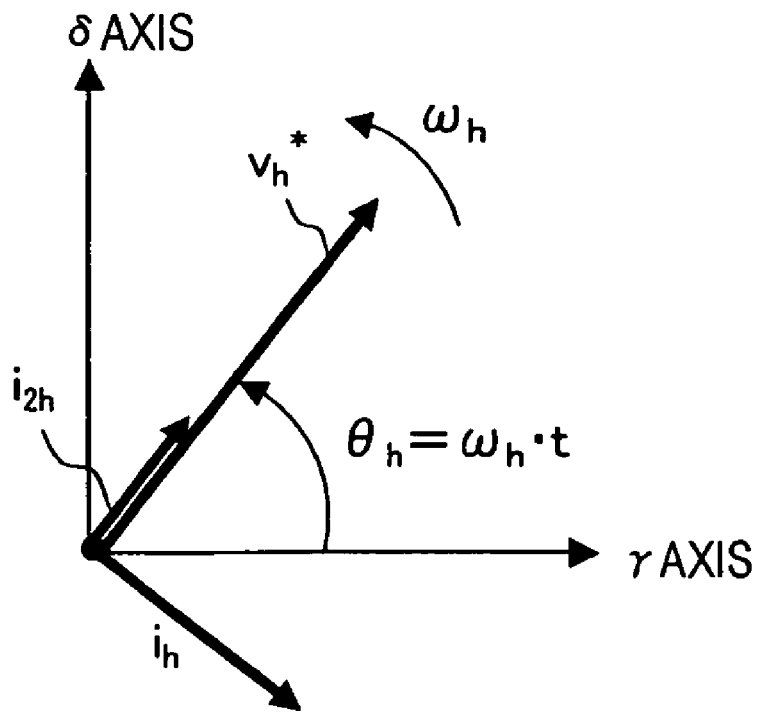
FIG. 45 is a vector diagram referred to in the second embodiment, for example, of the present invention.

The phase $θ_h$ of the high-frequency voltages $v_{hγ}^*$ and $v_{hδ}$ that is required to generate the values of the high-frequency voltages $v_{hγ}^*$ and $v_{hδ}^*$ is set relative to the γ axis, and, at time "t", the phase of the resultant vector $v_{hγ}^*$ of the high-frequency voltages $v_{hγ}^*$ and $v_{hδ}^*$ composing the rotation voltage is represented by $ω_h \cdot t$ (see FIG. 45). Thus, the phase $ω_h \cdot t$ as observed at time (at which $i_{2h}$ coincides with vc2 shown in FIG. 26; hereinafter referred to as "time T1") at which the magnitude of the resultant vector $i_{2h}$ of $i_{2hγ}$ and $i_{2hδ}$ becomes maximum in one cycle of the high-frequency voltages $v_{hγ}^*$ and $v_{hδ}^*$ is (Δθ+π).

That is, based on the value of the phase $ω_h \cdot t$ as obtained at time T1, it is possible to calculate the magnetic-pole position (i.e. the axis error Δθ) within the range from 0 to 2π. In that case, the magnetic-pole position estimator 18 shown in FIG. 25 can be omitted.

FIG. 45 shows the above-described resultant vectors $v_h^*$ and $i_{2h}$ and the resultant vector $i_h$ of the fundamental-frequency-extracted γ-axis current $i_{hγ}$ and the fundamental-frequency-extracted δ-axis current $i_{hδ}$ in relation to the γ and δ axes. At time T1 at which the direction of the resultant vector $i_{2h}$ indicates (Δθ+π), the directions of $ω_h \cdot t$ and $v_h^*$ also indicate (Δθ+π), and the direction of $i_h$ lags behind $i_{2h}$ by π/2, that is, the direction of $i_h$ indicates (Δθ+π/2).

Thus, it is also possible to calculate the magnetic-pole position within the range from 0 to 2π by calculating arctan $(i_{2hδ}/i_{2hγ})$ or arctan$(v_{hδ}^*/v_{hγ}^*)$ at time T1, because the value thus calculated corresponds to (Δθ+π). Alternatively, it is also possible to calculate the magnetic-pole position within the range from 0 to 2π by calculating arctan$(i_{hδ}/i_{hγ})$ at time T1, because the value thus calculated corresponds to (Δθ+π/2).

The phase $ω_h \cdot t$, arctan$(i_{2hδ}/i_{2hγ})$, or the like, as obtained at time T1 is information indicating not only the inclination of the major axis of the ellipse described by the current vector locus 81i of $i_{2hγ}$ and $i_{2hδ}$ but also the polarity. By exploiting both information, it is possible to estimate the magnetic-pole position within the range from 0 to 2π. Alternatively, by exploiting only the information indicating the inclination of the major axis, it is possible to estimate the magnetic-pole position within the range of ±π/2. Here, "detecting the magnetic-pole position within the range of ±π/2 based on the phase $ω_h \cdot t$, arctan$(i_{2hδ}/i_{2hγ})$, or the like, as obtained at time T1" is conceptually included in "detecting the magnetic-pole position within the range of ±π/2 based on the inclination (or information indicating the inclination) of the major axis of the ellipse described by the current vector locus 81i".

Calculation of the magnetic-pole position based on the phase $ω_h \cdot t$, arctan$(i_{2hδ}/i_{2hγ})$, or the like, is performed particularly accurately when the motor 1 is at standstill or is rotating at low speed (in particular, when the motor 1 is at standstill).

Here, when rotating at low speed, the motor 1 is rotating at a rotation speed sufficiently lower than the frequency of the high-frequency voltage ($v_{hγ}^*$ and $v_{hδ}^*$) applied by the high-frequency voltage generator 22. It should be noted that, when the motor 1 is rotating at low speed, "the real motor speed ω, the estimated motor speed $ω_e$, or an externally-fed specified motor speed value to be kept up with by them" can be regarded as "being equal to or lower than a previously determined speed".

As described above, by estimating the magnetic-pole position by using the second-harmonic-extracted component of the current from which the direct-current component and the low-frequency component are removed, the influence of the drive current or the induction voltage and of the offset of the current sensor (e.g. the current detector 11) on estimation of the magnetic-pole position is suppressed. This makes it possible to perform stable estimation of the magnetic-pole position not only when the motor is at standstill but also when it is rotating.

When the motor 1 is at standstill, the rotation axes such as the d axis, the q axis, the γ axis, and the δ axis are equivalent to the fixed axes fixed to the stator of the motor 1. Furthermore, even when the motor 1 is rotating, so long as it is rotating at a rotation speed sufficiently lower than the frequency of the high-frequency voltage ($v_{hγ}^*$ and $v_{hδ}^*$) applied by the high-frequency voltage generator 22 (so long as it is rotating at low speed), the motor 1 can be regarded as being at standstill at the time of polarity checking or the like (having little influence thereon).

This makes it possible, when the motor 1 is at standstill or is rotating at low speed, to apply the method described in this embodiment not only to the γ and δ axes but also to arbitrary α and β axes that are at right angles to one another and are fixed to the stator of the motor 1. That is, Greek letters "γ" and "δ" in the descriptions heretofore and in FIGS. 25 and 26 can be replaced with "α" and "β", respectively.

Specifically, for example, a high-frequency voltage composed of $v_{hα}^*$ and $v_{hβ}^*$ is applied to the motor 1 as a detection voltage. The high-frequency voltages $v_{hα}^*$ and $v_{hβ}^*$ are an α-axis component and a β-axis component, respectively, of the high-frequency voltage serving as a detection voltage, and the voltage vector locus of the high-frequency voltages $v_{hα}^*$ and $v_{hβ}^*$ describes, for example, on the α-β axes, a perfect circle having its center at the origin, or an ellipse that has its center at the origin and that has the minor or major axis thereof on the α axis. The three-phase current that flows through the motor 1 is converted into a two-phase current that consists of, as an α-axis component and a β-axis component thereof, an α-axis current $i_α$ and a β-axis current $i_β$. Then, with the filter characteristics which are the same as those of the second-harmonic BPF 19a used for extraction of the second-harmonic-extracted γ-axis current $i_{2hγ}$ from the γ-axis current $i_γ$, a high-frequency second-harmonic component (a frequency component of 2×ω$_h$) of the α-axis current i$_α$ and the β-axis current i$_β$ is extracted (enhanced). As a result, a second-harmonic-extracted α-axis current i$_{2hα}$ and a second-harmonic-extracted β-axis current i$_{2hβ}$ are obtained.

Hence, the current vector locus of the resultant vector of the second-harmonic-extracted α-axis current i$_{2hα}$ and the second-harmonic-extracted β-axis current i$_{2hβ}$ describes, on the α-β axes, an ellipse. Thus, based on the magnitudes (i.e. which is greater than the other) of two current vectors (corresponding to vc1 and vc2 shown in FIG. 26) lying along the major-axis direction of the ellipse, it is possible to perform checking of the polarity. Moreover, based on the phase ω$_h$·t, arctan(i$_{2hβ}$/i$_{2hα}$), or the like, as obtained at time at which the magnitude of the resultant vector of i$_{2hα}$ and i$_{2hβ}$ becomes maximum, it is possible to estimate the magnetic-pole position. Calculation of the magnetic-pole position is performed particularly accurately when the motor 1 is at standstill or is rotating at low speed (in particular, when the motor 1 is at standstill).

Third Embodiment

Figure 28:
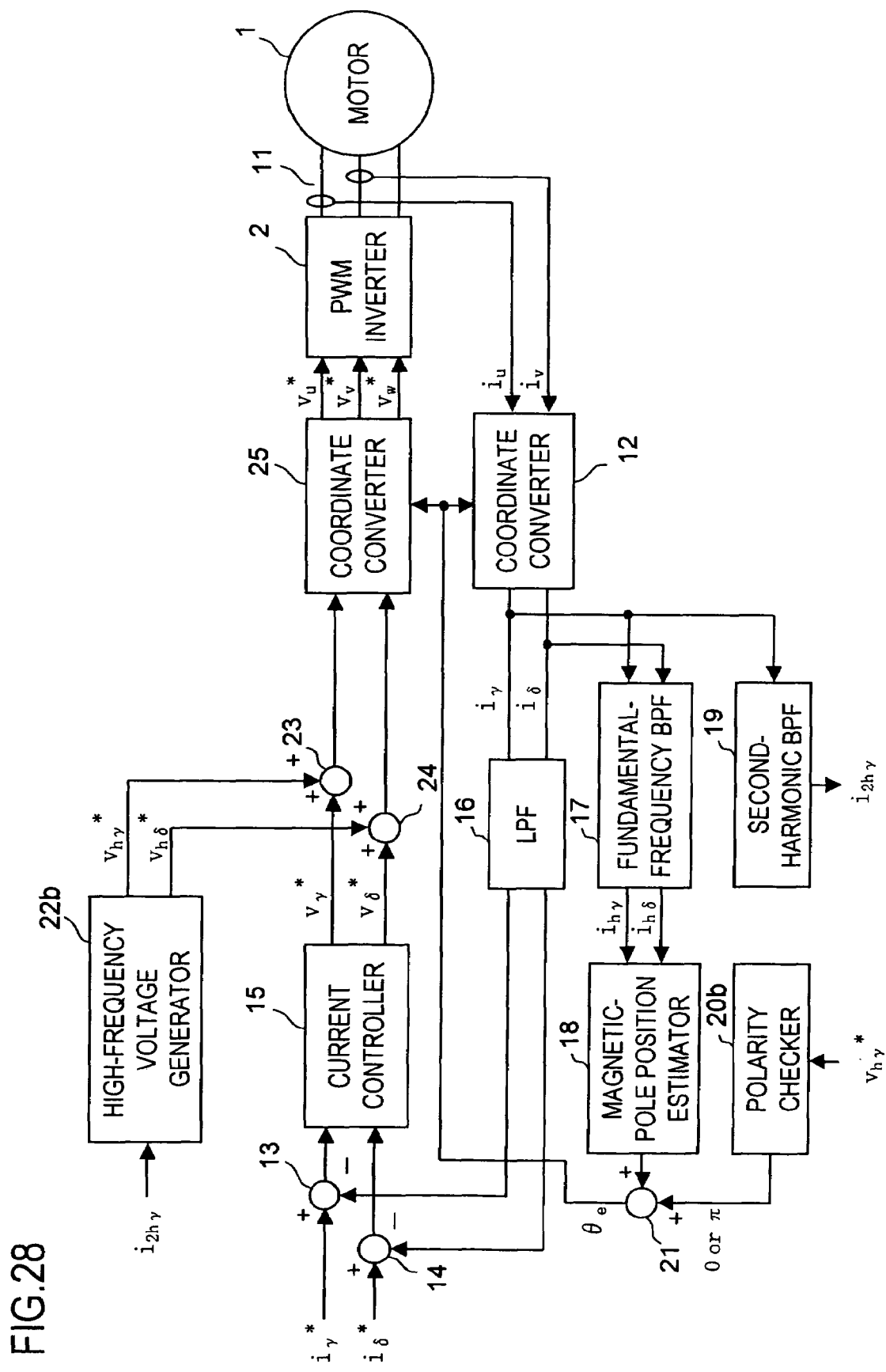
FIG. 28 is a configuration block diagram of the motor drive system of a third embodiment of the present invention.

Next, a third embodiment of the present invention will be described. FIG. 28 is a configuration block diagram of the motor drive system of the third embodiment. The driving control device of this embodiment differs from the driving control device shown in FIG. 3 only in that a polarity checker 20 and a high-frequency voltage generator 22 shown in FIG. 3 are replaced with a polarity checker 20b and a high-frequency voltage generator 22b. In other respects, the driving control device of this embodiment is the same as the driving control device (of the first embodiment) shown in FIG. 3. In FIG. 28, such functional blocks as are found also in the figures (e.g. FIG. 3) of the already-described embodiments are identified with the same reference numerals, and their explanations in principle will not be repeated.

As is the case with the high-frequency voltage generator 22 shown in FIG. 3, the high-frequency voltage generator 22b generates high-frequency voltages v$_{hγ}$* and v$_{hδ}$* composing a detection voltage, and then outputs them to the adders 23 and 24, respectively. At this point, the high-frequency voltages v$_{hγ}$* and v$_{hδ}$* (in particular, the amplitude of v$_{hγ}$*) are controlled so that the difference between the positive and negative amplitudes of the second-harmonic-extracted γ-axis current i$_{2hγ}$ extracted by the second-harmonic BPF 19 is eliminated.

Figure 29:
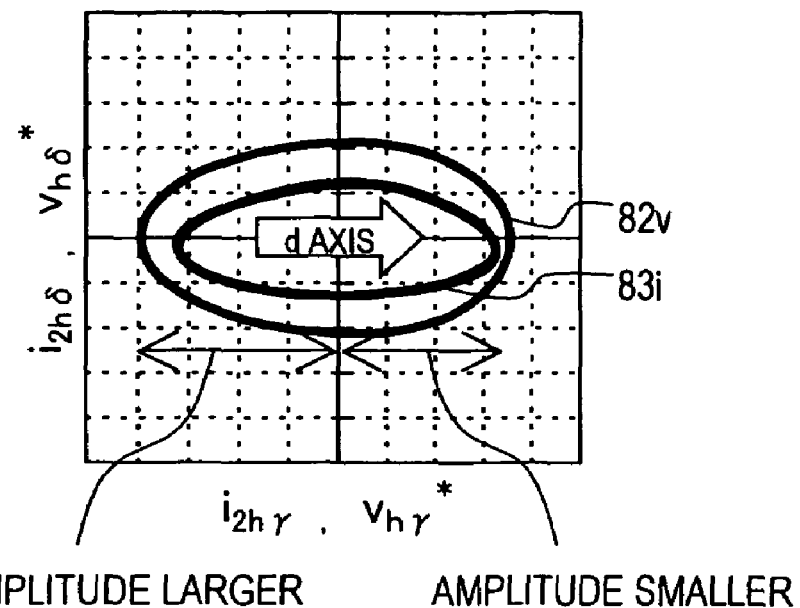
FIG. 29 is a diagram showing the relationship between the vector locus of the high-frequency voltage generated by the high-frequency voltage generator shown in FIG. 28 and the vector locus of the current second-harmonic component.
Figure 30:
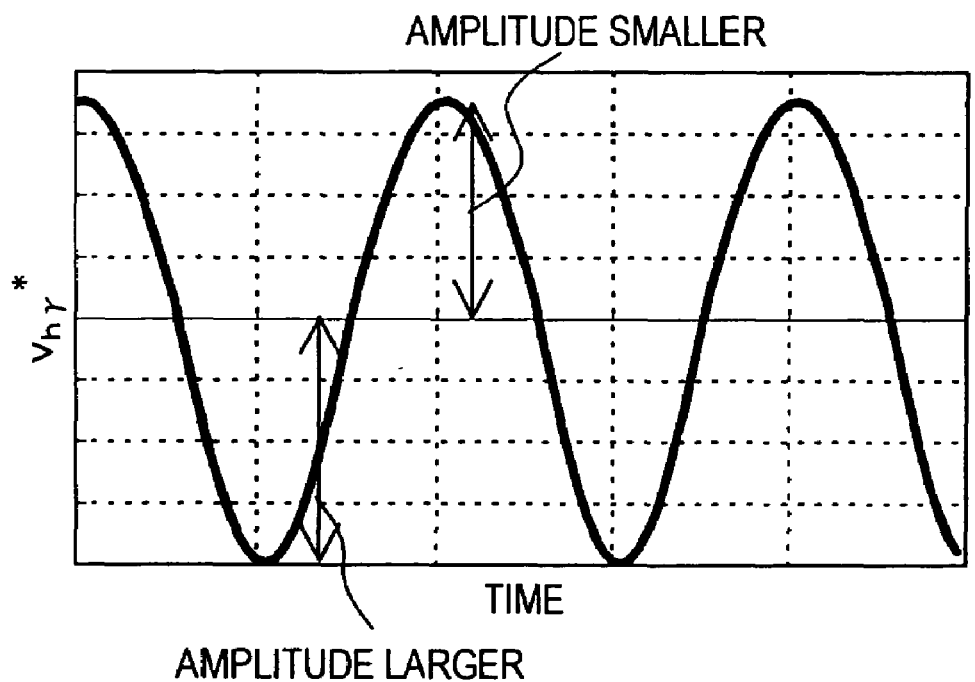
FIG. 30 is a diagram showing the waveform of a γ-axis component of the high-frequency voltage outputted from the high-frequency voltage generator shown in FIG. 28.

In FIG. 29, the voltage vector locus of the high-frequency voltages v$_{hγ}$* and v$_{hδ}$* outputted from the high-frequency voltage generator 22b is indicated by a locus 82v, and the current vector locus of the second-harmonic-extracted γ-axis current i$_{2hγ}$ and the second-harmonic-extracted δ-axis current i$_{2hδ}$ is indicated by a locus 83i. FIG. 30 shows the waveform of the high-frequency voltage v$_{hγ}$* outputted from the high-frequency voltage generator 22b. It is to be noted that, as indicated in FIG. 29, this embodiment deals with a case where the directions of the γ axis and the d axis (substantially) coincide with each other.

As indicated by the locus 83i in FIG. 29, the difference between the positive and negative amplitudes of the second-harmonic-extracted γ-axis current i$_{2hγ}$ is (substantially) zero. The control performed so as to make the difference in amplitude zero and magnetic saturation caused by application of the high-frequency voltages v$_{hγ}$* and v$_{hδ}$* result in the difference between the positive and negative amplitudes of the high-frequency γ-axis voltage v$_{hγ}$*. In the example shown in FIGS. 29 and 30, the directions of the γ axis and d axis coincide with each other, and comparison between the positive and negative amplitudes of the high-frequency γ-axis voltage v$_{hγ}$* shows that the positive amplitude is smaller than the negative amplitude.

If the comparison between the positive and negative amplitudes of the high-frequency voltage v$_{hγ}$* shows that the positive amplitude is smaller than the negative amplitude, the polarity checker 20b outputs an electrical angle 0 to the adder 21 as a correction phase angle; if the comparison shows that the negative amplitude is smaller than the positive amplitude, the polarity checker 20b outputs an electrical angle π to the adder 21 as a correction phase angle.

Even with the configuration of this embodiment, checking of the polarity is performed by using a second-harmonic-extracted component of current. This makes it possible to achieve the same effects as those achieved in the first embodiment, and thereby offer stable polarity checking.

Alternatively, the polarity checker 20b may be configured in the same manner as the polarity checker 20 shown in FIG. 17. That is, checking of the polarity may be performed based on a direct-current component of a value obtained by multiplying the high-frequency γ-axis voltage v$_{hγ}$* by cos 2ω$_h$t, or the like.

FIGS. 29 and 30 show an example in which the high-frequency voltage composed of v$_{hγ}$* and v$_{hδ}$* serving as a detection voltage is a rotation voltage on the γ-δ axes. It is to be noted, however, that the high-frequency voltage composed of v$_{hγ}$* and v$_{hδ}$* may be an alternating voltage because, also in this case, differences occur in the positive and negative amplitudes of v$_{hγ}$* according to the polarity. Here, the alternating voltage is assumed to be an alternating voltage on the γ axis (that is, v$_{hδ}$*=0), for example. However, any other alternating voltage may be adopted unless it is an alternating voltage on the δ axis (that is, as long as v$_{hγ}$*≠0).

Fourth Embodiment

Figure 31:
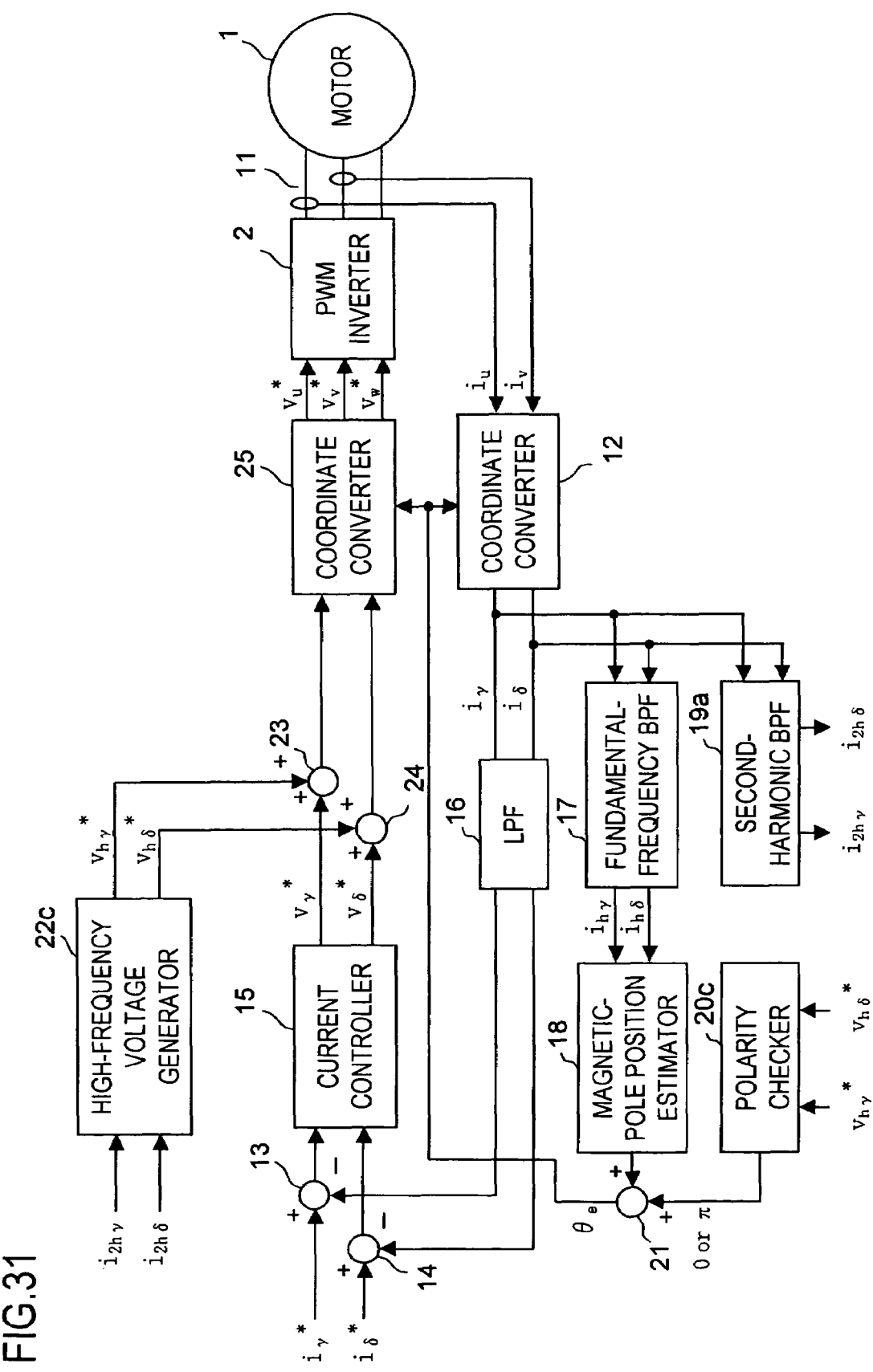
FIG. 31 is a configuration block diagram of the motor drive system of a fourth embodiment of the present invention.

Next, a fourth embodiment of the present invention will be described. FIG. 31 is a configuration block diagram of the motor drive system of the fourth embodiment. As is the case with the second embodiment which is a modification of the first embodiment, this embodiment is a modification of the third embodiment, and this embodiment can be adopted even when the d axis and the γ axis are displaced from each other to a relatively large extent.

The driving control device of this embodiment differs from the driving control device shown in FIG. 3 only in that a second-harmonic BPF 19, a polarity checker 20, and a high-frequency voltage generator 22 shown in FIG. 3 are replaced with a second-harmonic BPF 19a, a polarity checker 20c, and a high-frequency voltage generator 22c. In other respects, the driving control device of this embodiment is the same as the driving control device (of the first embodiment) shown in FIG. 3. In FIG. 31, such functional blocks as are found also in the figures (e.g. FIG. 3 and FIG. 25) of the already-described embodiments are identified with the same reference numerals, and their explanations in principle will not be repeated.

As is the case with the high-frequency voltage generator 22 shown in FIG. 3, the high-frequency voltage generator 22c generates high-frequency voltages v$_{hγ}$* and v$_{hδ}$* composing a rotation voltage serving as a detection voltage, and then outputs them to the adders 23 and 24, respectively. At this point, the high-frequency voltages v$_{hγ}$* and v$_{hδ}$* are controlled so that the difference between the positive and negative amplitudes of the second-harmonic-extracted γ-axis current i$_{2hγ}$ extracted by the second-harmonic BPF 19a and the difference between the positive and negative amplitudes of the second-harmonic-extracted δ-axis current i$_{2hδ}$ extracted by the second-harmonic BPF 19a are eliminated, and that the amplitudes of the second-harmonic-extracted γ-axis current $i_{2h\gamma}$ and the second-harmonic-extracted δ-axis current $i_{2h\delta}$ are made equal to each other. However, as will be described later, the amplitudes of the second-harmonic-extracted γ-axis current $i_{2h\gamma}$ and the second-harmonic-extracted δ-axis current $i_{2h\delta}$ are not necessarily made equal to each other.

Figure 32:
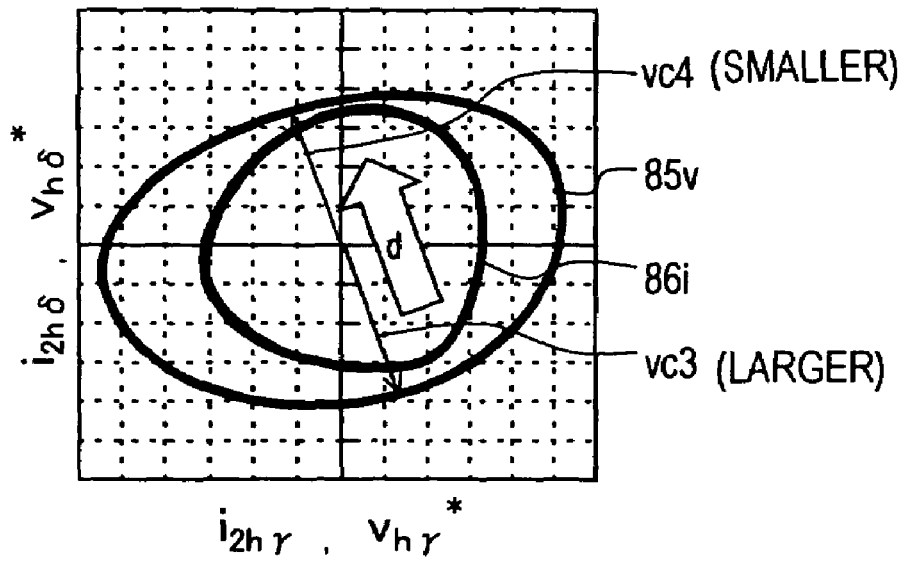
FIG. 32 is a diagram showing the relationship between the vector locus of the high-frequency voltage generated by the high-frequency voltage generator shown in FIG. 31 and the vector locus of the current second-harmonic component.
Figure 33:
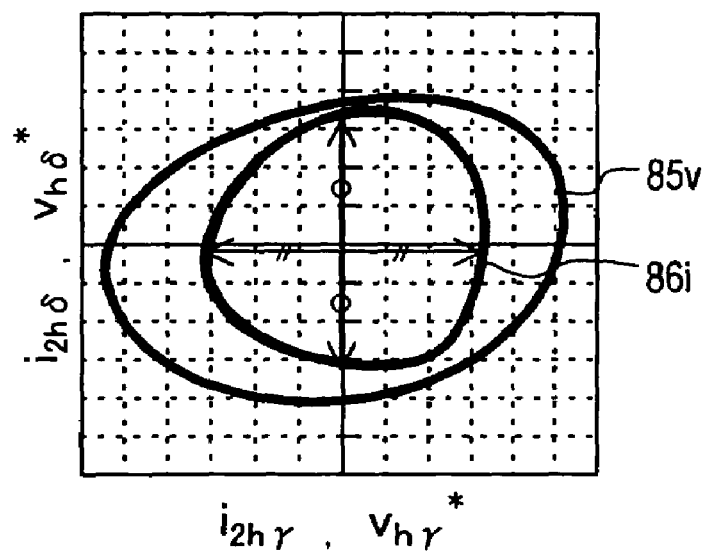
FIG. 33 is a diagram showing the relationship between the vector locus of the high-frequency voltage generated by the high-frequency voltage generator shown in FIG. 31 and the vector locus of the current second-harmonic component.

FIGS. 32 and 33 show the voltage vector locus 85v of the high-frequency voltages $v_{h\gamma}^*$ and $v_{h\delta}^*$ on the γ-δ axes and the current vector locus 86i of the second-harmonic-extracted γ-axis current $i_{2h\gamma}$ and the second-harmonic-extracted δ-axis current $i_{2h\delta}$ on the γ-δ axes. The current vector locus 86i describes substantially an ellipse on the γ-δ axes, and, as shown in FIG. 33, the difference between the positive and negative amplitudes of the second-harmonic-extracted γ-axis current $i_{2h\gamma}$ and the difference between the positive and negative amplitudes of the second-harmonic-extracted γ-axis current $i_{2h\delta}$ are both (substantially) zero.

In this case, the voltage vector locus 85v describes (substantially) an ellipse on the γ-δ axes, and the minor-axis direction of the ellipse coincides with the d-axis direction (this equally applies to a case where the motor 1 is a non-salient pole motor). Due to magnetic saturation, differences occur in the magnitudes of the two vectors vc3 and vc4 that make up the locus 85v and lie along the minor-axis direction of the ellipse.

The vectors vc3 and vc4 are each a resultant vector $v_h^*$ of the high-frequency voltages $v_{h\gamma}^*$ and $v_{h\delta}^*$, the resultant vector $v_h^*$ having its tail at the origin and extending along the minor-axis direction of the ellipse described by the locus 85v. In FIG. 32, the vector vc3 extends in the γ-δ coordinate system from the origin toward the fourth quadrant, and the vector vc4 extends in the γ-δ coordinate system from the origin toward the second quadrant. Now, as shown in FIG. 32, when the direction of the d-axis is a direction that points from the origin to the second quadrant, the magnitude of the vector vc3 is made greater than the magnitude of the vector vc4.

Exploiting this relationship, the polarity checker 20c performs checking of the polarity, and feeds to the adder 21 a correction phase angle of 0 or π. That is, based on the magnitude of the resultant vector $v_h^*$ (the magnitude of the combined voltage, i.e. the magnitude of the rotation voltage) in one cycle of the high-frequency voltages $v_{h\gamma}^*$ and $v_{h\delta}^*$, the polarity checker 20c performs checking of the polarity. More specifically, the polarity checker 20c judges that the direction of the phase angle (in FIG. 32, the direction of the vector vc4) at which the magnitude of the resultant vector $v_h^*$ becomes minimum in one cycle of the high-frequency voltages $v_{h\gamma}^*$ and $v_{h\delta}^*$ is the direction of the d axis (this equally applies to a case where the motor 1 is a non-salient pole motor). In the example shown in FIG. 32, when the resultant vector $v_h^*$ coincides with the vector vc4, the magnitude of the resultant vector $v_h^*$ becomes minimum.

Even with the configuration of this embodiment, checking of the polarity is performed by using a second-harmonic-extracted component of current. This makes it possible to achieve the same effects as those achieved in the first embodiment, and thereby offer stable polarity checking.

It should be noted that the current vector locus 86i may be appropriately deformed unless the amplitude of the resultant vector $v_h^*$ of $v_{h\gamma}^*$ and $v_{h\delta}^*$ in the d-axis direction is equal to or larger than the amplitude thereof in the q-axis direction. That is, the amplitude of the second-harmonic-extracted γ-axis current $i_{2h\gamma}$ and the amplitude of the second-harmonic-extracted δ-axis current $i_{2h\delta}$ may be different so long as the d-axis direction coincides with the minor-axis direction of the voltage vector locus 85v.

As described in the second embodiment, the phase $\theta_h$ of the high-frequency voltages $v_{h\gamma}^*$ and $v_{h\delta}^*$ that is required to generate the values of the high-frequency voltages $v_{h\gamma}^*$ and $v_{h\delta}^*$ is set relative to the γ-axis, and, at time "t", the phase of the resultant vector $v_h^*$ of the high-frequency voltages $v_{h\gamma}^*$ and $v_{h\delta}^*$ composing the rotation voltage is represented by $\omega_h \cdot t$ (see FIG. 45). Thus, the phase $\omega_h \cdot t$ as observed at time (at which $v_h^*$ coincides with vc4 shown in FIG. 32; hereinafter referred to as "time T2") at which the magnitude of the resultant vector $v_h^*$ of $v_{h\gamma}^*$ and $v_{h\delta}^*$ becomes minimum in one cycle of the high-frequency voltages $v_{h\gamma}$ and $v_{h\delta}^*$ is Δθ.

That is, based on the value of the phase $\omega_h \cdot t$ as obtained at time T2, it is possible to calculate the magnetic-pole position (i.e. the axis error Δθ) within the range from 0 to 2π. In that case, the magnetic-pole position estimator 18 shown in FIG. 31 can be omitted.

At time T2 at which the direction of the resultant vector $v_h^*$ indicates Δθ, the directions of $\omega_h \cdot t$ and $i_{2h}$ (the resultant vector of $i_{2h\gamma}$ and $i_{2h\delta}$) also indicate Δθ, and the direction of $i_h$ (the resultant vector of $i_{h\gamma}$ and $i_{h\delta}$) lags behind $i_{2h}$ by π/2, that is, the direction of $i_h$ indicates (Δθ−π/2).

Thus, as will be understood from FIG. 45, it is also possible to calculate the magnetic-pole position within the range from 0 to 2π by calculating $\arctan(i_{2h\delta}/i_{2h\gamma})$ or $\arctan(v_{h\delta}^*/v_{h\gamma}^*)$ at time T2, because the value thus calculated corresponds to Δθ. Alternatively, it is also possible to calculate the magnetic-pole position within the range from 0 to 2π by calculating $\arctan(i_{h\delta}/i_{h\gamma})$ at time T2, because the value thus calculated corresponds to (Δθ−π/2).

The phase $\omega_h \cdot t$, $\arctan(i_{2h\delta}/i_{2h\gamma})$, or the like, as obtained at time T2 is information indicating not only the inclination of the minor axis of the ellipse described by the voltage vector locus 85v of the high-frequency voltages $v_{h\gamma}^*$ and $v_{h\delta}^*$ (composing the rotation voltage) but also the polarity. By exploiting both information, it is possible to estimate the magnetic-pole position within the range from 0 to 2π. Alternatively, by exploiting only the information indicating the inclination of the minor axis, it is possible to estimate the magnetic-pole position within the range of ±π/2. Here, "detecting the magnetic-pole position within the range of ±π/2 based on the phase $\omega_h \cdot t$, $\arctan(i_{2h\delta}/i_{2h\gamma})$, or the like, as obtained at time T2" is conceptually included in "detecting the magnetic-pole position within the range of ±π/2 based on the information (or information indicating the inclination) of the minor axis of the ellipse described by the voltage vector locus 85v".

Calculation of the magnetic-pole position based on the phase $\omega_h \cdot t$, $\arctan(i_{2h\delta}/i_{2h\gamma})$, or the like, is performed particularly accurately when the motor 1 is at standstill or is rotating at low speed (in particular, when the motor 1 is at standstill).

Estimation of the magnetic-pole position is performed, even when based on the inclination of the minor axis of the ellipse described by the voltage vector locus 85v, by using a second-harmonic-extracted component of current. This makes it possible to achieve the same effects as those achieved in the second embodiment, and thereby offer stable estimation of the magnetic-pole position.

As is the case with the second embodiment, when the motor 1 is at standstill or is rotating at low speed, the method described in this embodiment can be applied not only to the γ and δ axes but also to arbitrary α and β axes that are at right angles to one another and are fixed to the stator of the motor 1. That is, Greek letters "γ" and "δ" in the descriptions heretofore and in FIGS. 31 to 33 can be replaced with "α" and "β", respectively.

Specifically, for example, based on a second-harmonic-extracted γ-axis current $i_{2h\alpha}$ and a second-harmonic-extracted β-axis current $i_{2h\beta}$, a rotation voltage composed of high-frequency voltages $v_{h\alpha}^*$ and $v_{h\beta}^*$ is applied to the motor 1 as a detection voltage. The high-frequency voltages $v_{h\alpha}^*$ and $v_{h\beta}^*$ are an $\alpha$-axis component and a $\beta$-axis component, respectively, of the high-frequency voltage serving as a detection voltage. The three-phase current that flows through the motor 1 is converted into a two-phase current that consists of, as an $\alpha$-axis component and a $\gamma$-axis component thereof, an $\alpha$-axis current $i_\alpha$ and a $\beta$-axis current $i_\beta$. Then, with the filter characteristics which are the same as those of the second-harmonic BPF 19a used for extraction of the second-harmonic-extracted $\gamma$-axis current $i_{2h\gamma}$ from the $\gamma$-axis current $i_\gamma$, a high-frequency second-harmonic component (a frequency component of $2\times\omega_h$) of the $\alpha$-axis current $i_\alpha$ and the $\beta$-axis current $i_\beta$ is extracted (enhanced). As a result, a second-harmonic-extracted $\alpha$-axis current $i_{2h\alpha}$ and a second-harmonic-extracted $\beta$-axis current $i_{2h\beta}$ are obtained.

The high-frequency voltages $v_{h\alpha}^*$ and $v_{h\beta}^*$ are controlled so that the difference between the positive and negative amplitudes of the second-harmonic-extracted $\alpha$-axis current $i_{2h\alpha}$ and the difference between the positive and negative amplitudes of the second-harmonic-extracted $\beta$-axis current $i_{2h\beta}$ are eliminated, and that the amplitudes of the second-harmonic-extracted $\alpha$-axis current $i_{2h\alpha}$ and the second-harmonic-extracted $\beta$-axis current $i_{2h\beta}$ are made to equal to each other. However, the amplitudes of the second-harmonic-extracted $\alpha$-axis current $i_{2h\alpha}$ and the second-harmonic-extracted $\beta$-axis current $i_{2h\beta}$ are not necessarily made equal to each other.

Hence, the voltage vector locus of the resultant vector of the high-frequency voltages $v_{h\alpha}$ and $v_{h\beta}^*$ describes, on the $\alpha$-$\beta$ axes, (substantially) an ellipse. Thus, based on the magnitudes (i.e. which is greater than the other) of two voltage vectors (corresponding to vc3 and vc4 shown in FIG. 32) lying along the minor-axis direction of the ellipse, it is possible to perform checking of the polarity.

Moreover, based on the phase $\omega_h \cdot t$, $\arctan(i_{2h\beta}/i_{2h\alpha})$, or the like, as obtained at time at which the magnitude of the resultant vector of the high-frequency voltages $v_{h\alpha}^*$ and $v_{h\beta}^*$ becomes minimum, it is possible to estimate the magnetic-pole position. Calculation of the magnetic-pole position is performed particularly accurately when the motor 1 is at standstill or is rotating at low speed (in particular, when the motor 1 is at standstill).

Fifth Embodiment

Figure 34:
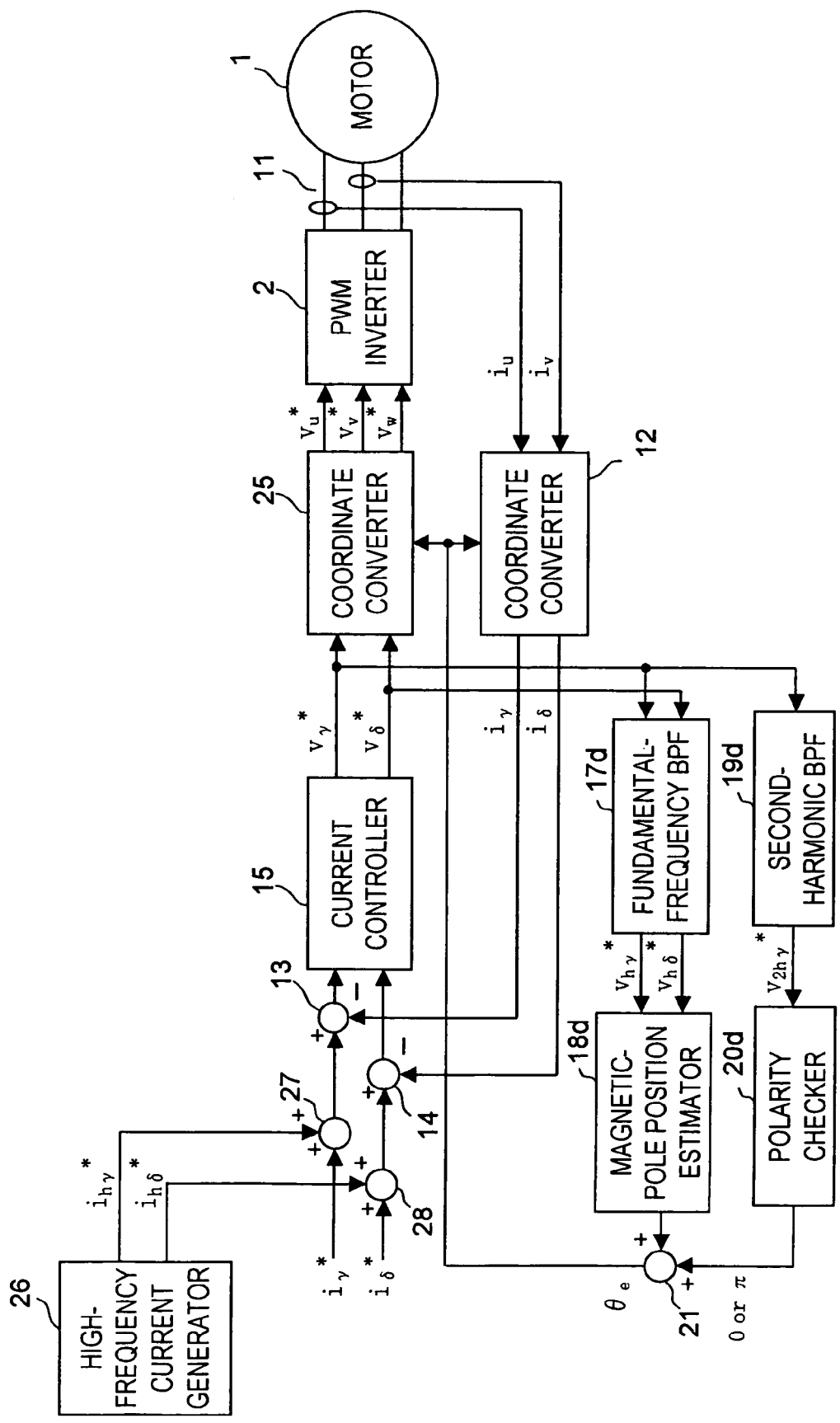
FIG. 34 is a configuration block diagram of the motor drive system of a fifth embodiment of the present invention.

Next, a fifth embodiment of the present invention will be described. FIG. 34 is a configuration block diagram of the motor drive system of the fifth embodiment. In FIG. 34, such functional blocks as are found also in the figures (e.g. FIG. 3) of the already-described embodiments are identified with the same reference numerals, and their explanations in principle will not be repeated.

The driving control device of this embodiment is composed of a current detector 11, a coordinate converter 12, subtracters 13 and 14, a current controller 15, a fundamental-frequency BPF (band-pass filter) 17d, a magnetic-pole position estimator 18d, a second-harmonic BPF (band-pass filter) 19d, a polarity checker 20d, an adder 21, a coordinate converter 25, a high-frequency current generator 26, and adders 27 and 28.

The high-frequency current generator 26 generates a high-frequency $\gamma$-axis current (high-frequency specified $\gamma$-axis current value) $i_{h\gamma}^*$ and a high-frequency $\delta$-axis current (high-frequency specified $\delta$-axis current value) $i_{h\delta}^*$, and then outputs them to the adders 27 and 28, respectively. The high-frequency $\gamma$-axis current $i_{h\gamma}^*$ and the high-frequency $\delta$-axis current $i_{h\delta}^*$ are a $\gamma$-axis component and a $\delta$-axis component, respectively, of a high-frequency current serving as a detection current that is fed to the motor 1 for the purpose of checking the polarity of the rotor, for example. Hereinafter, the high-frequency $\gamma$-axis current $i_{h\gamma}^*$ and the high-frequency $\delta$-axis current $i_{h\delta}^*$ will be referred to simply as the high-frequency current $i_{h\gamma}^*$ and the high-frequency current $i_{h\delta}^*$, respectively. The high-frequency currents $i_{h\gamma}^*$ and $i_{h\delta}^*$ can be regarded as a superposed current to be superposed on the specified $\gamma$-axis current value $i_\gamma^*$ and a superposed current to be superposed on the specified $\delta$-axis current value $i_\delta^*$, respectively.

The adder 27 calculates the sum of the specified $\gamma$-axis current value $i_\gamma^*$ and the high-frequency $\gamma$-axis current $i_{h\gamma}^*$. The adder 28 calculates the sum of the specified $\delta$-axis current value $i_\delta^*$ and the high-frequency $\delta$-axis current $i_{h\delta}^*$. The subtracter 13 calculates the current error between the addition result $(i_\gamma^* + i_{h\gamma}^*)$ calculated by the adder 27 and the $\gamma$-axis current $i_\gamma$ from the coordinate converter 12. The subtracter 14 calculates the current error between the addition result $(i_\delta^* + i_{h\delta}^*)$ calculated by the adder 28 and the $\delta$-axis current $i_\delta$ from the coordinate converter 12.

Upon receiving the current errors calculated by the subtracters 13 and 14, the current controller 15 outputs a specified $\gamma$-axis voltage value $v_\gamma^*$ and a specified $\delta$-axis voltage value $v_\delta^*$ such that each current error keeps up with zero. At this point, the $\gamma$-axis current $i_\gamma$ and the $\delta$-axis current $i_\delta$ outputted from the coordinate converter 12 are referable.

Based on the estimated magnetic-pole position $\theta_e$ fed from the adder 21, the coordinate converter 25 converts backward the two-phase specified voltage values, the specified $\gamma$-axis voltage value $v_\gamma^*$ and the specified $\delta$-axis voltage value $v_\delta^*$; thereby the coordinate converter 25 produces specified three-phase voltage values consisting of a specified U-phase voltage value $v_u^*$, a specified V-phase voltage value $v_v^*$, and a specified W-phase voltage value $v_w^*$, which represent the U-phase component, the V-phase component, and the W-phase component of the motor voltage $V_a$, and then outputs them to the PWM inverter 2. The backward conversion here is performed according to formula (3), consisting of two equations, below.

$$\begin{bmatrix} v_u^* \\ v_v^* \end{bmatrix} = \sqrt{\frac{2}{3}} \begin{bmatrix} \cos\theta_e & -\sin\theta_e \\ \cos(\theta_e - 2\pi/3) & -\sin(\theta_e - 2\pi/3) \end{bmatrix} \begin{bmatrix} v_\gamma^* \\ v_\delta^* \end{bmatrix} \quad (3)$$

$$v_w^* = -(v_u^* + v_v^*)$$

The current represented by the specified $\gamma$-axis current value $i_\gamma^*$ and the specified $\delta$-axis current value $i_\delta^*$ is the drive current for driving the motor 1, and the current represented by the high-frequency currents $i_{h\gamma}^*$ and $i_{h\delta}^*$ is the detection current for detecting the polarity (and the magnetic-pole position) of the rotor of the motor 1. The high-frequency current composed of $i_{h\gamma}^*$ and $i_{h\delta}^*$ is a high-frequency alternating current or a high-frequency rotation current. Here, "high-frequency" denotes that the frequency of the high-frequency currents $i_{h\gamma}^*$ and $i_{h\delta}^*$ is sufficiently higher than that of the drive current. Hereinafter, as is the case with the frequency of the high-frequency voltages $v_{h\gamma}^*$ and $v_{h\delta}^*$ described in the first to fourth embodiments, the frequency of the high-frequency currents $i_{h\gamma}^*$ and $i_{h\delta}^*$ is represented by $\omega_h$. It should be noted that, since the alternating current and the rotation current described above are high-frequency currents that are not synchronized with the motor 1, feeding of these currents does not rotate the motor 1 (or hardly rotates the motor 1).

The voltage represented by the specified γ-axis voltage value $v_\gamma^*$ and the specified δ-axis voltage value $v_\delta^*$ contains the drive voltage applied to the motor 1 to pass therethrough the drive current, and the detection voltage applied to the motor 1 to pass therethrough the detection current.

A high-frequency current flows through the motor 1 according to the superposition of the high-frequency currents $i_{h\gamma}^*$ and $i_{h\delta}^*$. The values of the high-frequency currents $i_{h\gamma}^*$ and $i_{h\delta}^*$ are so set that, when the direction of the magnetic flux of the rotor (the magnetic flux produced by the permanent magnet 1a) coincides with the direction of the magnetic flux of the stator (the magnetic flux produced by the armature winding provided in the stator of the motor 1), a γ-axis component of the high-frequency current causes magnetic saturation in the motor 1.

The second-harmonic BPF 19d is a band-pass filter that receives as an input signal the specified γ-axis voltage value $v_\gamma^*$ and that has a passband including a frequency of $(2\times\omega_h)$. The second-harmonic BPF 19d extracts (enhances) the high-frequency second-harmonic component (a frequency component of $2\times\omega_h$) of the specified γ-axis voltage value $v_\gamma^*$, and outputs the signal obtained by the extraction as a second-harmonic-extracted γ-axis voltage (second-harmonic-extracted specified γ-axis voltage value) $v_{2h\gamma}^*$. The second-harmonic BPF 19d does not necessarily have to have a frequency of $(2\times\omega_h)$ as its passband center frequency, but should not allow low frequencies to pass therethrough including a frequency of the direct current and the drive current (corresponding to $i_\gamma^*$ and $i_\delta^*$). For example, the lower cutoff frequency of the passband of the second-harmonic BPF 19d is chosen from a frequency range below $2\times\omega_h$ and above a frequency of the drive current of the motor 1.

Figure 35:
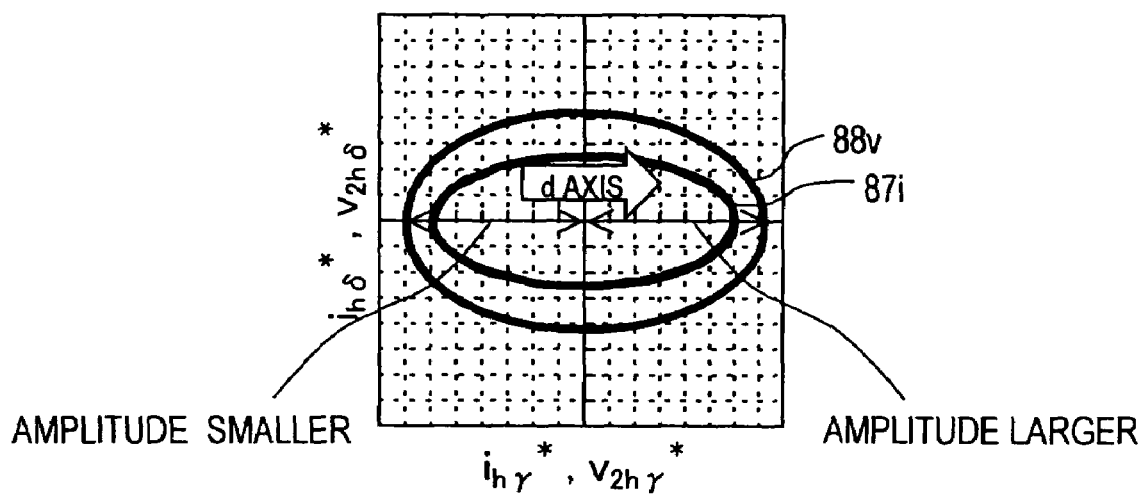
FIG. 35 is a diagram showing the relationship between the vector locus of the high-frequency current generated by the high-frequency current generator shown in FIG. 34 and the vector locus of the voltage second-harmonic component.

In FIG. 35, where the horizontal axis represents the γ-axis and the vertical axis represents the δ-axis, a locus 87i represents a current vector locus (a current vector locus of the resultant vector) of the high-frequency currents $i_{h\gamma}^*$ and $i_{h\delta}^*$, and a locus 88v represents a voltage vector locus (a voltage vector locus of the resultant vector) of the second-harmonic-extracted γ-axis voltage $v_{2h\gamma}^*$ and the second-harmonic-extracted δ-axis voltage $v_{2h\delta}^*$. As is the case with the second-harmonic-extracted γ-axis voltage $v_{2h\gamma}^*$ extracted from the specified γ-axis voltage value $v_\gamma^*$, the second-harmonic-extracted δ-axis voltage (second-harmonic-extracted specified δ-axis voltage value) $v_{2h\delta}^*$ is obtained by extracting the second-harmonic component from the specified δ-axis voltage value $v_\delta^*$ (how it is extracted will be described in detail in the following sixth embodiment). The waveform 89 shown in FIG. 36D indicates the time variation of the second-harmonic-extracted γ-axis voltage $v_{2h\gamma}^*$ corresponding to the voltage vector locus 88v.

FIGS. 35 and 36 show an example of a case where the high-frequency current that is composed of $i_{h\gamma}^*$ and $i_{h\delta}^*$ and serves as a detection current is a rotation current, and the directions of the d axis and the γ axis substantially coincide with each other. The current controller 15 generates the specified γ-axis voltage value $v_\gamma^*$ (and the specified δ-axis voltage value $v_\delta^*$) such that $(i_{h\gamma}^* + i_\gamma^* - i_\gamma)$ keeps up with zero. As a result, as shown in FIG. 35, the motor 1 is fed with the voltage with which the difference between the positive and negative amplitudes of the high-frequency γ-axis current $i_{h\gamma}^*$ becomes zero (or substantially zero).

Even when the difference between the positive and negative amplitudes of the high-frequency γ-axis current $i_{h\gamma}^*$ is zero, magnetic saturation causes differences in the positive and negative amplitudes of the second-harmonic-extracted γ-axis voltage $v_{2h\gamma}^*$. In the example of the configuration of this embodiment, when the directions of the d axis and the γ axis (substantially) coincide with each other, the positive amplitude of the second-harmonic-extracted γ-axis voltage $v_{2h\gamma}^*$ is larger than the negative amplitude thereof.

Figure 36A:
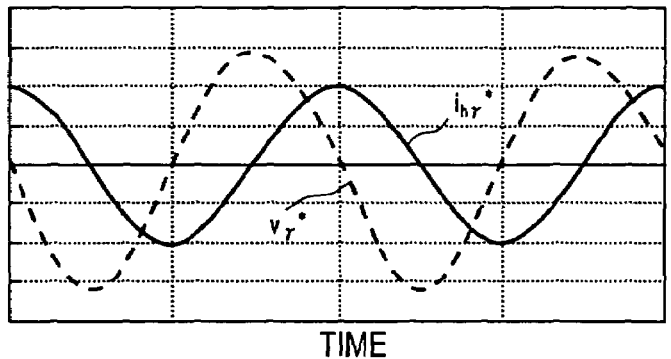
FIG. 36 is a diagram showing, for example, the waveform of the second-harmonic-extracted γ-axis voltage obtained by enhancing a second-harmonic component of a γ-axis component of the voltage applied to the motor shown in FIG. 34.
Figure 36B:
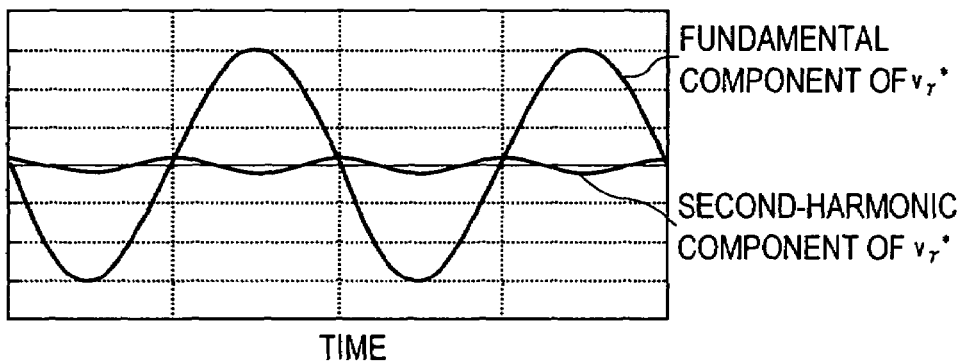

The operation of the second-harmonic BPF 19d will be described in detail, taking up a case in which the γ axis and the d axis (substantially) coincide with each other, the motor 1 is at standstill, and no drive voltage is applied. In this case, as shown in FIG. 36A, the phase of $v_\gamma^*$ leads the phase of $i_{h\gamma}^*$ by $\pi/2$, and the positive amplitude of $v_\gamma^*$ is slightly smaller than the negative amplitude thereof. If $v_\gamma^*$ is resolved into a fundamental component (a frequency component of $1\times\omega_h$) and a second-harmonic component (a frequency component of $2\times\omega_h$), the waveform shown in FIG. 36B results. Conversely, if the fundamental component and the second-harmonic component of $v_\gamma^*$ shown in FIG. 36B are synthesized, the waveform of $v_\gamma^*$ whose positive amplitude is smaller than the negative amplitude results.

Figure 36C:
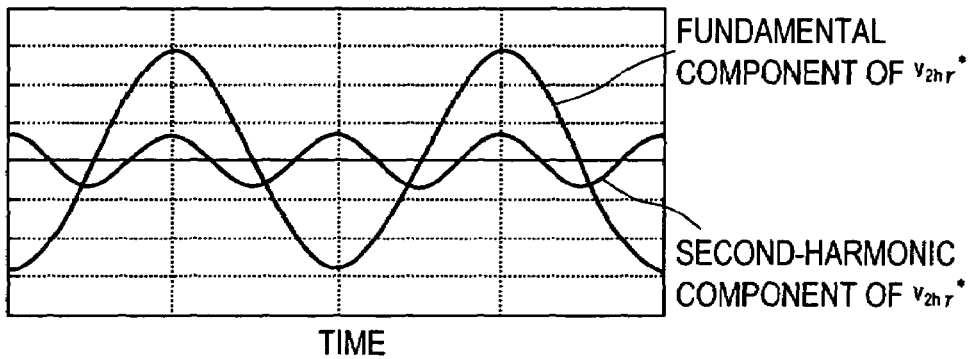

The second-harmonic BPF 19d is provided to enhance the second-harmonic component of $v_\gamma^*$. FIG. 36C shows the waveforms of the fundamental component and the second-harmonic component of the second-harmonic-extracted γ-axis voltage $v_{2h\gamma}^*$ obtained by enhancing the second-harmonic component of $v_\gamma^*$. The amplitude of the second-harmonic component of $v_{2h\gamma}^*$, which serves as the passband center frequency of the second-harmonic BPF 19d, is amplified, and the phase thereof is the same as that of the second-harmonic component of $v_\gamma^*$. The phase of the fundamental component of $v_{2h\gamma}^*$, which is not the center frequency, leads the phase of the fundamental component of $v_\gamma^*$ by about it $\pi/2$. Since the frequency of the high-frequency currents $i_{h\gamma}^*$ and $i_{h\delta}^*$ is $1\times\omega_h$, the fundamental component clearly remains in the second-harmonic-extracted γ-axis voltage $v_{2h\gamma}^*$ obtained by enhancing the second-harmonic component.

Figure 36D:
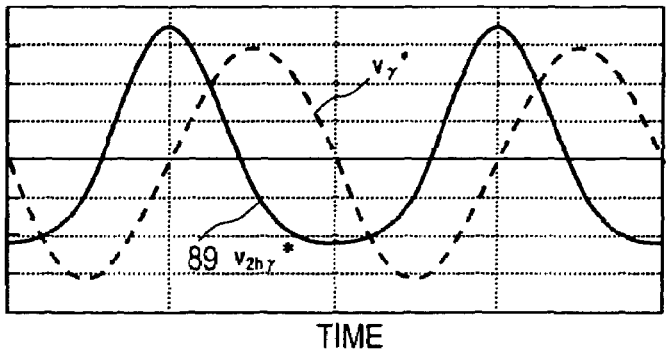

The waveform obtained by synthesizing (mainly) the fundamental and second-harmonic components of $v_{2h\gamma}^*$ corresponds to $v_{2h\gamma}^*$ indicated by the waveform 89 in FIG. 36D. The phase of $v_{2h\gamma}^*$ leads the phase of $v_\gamma^*$ by about $\pi/2$, and the phase of $v_{2h\gamma}^*$ is shifted from the phase of $i_{h\gamma}^*$ by about $\pi$. The positive amplitude of $v_{2h\gamma}^*$ is larger than the negative amplitude thereof, and the difference between the positive and negative amplitudes is enhanced. Incidentally, since an induction voltage that appears when the motor 1 is rotated and the drive current have substantially lower frequencies than that of the detection current, the influence of those components becomes almost negligible by passing them through the second-harmonic BPF 19d.

The polarity checker 20d compares the positive and negative amplitudes of the second-harmonic-extracted γ-axis voltage $v_{2h\gamma}^*$ to determine which is larger than the other. If the positive amplitude is larger than the negative amplitude, the polarity checker 20d judges that the polarity of the magnetic-pole position estimated by the magnetic-pole position estimator 18d is correct, and makes the magnetic-pole position estimator 18d output, as it is, the magnetic-pole position estimated thereby via the adder 21 to the coordinate converter 12 or the like as an estimated magnetic-pole position $\theta_e$. On the other hand, if the positive amplitude is smaller than the negative amplitude, the polarity checker 20d judges that the polarity of the magnetic-pole position estimated by the magnetic-pole position estimator 18d is incorrect (that is, the estimated magnetic-pole position is displaced by $\pi$), performs correction by making the adder 21 add an electrical angle $\pi$ to the magnetic-pole position estimated by the magnetic-pole position estimator 18d, and then makes the adder 21 output the corrected magnetic-pole position to the coordinate converter 12 or the like as an estimated magnetic-pole position $\theta_e$. The estimated magnetic-pole position $\theta_e$ has a phase angle between 0 and $2\pi$ ($0 \leq \theta_e < 2\pi$).

As described above, since polarity checking is performed based on the distortion of the voltage waveform (by using the second-harmonic-extracted component of the voltage from which the direct-current component or the low-frequency component is removed) instead of the direct-current component, the influence of the drive current or the induction voltage and of the offset of the current sensor (current detector 11) on the polarity checking is suppressed. This makes it possible to perform stable polarity checking not only when the motor is at standstill but also when it is rotating.

The fundamental-frequency BPF 17d is a band-pass filter that receives as an input signal the specified γ-axis voltage value $v_\gamma^*$ and the specified δ-axis voltage value $v_\delta^*$ and that has a passband including a frequency of ($1 \times \omega_h$). The fundamental-frequency BPF 17d outputs a fundamental-frequency-extracted γ-axis voltage $v_{h\gamma}^*$ obtained by extracting (enhancing) a high-frequency fundamental component (a frequency component of $1 \times \omega_h$) of the specified γ-axis voltage value $v_\gamma^*$ and a fundamental-frequency-extracted δ-axis voltage $v_{h\delta}$ obtained by extracting (enhancing) a high-frequency fundamental component (a frequency component of $1 \times \omega_h$) of the specified δ-axis voltage value $v_\delta^*$. The fundamental-frequency BPF 17d rejects a frequency of ($2 \times \omega_h$) or higher, and has a frequency of ($1 \times \omega_h$), for example, as its passband center frequency.

Based on the fundamental-frequency-extracted γ-axis voltage $v_{h\gamma}^*$ and the fundamental-frequency-extracted δ-axis voltage $v_{h\delta}^*$, the magnetic-pole position estimator 18d estimates the magnetic-pole position of the rotor within the range of $\pm \pi/2$. The magnetic-pole position estimator 18d can be configured in the same manner as the magnetic-pole position estimator 18 shown in FIG. 3. Specifically, for example, the magnetic-pole position estimator 18d may estimate the magnetic-pole position of the rotor within the range of $\pm \pi/2$ by performing proportional-plus-integral control such that the direct-current component of the arithmetic product ($v_{h\gamma}^* \times v_{h\delta}^*$) converges to zero. The magnetic-pole position within the range of $\pm \pi/2$ calculated by the magnetic-pole position estimator 18d is corrected by the adder 21, whereby the magnetic-pole position within the range from 0 to $2\pi$ is estimated.

Alternatively, the polarity checker 20d may be configured in the same manner as the polarity checker 20 shown in FIG. 17. That is, checking of the polarity may be performed based on a direct-current component of a value obtained by multiplying the second-harmonic-extracted γ-axis voltage $v_{2h\gamma}^*$ by $\cos 2\omega_h t$ or the like.

In a case where the rotation current composed of the high-frequency currents $i_{h\gamma}^*$ and $i_{h\delta}^*$ is fed as a detection current, the current vector locus of the rotation current describes, for example, on the γ-δ axes, a perfect circle having its center at the origin, or an ellipse that has its center at the origin and that has its minor-axis direction or its major-axis direction running on the γ-axis direction. In the elliptical current vector locus of the rotation current, the γ-axis direction does not necessarily have to coincide with the minor-axis or major-axis direction of the ellipse. The major or minor axis of the ellipse may be displaced from the γ axis.

The high-frequency current composed of $i_{h\gamma}^*$ and $i_{h\delta}^*$ may be an alternating current because, also in this case, differences occur in the positive and negative amplitudes of $v_{2h\gamma}^*$ according to the polarity. Here, the alternating current is assumed to be an alternating current on the γ axis (that is, $i_{h\delta}^*=0$), for example. However, any other alternating current may be adopted unless it is an alternating current on the δ axis (that is, as long as $i_{h\gamma}^* \neq 0$).

Sixth Embodiment

Figure 37:
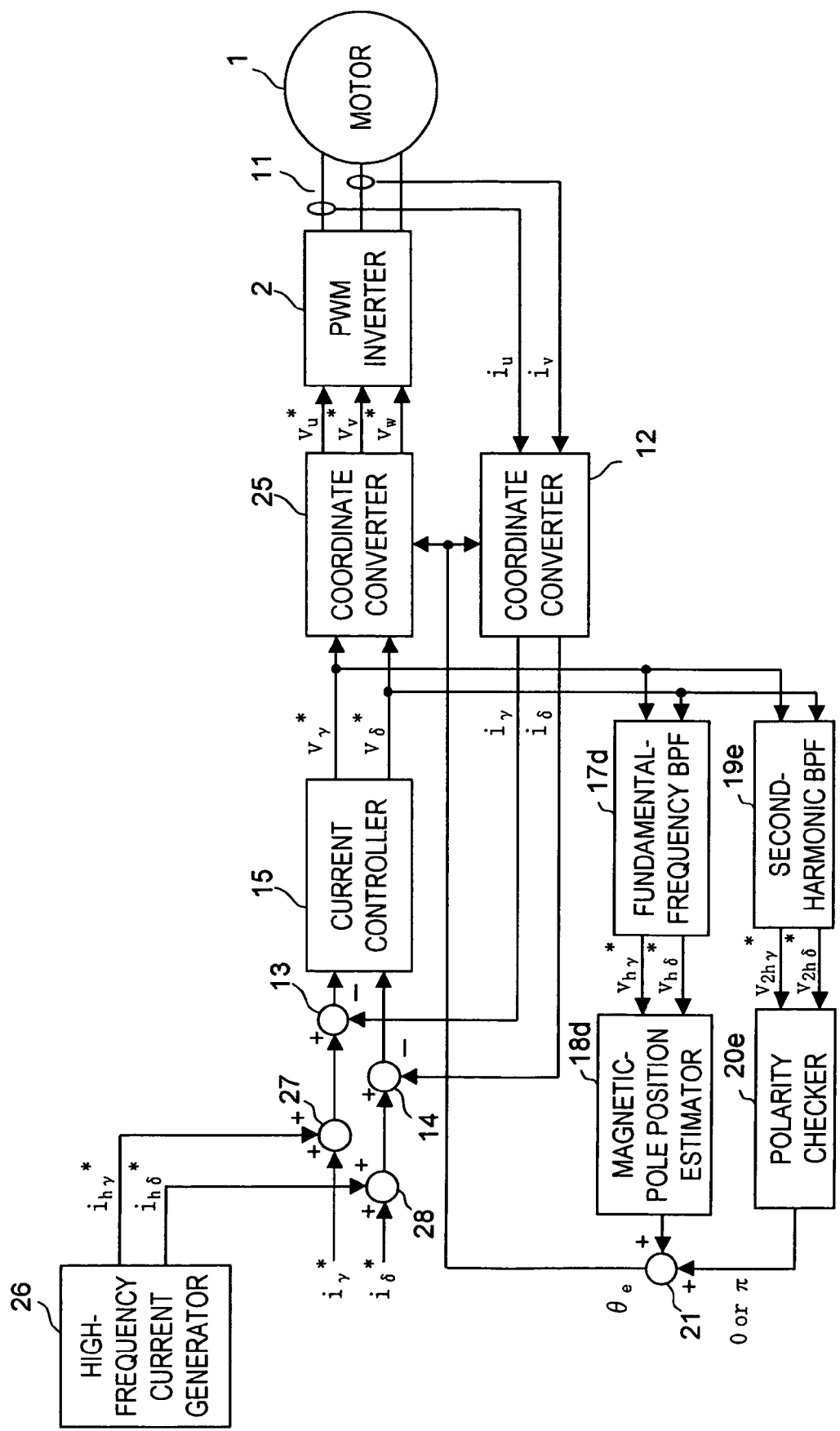
FIG. 37 is a configuration block diagram of the motor drive system of a sixth embodiment of the present invention.

Next, a sixth embodiment of the present invention will be described. FIG. 37 is a configuration block diagram of the motor drive system of the sixth embodiment. The driving control device of this embodiment differs from the driving control device shown in FIG. 34 only in that a second-harmonic BPF 19d and a polarity checker 20d shown in FIG. 34 are replaced with a second-harmonic BPF 19e and a polarity checker 20e. In other respects, the driving control device of this embodiment is the same as the driving control device (of the fifth embodiment) shown in FIG. 34. In FIG. 37, such functional blocks as are found also in the figures (e.g. FIGS. 3 and 34) of the already-described embodiments are identified with the same reference numerals, and their explanations in principle will not be repeated.

As is the case with the second embodiment (FIG. 25) which is a modification of the first embodiment (FIG. 3), this embodiment (FIG. 37) is a modification of the fifth embodiment (FIG. 34).

The second-harmonic BPF 19e shown in FIG. 37 realizes not only the function of the second-harmonic BPF 19d shown in FIG. 34 that extracts the second-harmonic-extracted γ-axis voltage $v_{2h\gamma}^*$ but also the function of extracting the second-harmonic-extracted δ-axis voltage $v_{2h\delta}^*$ mentioned in the fifth embodiment.

That is, the second-harmonic BPF 19e is a band-pass filter that receives as an input signal the specified γ-axis voltage value $v_\gamma^*$ and the specified δ-axis voltage value $v_\delta^*$ and that has a passband including a frequency of ($2 \times \omega_h$). As is the case with the second-harmonic BPF 19d, the second-harmonic BPF 19e extracts the second-harmonic-extracted γ-axis voltage $v_{2h\gamma}^*$. The second-harmonic BPF 19e also extracts (enhances) a high-frequency second-harmonic component (a frequency component of $2 \times \omega_h$) of the specified δ-axis voltage value $v_\delta^*$, and outputs the signal obtained as a result of extraction as a second-harmonic-extracted δ-axis voltage $v_{2h\delta}^*$.

For example, the filter characteristics of the second-harmonic BPF 19e used for extraction of the second-harmonic-extracted γ-axis voltage $v_{2h\gamma}^*$ from the specified γ-axis voltage value $v_\gamma^*$ are assumed to be the same as the filter characteristics used for extraction of the second-harmonic-extracted δ-axis voltage $v_{2h\delta}^*$ from the specified δ-axis voltage value $v_\delta^*$. Also, the filter characteristics of the second-harmonic BPF 19e used for extraction of the second-harmonic-extracted γ-axis voltage $v_{2h\gamma}^*$ from the specified γ-axis voltage value $v_\gamma^*$ are assumed to be the same as the filter characteristics of the second-harmonic BPF 19d shown in FIG. 34. The second-harmonic BPF 19e does not necessarily have to have a frequency of ($2 \times \omega_h$) as its passband center frequency, but should not allow low frequencies to pass therethrough including a frequency of the direct current and the drive current (corresponding to $i_\gamma^*$ and $i_\delta^*$). For example, the lower cutoff frequency of the passband of the second-harmonic BPF 19e is chosen from a frequency range below $2 \times \omega_h$ and above a frequency of the drive current of the motor 1.

To perform checking of the polarity correctly even when the γ axis and the d axis are displaced from each other to a relatively large extent, the polarity checker 20e performs checking of the polarity based on both the second-harmonicextracted γ-axis voltage $v_{2h\gamma}^*$ and the second-harmonic-extracted δ-axis voltage $v_{2h\delta}^*$ extracted by the second-harmonic BPF 19e.

Figure 38:
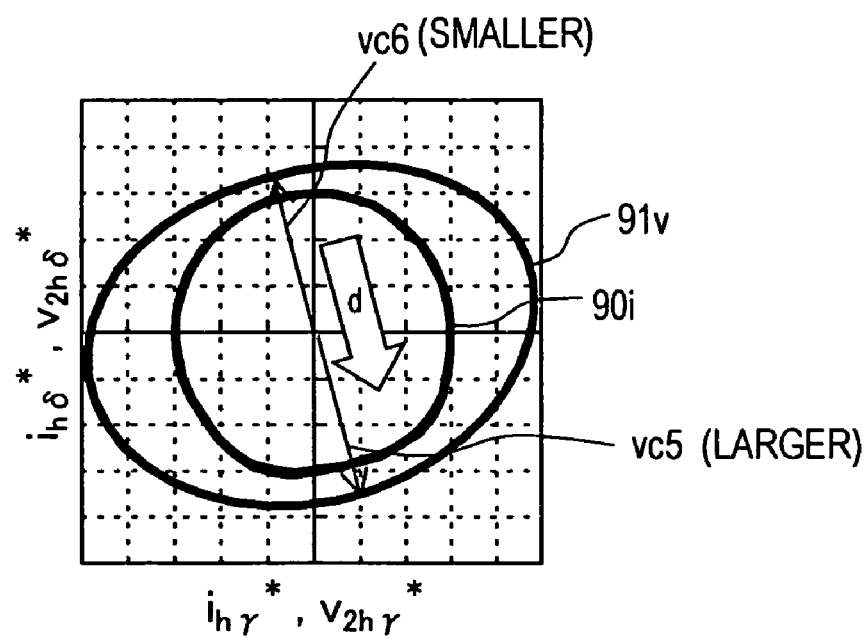
FIG. 38 is a diagram showing the relationship between the vector locus of the high-frequency current generated by the high-frequency current generator shown in FIG. 37 and the vector locus of the voltage second-harmonic component.

In FIG. 38, on the γ-δ axes, the current vector locus of the high-frequency currents $i_{h\gamma}^*$ and $i_{h\delta}^*$ is indicated by a locus 90i and the voltage vector locus of the second-harmonic-extracted γ-axis voltage $v_{2h\gamma}^*$ and the second-harmonic-extracted δ-axis voltage $v_{2h\delta}^*$ is indicated by a locus 91v. Note that, in FIG. 38, it is assumed that the γ axis and the d axis are displaced from each other to a relatively large extent.

The current controller 15 generates the specified γ-axis voltage value $v_\gamma^*$ and the specified δ-axis voltage value $v_\delta^*$ such that both $(i_{h\gamma}^*+i_\gamma^*-i_\gamma)$ and $(i_{h\delta}+i_\delta^*-i_\delta)$ keep up with zero. As a result, as indicated by the current vector locus 90i in FIG. 38, the specified γ-axis voltage value $v_\gamma^*$ and the specified δ-axis voltage value $v_\delta^*$ are generated such that the difference between the positive and negative amplitudes of both the high-frequency currents $i_{h\gamma}^*$ and $i_{h\delta}^*$ becomes zero (or substantially zero) and the amplitudes of $i_{h\gamma}^*$ and $i_{h\delta}^*$ are made equal to each other. However, as will be described later, the amplitudes of $i_{h\gamma}^*$ and $i_{h\delta}^*$ are not necessarily made equal to each other.

When the high-frequency currents $i_{h\gamma}^*$ and $i_{h\delta}^*$ described above are fed, the voltage vector locus 91v of the second-harmonic component describes substantially an ellipse. Due to magnetic saturation, differences occur in the magnitudes of the two vectors vc5 and vc6 that make up the locus 91v and lie along the minor-axis direction of the ellipse.

The vectors vc5 and vc6 are each a resultant vector of the second-harmonic-extracted γ-axis voltage $v_{2h\gamma}^*$ and the second-harmonic-extracted δ-axis voltage $v_{2h\delta}^*$, the resultant vector having its tail at the origin and extending along the minor-axis direction of the ellipse described by the locus 91v. In FIG. 38, the vector vc5 extends in the γ-δ coordinate system from the origin toward the fourth quadrant, and the vector vc6 extends in the γ-δ coordinate system from the origin toward the second quadrant. Now, as shown in FIG. 38, when the direction of the d axis is a direction that points from the origin to the fourth quadrant, the magnitude of the vector vc5 is made greater than the magnitude of the vector vc6.

Exploiting this relationship, the polarity checker 20e performs checking of the polarity, and feeds to the adder 21 a correction phase angle of 0 or π. That is, based on the magnitude of the resultant vector $v_{2h}^*$ (the magnitude of the combined voltage) of $v_{2h\gamma}^*$ and $v_{2h\delta}^*$ in one cycle of the high-frequency currents $i_{h\gamma}^*$ and $i_{h\delta}^*$, the polarity checker 20e performs checking of the polarity. More specifically, the polarity checker 20e judges that the direction of the phase angle (in FIG. 38, the direction of the vector vc5) obtained by adding π to the phase angle at which the magnitude of the resultant vector $v_{2h}^*$ becomes minimum in one cycle of the high-frequency currents $i_{h\gamma}^*$ and $i_{h\delta}^*$ is the direction of the d axis (this equally applies to a case where the motor 1 is a non-salient pole motor). In the example shown in FIG. 38, when the resultant vector $v_{2h}^*$ coincides with the vector vc6, the magnitude of the resultant vector $v_{2h}^*$ becomes minimum.

Even with the configuration of this embodiment, checking of the polarity is performed by using a second-harmonic-extracted component of voltage. This makes it possible to achieve the same effects as those achieved in the fifth embodiment, and thereby offer stable polarity checking.

The circular locus of the rotation current to be fed may be deformed unless the amplitude of the resultant vector $v_{2h}^*$ of $v_{2h\gamma}^*$ and $v_{2h\delta}^*$ in the d-axis direction is equal to or larger than the amplitude thereof in the q-axis direction. That is, the amplitude of the high-frequency γ-axis current $i_{h\gamma}^*$ of the rotation current and the amplitude of the high-frequency δ-axis current $i_{h\delta}^*$ thereof may be different so long as the d-axis direction coincides with the minor-axis direction of the voltage vector locus 91v. For example, the current vector locus of the high-frequency currents $i_{h\gamma}^*$ and $i_{h\delta}^*$ on the γ-δ axes describes a perfect circle having its center at the origin, or an ellipse that has its center at the origin and that has its minor-axis direction or its major-axis direction running on the γ-axis direction.

Figure 46:
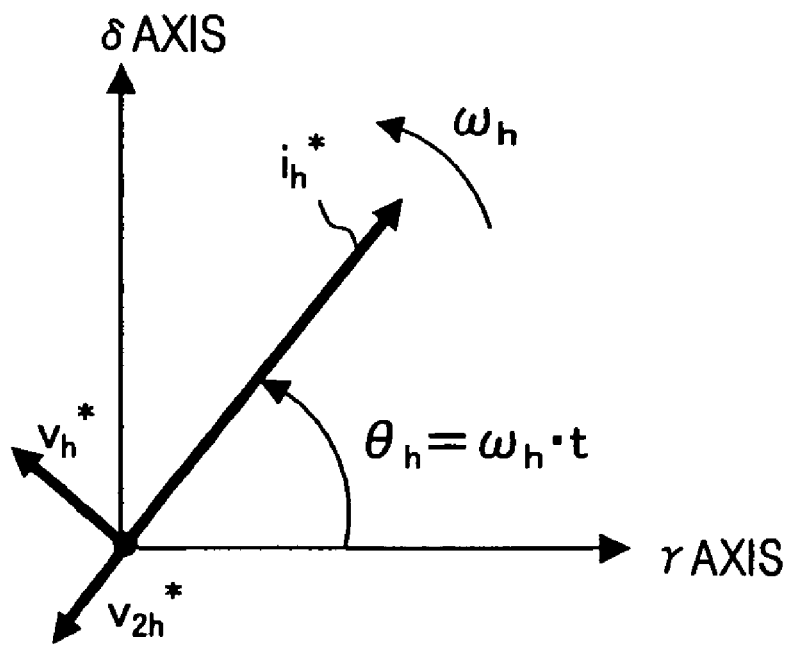
FIG. 46 is a vector diagram referred to in the sixth embodiment, for example, of the present invention.

The phase $\theta_h$ of the high-frequency currents $i_{h\gamma}^*$ and $i_{h\delta}^*$ that is required to generate the values of the high-frequency currents $i_{h\gamma}^*$ and $i_{h\delta}^*$ is set relative to the γ axis, and, at time "t", the phase of the resultant vector $i_h^*$ of the high-frequency currents $i_{h\gamma}^*$ and $i_{h\delta}^*$ composing the rotation current is represented by $\omega_h \cdot t$ (see FIG. 46). Thus, the phase $\omega_h \cdot t$ as observed at time (at which $v_{2h}^*$ coincides with vc6 shown in FIG. 38; hereinafter referred to as "time T3") at which the magnitude of the resultant vector $v_{2h}^*$ of $v_{2h\gamma}^*$ and $v_{2h\delta}^*$ becomes minimum in one cycle of the high-frequency currents $i_{h\gamma}^*$ and $i_{h\delta}^*$ is Δθ.

That is, based on the value of the phase $\omega_h \cdot t$ as obtained at time T3, it is possible to calculate the magnetic-pole position (i.e. the axis error Δθ) within the range from 0 to 2π. In that case, the magnetic-pole position estimator 18d shown in FIG. 37 can be omitted.

FIG. 46 shows the above-described resultant vector $i_h^*$ and $v_{2h}^*$, and the resultant vector $v_h^*$ of the fundamental-frequency-extracted γ-axis voltage $v_{h\gamma}^*$ and the fundamental-frequency-extracted δ-axis voltage $v_{h\delta}^*$ in relation to the γ and δ axes. At time T3 at which the direction of the resultant vector $v_{2h}^*$ indicates (Δθ+π), the directions of $\omega_h \cdot t$ and $i_h^*$ indicate Δθ, and the direction of $v_h^*$ lags behind $v_{2h}^*$ by π/2, that is, the direction of $v_h^*$ indicates (Δθ+π/2).

Thus, it is also possible to calculate the magnetic-pole position within the range from 0 to 2π by calculating arctan $(i_{h\delta}^*/i_{h\gamma}^*)$ at time T3, because the value thus obtained corresponds to Δθ. Instead, it is also possible to calculate the magnetic-pole position within the range from 0 to 2π by calculating arctan$(v_{2h\delta}^*/v_{2h\gamma}^*)$ at time T3, because the value thus obtained corresponds to (Δθ+π). Alternatively, it is also possible to calculate the magnetic-pole position within the range from 0 to 2π by calculating arctan$(v_{h\delta}^*/v_{h\gamma}^*)$ at time T3, because the value thus obtained corresponds to (Δθ+π/2).

The phase $\omega_h \cdot t$, arctan$(v_{2h\delta}^*/v_{2h\gamma}^*)$, or the like, as obtained at time T3 is information indicating not only the inclination of the minor axis of the ellipse described by the voltage vector locus 91v of $v_{2h\gamma}^*$ and $v_{2h\delta}^*$ but also the polarity. By exploiting both information, it is possible to estimate the magnetic-pole position within the range from 0 to 2π. Alternatively, by exploiting only the information indicating the inclination of the minor axis, it is possible to estimate the magnetic-pole position within the range of ±π/2. Here, "detecting the magnetic-pole position within the range of ±π/2 based on the phase $\omega_h \cdot t$, arctan$(v_{2h\delta}^*/v_{2h\gamma}^*)$, or the like, as obtained at time T3" is conceptually included in "detecting the magnetic-pole position within the range of ±π/2 based on the inclination (or information indicating the inclination) of the minor axis of the ellipse described by the voltage vector locus 91v".

Calculation of the magnetic-pole position based on the phase $\omega_h \cdot t$, arctan$(v_{2h\delta}^*/v_{2h\gamma}^*)$, or the like, is performed particularly accurately when the motor 1 is at standstill or is rotating at low speed (in particular, when the motor 1 is at standstill).

Here, when rotating at low speed, the motor 1 is rotating at a rotation speed sufficiently lower than the frequency of the high-frequency current ($i_{h\gamma}^*$ and $i_{h\delta}^*$) fed by the high-frequency current generator 26. It should be noted that, when the motor 1 is rotating at low speed, "the real motor speed ω, the estimated motor speed $ω_e$, or an externally-fed specified motor speed value to be kept up with by them" can be regarded as "being equal to or lower than a previously determined speed".

As described above, by estimating the magnetic-pole position by using the second-harmonic component of the voltage from which the direct-current component and the low-frequency component are removed, the influence of the drive current or the induction voltage and of the offset of the current sensor (e.g. the current detector 11) on estimation of the magnetic-pole position is suppressed. This makes it possible to perform stable estimation of the magnetic-pole position not only when the motor is at standstill but also when it is rotating.

As is the case with the second and fourth embodiments, when the motor 1 is at standstill or is rotating at low speed, the method described in this embodiment can be applied not only to the γ and δ axes but also to arbitrary α and β axes that are at right angles to one another and are fixed to the stator of the motor 1. That is, Greek letters "γ" and "δ" in the descriptions heretofore and in FIGS. 37 and 38 can be replaced with "α" and "β", respectively.

Specifically, for example, a specified α-axis voltage value $v_α*$ and a specified β-axis voltage value $v_β*$ are generated such that the differences between the positive and negative amplitudes of both the high-frequency currents $i_{hα}*$ and $i_{hβ}*$ composing the rotation current become zero (or substantially zero). The high-frequency currents $i_{hα}*$ and $i_{hβ}*$ are an α-axis component and a γ-axis component, respectively, of the high-frequency current serving as a detection current. The specified α-axis voltage value $v_α*$ and the specified β-axis voltage value $v_β*$ are an α-axis component and a β-axis component, respectively, of the specified voltage value, and they are converted into three-phase specified voltage values by the coordinate converter 25. Then, with the filter characteristics which are the same as those of the second-harmonic BPF 19e used for extraction of the second-harmonic-extracted γ-axis voltage $v_{2hγ}*$ from the specified γ-axis voltage value $v_γ*$, a high-frequency second-harmonic component (a frequency component of $2×ω_h$) of the specified α-axis voltage value $v_α*$ and the specified β-axis voltage value $v_β*$ is extracted (enhanced). As a result, a second-harmonic-extracted α-axis voltage $v_{2hα}*$ and a second-harmonic-extracted β-axis voltage $v_{2hβ}*$ are obtained.

Hence, the voltage vector locus of the resultant vector of the second-harmonic-extracted α-axis voltage $v_{2hα}*$ and the second-harmonic-extracted β-axis voltage $v_{2hβ}*$ describes, on the α-β axes, (substantially) an ellipse. Thus, based on the magnitudes (i.e. which is greater than the other) of two voltage vectors (corresponding to vc5 and vc 6 shown in FIG. 38) lying along the minor-axis direction of the ellipse, it is possible to perform checking of the polarity.

Moreover, based on the phase $ω_h·t$, $\arctan(v_{2hβ}*/v_{2hα}*)$, or the like, as obtained at time at which the magnitude of the resultant vector of $v_{2hα}*$ and $v_{2hβ}*$ becomes minimum, it is possible to estimate the magnetic-pole position. Calculation of the magnetic-pole position is performed particularly accurately when the motor 1 is at standstill or is rotating at low speed (in particular, when the motor 1 is at standstill).

Seventh Embodiment

Figure 39:
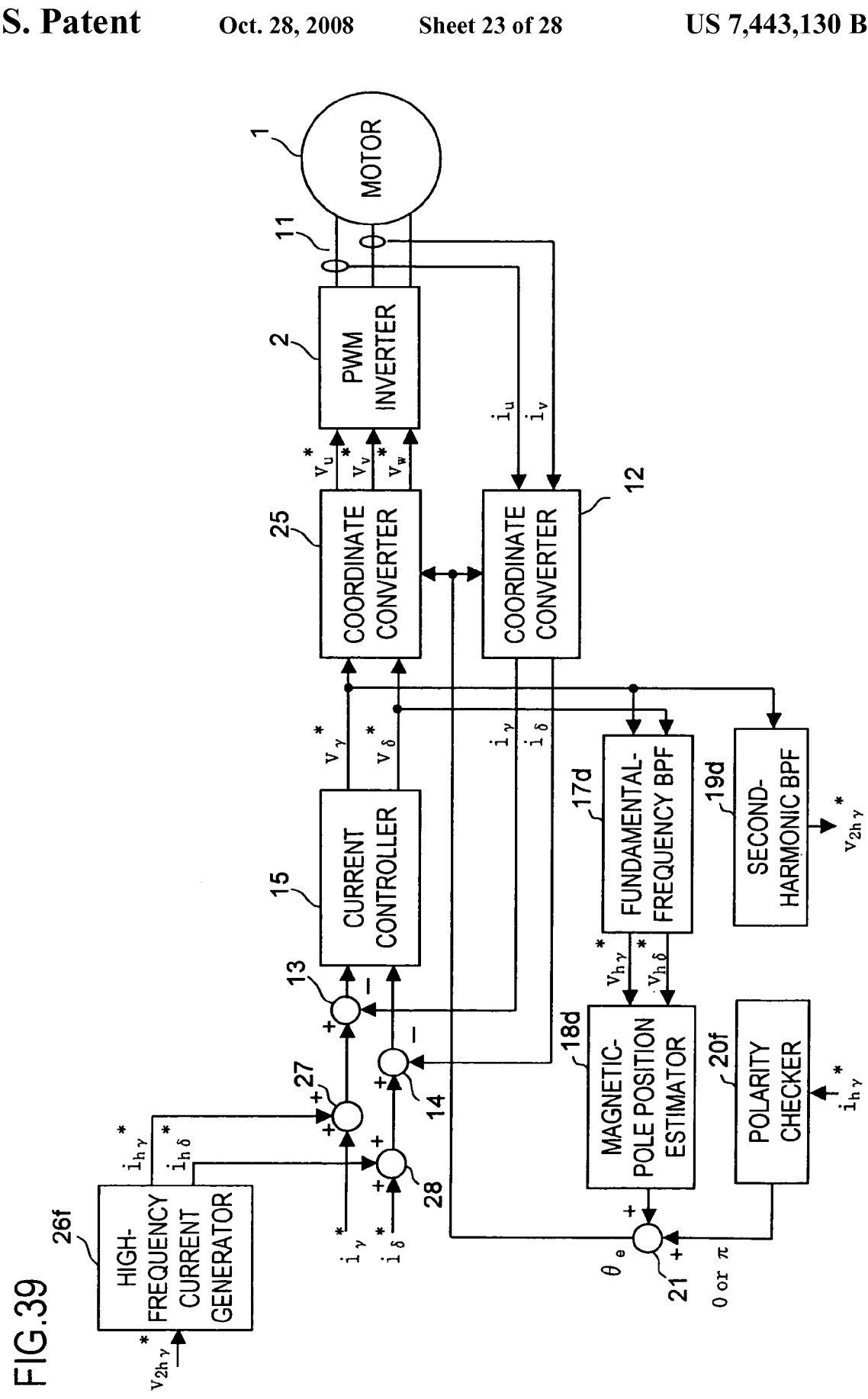
FIG. 39 is a configuration block diagram of the motor drive system of a seventh embodiment of the present invention.

Next, a seventh embodiment of the present invention will be described. FIG. 39 is a configuration block diagram of the motor drive system of the seventh embodiment. The driving control device of this embodiment differs from the driving control device shown in FIG. 34 only in that a polarity checker 20d and a high-frequency current generator 26 shown in FIG. 34 are replaced with a polarity checker 20f and a high-frequency current generator 26f. In other respects, the driving control device of this embodiment is the same as the driving control device (of the fifth embodiment) shown in FIG. 34. In FIG. 39, such functional blocks as are found also in the figures (e.g. FIGS. 3 and 34) of the already-described embodiments are identified with the same reference numerals, and their explanations in principle will not be repeated.

As is the case with the third embodiment (FIG. 28) which is a modification of the first embodiment (FIG. 3), this embodiment (FIG. 39) is a modification of the fifth embodiment (FIG. 34). It should be noted that this embodiment deals with a case where the directions of the γ axis and the d axis substantially coincide with each other.

That is, as is the case with the high-frequency current generator 26 shown in FIG. 34, the high-frequency current generator 26f generates the high-frequency currents $i_{hγ}*$ and $i_{hδ}*$, and then outputs them to the adders 27 and 28, respectively. At this point, the high-frequency currents $i_{hγ}*$ and $i_{hδ}*$ (in particular, the amplitude of $i_{hγ}*$) are controlled so that the difference between the positive and negative amplitudes of the second-harmonic-extracted γ-axis voltage $v_{2hγ}*$ extracted by the second-harmonic BPF 19d is eliminated.

Referring to the voltage vector locus 88v of the second-harmonic-extracted γ-axis voltage $v_{2hγ}*$ and the second-harmonic-extracted δ-axis voltage $v_{2hδ}*$ shown in FIG. 35, control is so performed as to reduce the positive amplitude of the voltage vector locus 88v. Hence, due to magnetic saturation, differences occur in the positive and negative amplitudes of the high-frequency current $i_{hγ}*$ serving as a detection current. Based on the magnitudes of the positive and negative amplitudes (i.e. which is larger than the other), it is possible to preform checking of the polarity.

Even with the configuration of this embodiment, checking of the polarity is preformed by using a second-harmonic-extracted component of voltage. This makes it possible to achieve the same effects as those achieved in the fifth embodiment, and thereby offer stable polarity checking.

Alternatively, the polarity checker 20f may be configured in the same manner as the polarity checker 20 shown in FIG. 17. That is, checking of the polarity may be preformed based on a direct-current component of a value obtained by multiplying the high-frequency γ-axis current $i_{hγ}*$ by $\cos 2ω_h t$ or the like.

The high-frequency current composed of $i_{hγ}*$ and $i_{hδ}*$ may be a rotation current or an alternating current because, also in either case, differences occur in the positive and negative amplitudes of $i_{hγ}*$ according to the polarity. Here, the alternating current is assumed to be an alternating current on the γ axis (that is, $i_{hδ}*=0$), for example. However, any other alternating current may be adopted unless it is an alternating current on the δ axis (that is, as long as $i_{hγ}*≠0$).

Eighth Embodiment

Figure 40:
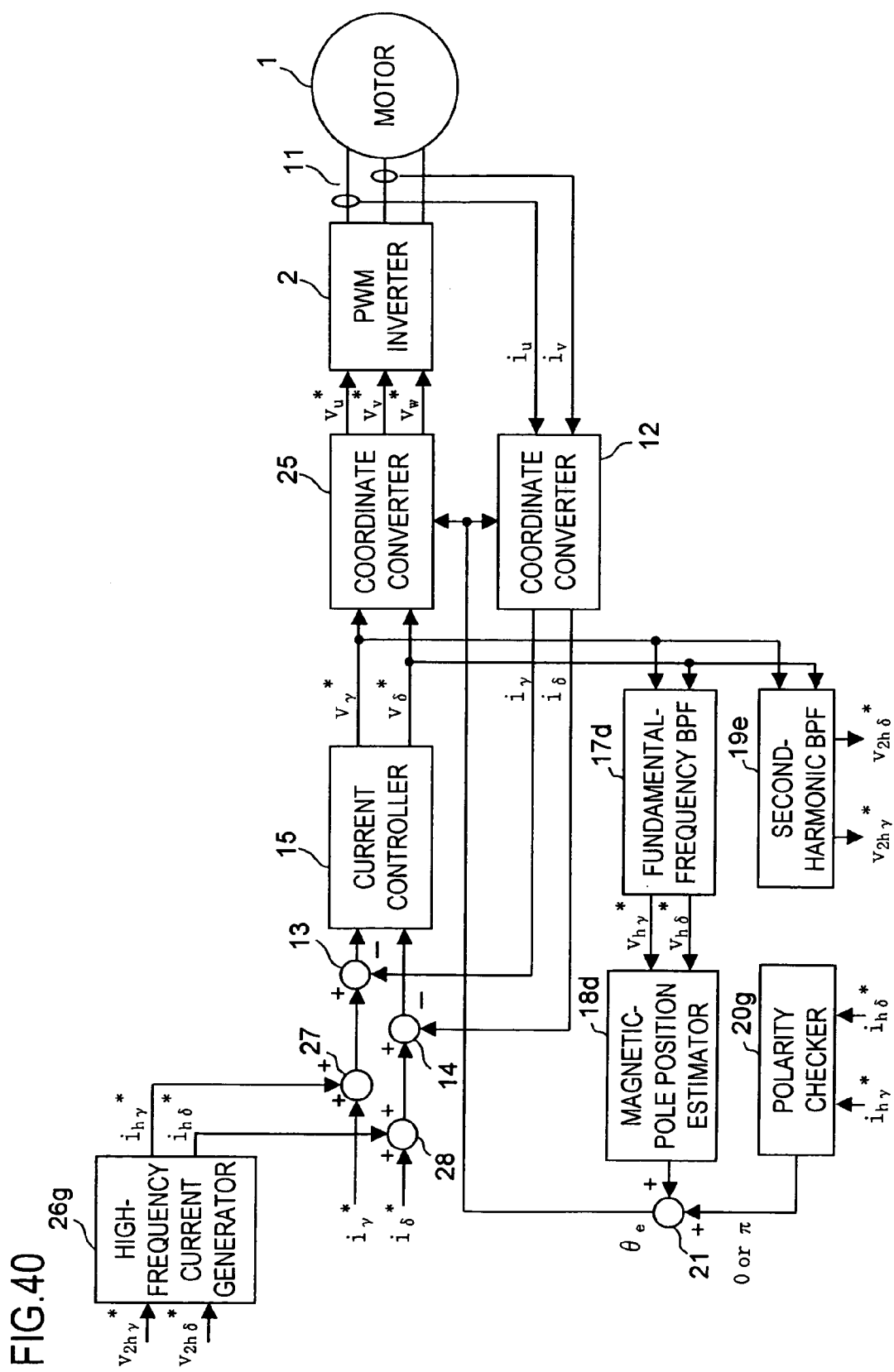
FIG. 40 is a configuration block diagram of the motor drive system of an eighth embodiment of the present invention.
Figure 41:
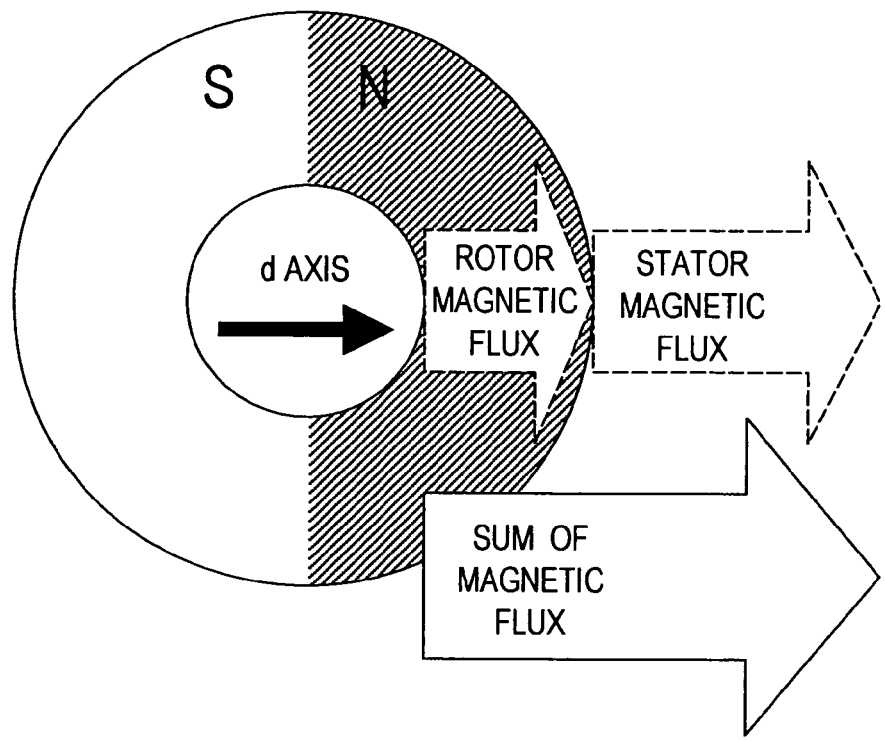
FIG. 41 is a diagram illustrating the principle of a method for checking the polarity.
Figure 42:
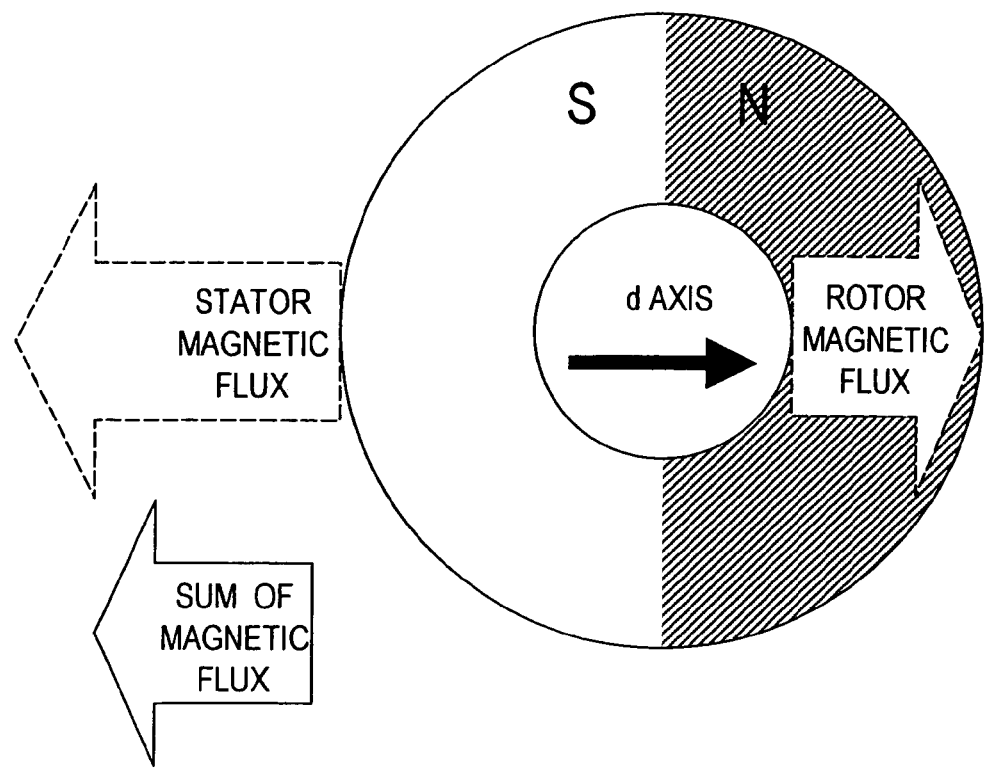
FIG. 42 is a diagram illustrating the principle of the method for checking the polarity.
Figure 43:
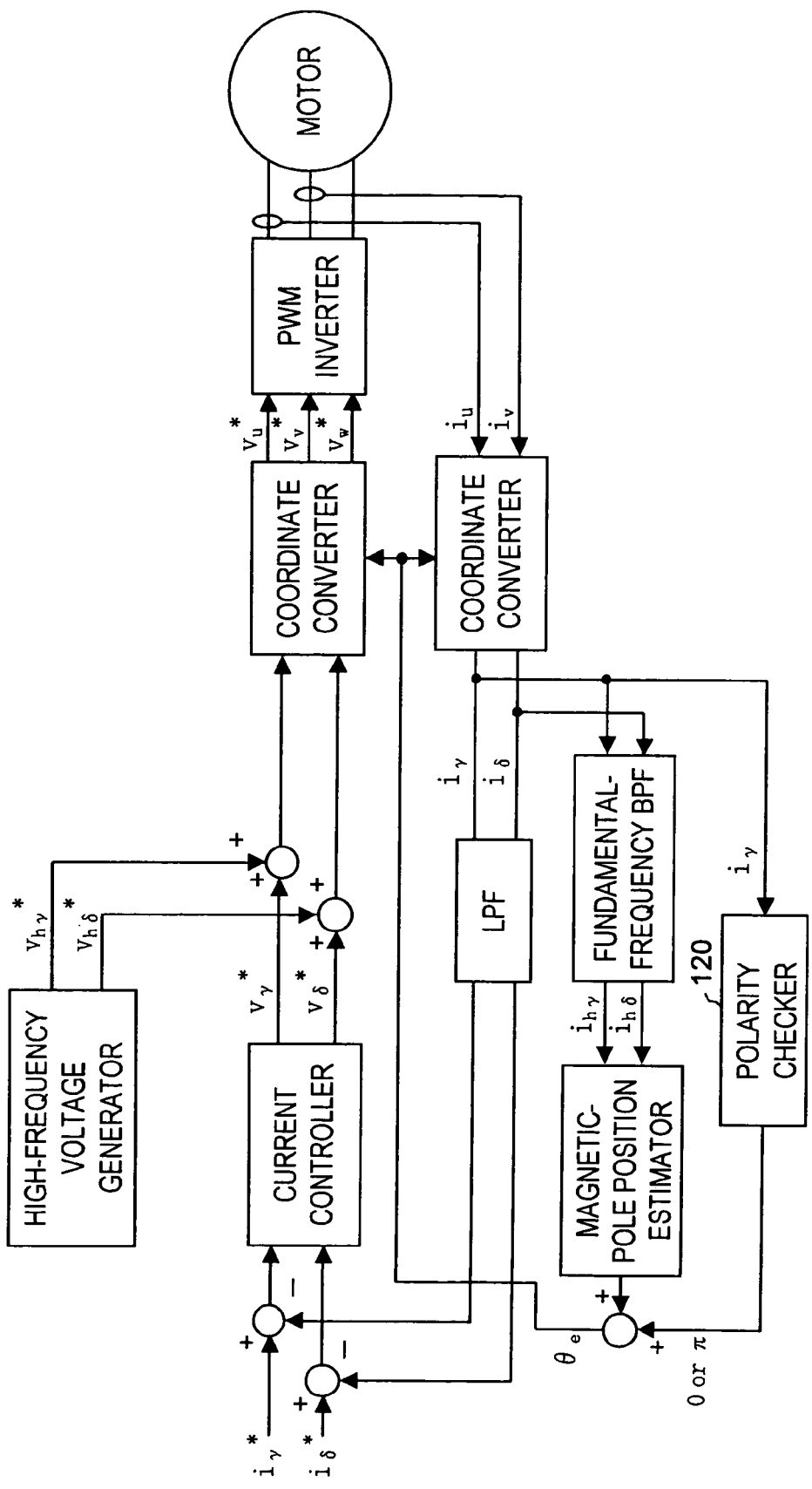
FIG. 43 is a configuration block diagram of a conventional motor drive system.
Figure 44:
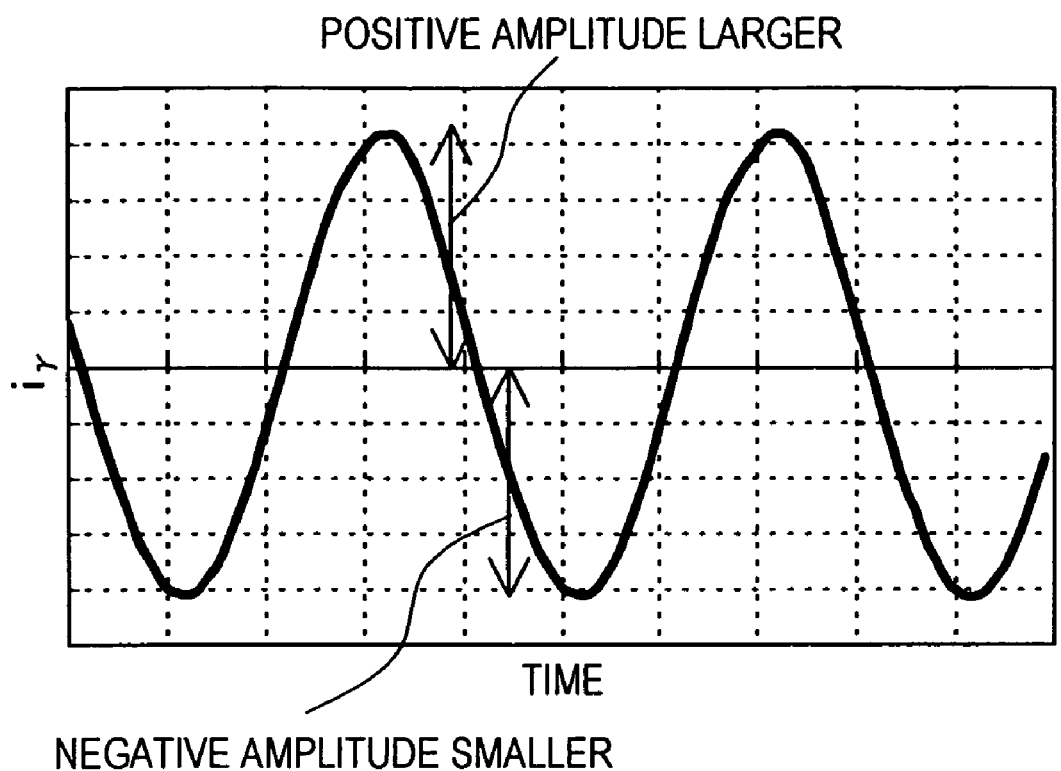
FIG. 44 is a diagram showing the waveform of the γ-axis current used by the motor drive system shown in FIG. 43 for checking of the polarity.

Next, an eighth embodiment of the present invention will be described. FIG. 40 is a configuration block diagram of the motor drive system of the eighth embodiment. The driving control device of this embodiment differs from the driving control device shown in FIG. 34 only in that a second-harmonic BPF 19d, a polarity checker 20d, and a high-frequency current generator 26 shown in FIG. 34 are replaced with a second-harmonic BPF 19e, a polarity checker 20g, and a high-frequency current generator 26g. In other respects, the driving control device of this embodiment is the same as the driving control device (of the fifth embodiment) shown in FIG. 34. In FIG. 40, such functional blocks as are found also in the figures (e.g. FIGS. 3, 34 and 37) of the already-described embodiments are identified with the same reference numerals, and their explanations in principle will not be repeated. It should be noted that this embodiment can be adopted even when the d axis and the γ axis are displaced from each other to a relatively large extent.

As is the case with the fourth embodiment (FIG. 31) which is a modification of the first embodiment (FIG. 3), this embodiment (FIG. 40) is a modification of the fifth embodiment (FIG. 34).

That is, as is the case with the high-frequency current generator 26 shown in FIG. 34, the high-frequency current generator 26g generates high-frequency currents $i_{h\gamma}{}^*$ and $i_{h\delta}{}^*$ composing a rotation current serving as a detection current, and then outputs them to the adders 27 and 28, respectively. At this point, the high-frequency currents $i_{h\gamma}{}^*$ and $i_{h\delta}{}^*$ are controlled so that the difference between the positive and negative amplitudes of the second-harmonic-extracted γ-axis voltage $v_{2h\gamma}{}^*$ extracted by the second-harmonic BPF 19e and the difference between the positive and negative amplitudes of the second-harmonic-extracted δ-axis voltage $v_{2h\delta}{}^*$ extracted by the second-harmonic BPF 19e are eliminated, and that the amplitudes of the second-harmonic-extracted γ-axis voltage $v_{2h\gamma}{}^*$ and the second-harmonic-extracted δ-axis voltage $v_{2h\delta}{}^*$ are made equal to each other. However, the amplitudes of the second-harmonic-extracted γ-axis voltage $v_{2h\gamma}{}^*$ and the second-harmonic-extracted δ-axis voltage $v_{2h\delta}{}^*$ are not necessarily made equal to each other.

Referring to FIG. 38, as a result of the above-described control, the current vector locus of the high-frequency currents $i_{h\gamma}{}^*$ and $i_{h\delta}{}^*$ describes an elliptical shape, like a current vector locus 90i shown in FIG. 38 flattened out in substantially the γ-axis direction. Due to magnetic saturation, differences occur in the magnitudes of two resultant vectors (corresponding to the vectors vc5 and vc6 shown in FIG. 38) of the high-frequency currents $i_{h\gamma}{}^*$ and $i_{h\delta}{}^*$, the resultant vectors lying along the major-axis direction of the ellipse.

Exploiting this relationship, the polarity checker 20g performs checking of the polarity. That is, based on the magnitude of the resultant vector $i_h{}^*$ (the magnitude of the combined current, i.e. the magnitude of the rotation current) of $i_{h\gamma}{}^*$ and $i_{h\delta}{}^*$ in one cycle of the high-frequency currents $i_{h\gamma}{}^*$ and $i_{h\delta}{}^*$, the polarity checker 20g performs checking of the polarity. More specifically, the polarity checker 20g judges that the direction of the phase angle at which the magnitude of the resultant vector $i_h{}^*$ becomes maximum in one cycle of the high-frequency currents $i_{h\gamma}{}^*$ and $i_{h\delta}{}^*$ is the direction of the d axis (this equally applies to a case where the motor 1 is a non-salient pole motor).

Even with the configuration of this embodiment, checking of the polarity is performed by using a second-harmonic-extracted component of voltage. This makes it possible to achieve the same effects as those achieved in the fifth embodiment, and thereby offer stable polarity checking.

With the above-described control, as is obvious from the descriptions of the already-described embodiments, based on the phase $\omega_h \cdot t$, $\arctan(v_{2h}{}^*/v_{2h\gamma}{}^*)$, or the like, as obtained at time at which the magnitude of the resultant vector $i_h{}^*$ of $i_{h\gamma}{}^*$ and $i_{h\delta}{}^*$ becomes maximum (based on the inclination, for example, of the major axis of the ellipse described by the current vector locus of the high-frequency currents $i_{h\gamma}{}^*$ and $i_{h\delta}{}^*$), it is also possible to estimate the magnetic-pole position within the range from 0 to $2\pi$ (needless to say, it is also possible to estimate the magnetic-pole position within the range of $\pm\pi/2$). Calculation of the magnetic-pole position is performed particularly accurately when the motor 1 is at standstill or is rotating at low speed (in particular, when the motor 1 is at standstill).

The phase $\omega_h \cdot t$ at time (hereinafter referred to as "time T4") at which the magnitude of the resultant vector $i_h{}^*$ of $i_{h\gamma}{}^*$ and $i_{h\delta}{}^*$ becomes maximum in one cycle of the high-frequency currents $i_{h\gamma}{}^*$ and $i_{h\delta}{}^*$ is $\Delta\theta$. As will be understood from FIG. 46, at time T4 at which the direction of $i_h{}^*$ indicates $\Delta\theta$, the direction of $\omega_h \cdot t$ also indicates $\Delta\theta$, the direction of $v_{2h}{}^*$ indicates ($\Delta\theta+\pi$), and the direction of $v_h{}^*$ lags behind $v_{2h}{}^*$ by $\pi/2$, that is, the direction of $v_h{}^*$ indicates ($\Delta\theta+\pi/2$).

As described above, by estimating the magnetic-pole position by the use of a second-harmonic component of voltage, it is possible to achieve the same effects as those achieved in the sixth embodiment, and thereby offer stable estimation of the magnetic-pole position.

As is the case with the sixth embodiment, when the motor 1 is at standstill or is rotating at low speed, the method described in this embodiment can be applied not only to the γ and δ axes but also to arbitrary α and β axes that are at right angles to one another and are fixed to the stator of the motor 1. That is, Greek letters "γ" and "δ" in the descriptions heretofore and in FIG. 40 can be replaced with "α" and "β", respectively.

MODIFIED EXAMPLES

What has been described in one embodiment, whenever applicable, can be applied to the other embodiments. For example, what has been described in the first embodiment, whenever applicable, can be applied to the second to eighth embodiments.

As is the case with the first embodiment, in the second to eighth embodiments, it is possible to perform checking of the polarity before, after, or during estimation of the magnetic-pole position. Moreover, as is the case with the first embodiment, in the second to eighth embodiments, a high-pass filter may be adopted instead of a band-pass filter to extract a value (a second-harmonic-extracted γ-axis current $i_{2h\gamma}$, a second-harmonic-extracted α-axis current $i_{2h\alpha}$, a second-harmonic-extracted γ-axis voltage $v_{2h\gamma}{}^*$, or the like) used for performing polarity checking. The high-pass filter attenuates relatively low frequency components including a direct-current component and a frequency component of a drive current, and passes therethrough a frequency component of ($2 \times \omega_h$).

As is the case with the first embodiment, in the second to eighth embodiments, performing driving control by the application of the drive voltage, checking of the polarity by the application of the high-frequency voltage, and estimation of the magnetic-pole position by the application of the high-frequency voltage simultaneously, performing part of them simultaneously, or performing them with different timing is optional.

All the embodiments can adopt a non-salient pole motor (a motor having no salient pole) as a motor 1.

The driving control devices of the embodiments described above are realized by using software (program) incorporated in a general-purpose microcomputer, for example. Needless to say, it is also possible to realize the driving control device only with hardware instead of software (program).

The current detector 11 of the embodiments described above may be so configured, as shown in FIG. 3 and like figures, as to directly detect a motor current. Instead, the current detector 11 may be so configured as to reproduce a motor current from an instantaneous current of a DC current on the power supply side, thereby detect the motor current.

It should be understood that the expression "estimating the magnetic-pole position of the rotor within the range of ±π/2" can be translated into the expression, for example, "estimating the magnetic-pole position of the rotor within the range from 0 to π or from π to 2π in terms of electrical angles". Likewise, the expression "checking the polarity of the magnetic pole of the rotor" can be translated into the expression, for example, "detecting whether the magnetic-pole position of the rotor is within the range from 0 to π or within the range from π to 2π in terms of electrical angles".

The embodiments described above deal with cases where the voltage feeder that applies a voltage (e.g. a detection voltage) to the motor 1 is mainly composed of the current controller (15). Moreover, the second-harmonic BPF (19, for example) of the embodiments described above forms an extractor. Furthermore, the embodiments described above deal with cases where the detector that detects the polarity of the rotor and/or the magnetic-pole position within the range of ±π/2 is mainly composed of the polarity checker (20, for example).

The present invention is suitable for all kinds of electric appliances that employ motors. The present invention is suitable, in particular, in electric cars that are driven by the rotation of motors and in compressors and the like that are used in air conditioners and the like.

What is claimed is:

1. A motor driving control device that performs driving control of a motor, wherein
let an axis parallel to a magnetic flux produced by a permanent magnet forming a rotor of the motor be called a d axis, and
let an axis estimated, for a purpose of control, to correspond to the d axis be called a γ axis,
then the motor driving control device comprises:
a voltage feeder that applies an alternating voltage or a rotation voltage having a predetermined frequency to the motor as a detection voltage;
an extractor that extracts, from a γ-axis component of a motor current that flows through the motor, a partly-extracted γ-axis current obtained by attenuating at least a direct-current component of the γ-axis component; and
a detector that detects a polarity of a magnetic pole of the rotor by a use of the partly-extracted γ-axis current.

2. The motor driving control device of claim 1, wherein the detector detects the polarity based on positive and negative amplitudes of the partly-extracted γ-axis current.

3. The motor driving control device of claim 1, wherein the detector detects the polarity based on a value obtained by multiplying the partly-extracted γ-axis current by a signal having a frequency twice the predetermined frequency.

4. The motor driving control device of claim 1, wherein the detector detects the polarity based on a γ-axis component of the detection voltage that is obtained when the detection voltage is controlled so that a difference between the positive and negative amplitudes of the partly-extracted γ-axis current is reduced close to zero.

5. The motor driving control device of claim 4, wherein the detector detects the polarity based on positive and negative amplitudes of the γ-axis component of the detection voltage.

6. The motor driving control device of claim 4, wherein the detector detects the polarity based on a value obtained by multiplying the γ-axis component of the detection voltage by a signal having a frequency twice the predetermined frequency.

7. A motor driving control device that performs driving control of a motor, wherein
let arbitrary two axes that are at right angles to one another be called an x axis and a y axis,
then the motor driving control device comprises:
a voltage feeder that applies a rotation voltage having a predetermined frequency to the motor as a detection voltage;
an extractor that extracts, from an x-axis component of a motor current that flows through the motor, a partly-extracted x-axis current obtained by attenuating at least a direct-current component of the x-axis component, and that extracts, from a y-axis component of the motor current, a partly-extracted y-axis current obtained by attenuating at least a direct-current component of the y-axis component; and
a detector that performs at least one of detection of a polarity of a magnetic pole of a rotor of the motor and detection of a magnetic-pole position within a range of ±π/2 by a use of the partly-extracted x-axis current and the partly-extracted y-axis current.

8. The motor driving control device of claim 7, wherein the detector detects the polarity based on a magnitude of a combined current of the partly-extracted x-axis current and the partly-extracted y-axis current.

9. The motor driving control device of claim 7, wherein the detector detects the magnetic-pole position within the range of ±π/2 based on an inclination of a major axis of a current vector locus of the partly-extracted x-axis current and the partly-extracted y-axis current on x-y axes.

10. The motor driving control device of claim 7, wherein the detector detects the polarity based on a magnitude of the rotation voltage that is obtained when the rotation voltage is controlled so that a difference between positive and negative amplitudes of the partly-extracted x-axis current and a difference between positive and negative amplitudes of the partly-extracted y-axis current are reduced close to zero.

11. The motor driving control device of claim 7, wherein the detector detects the magnetic-pole position within the range of ±π/2 based on an inclination of a minor axis of a voltage vector locus of the rotation voltage on x-y axes, the inclination obtained when the rotation voltage is controlled so that a difference between positive and negative amplitudes of the partly-extracted x-axis current and a difference between positive and negative amplitudes of the partly-extracted y-axis current are reduced close to zero.

12. The motor driving control device of claim 7, wherein the two axes are rotation axes that rotate as the motor rotates, or fixed axes fixed to a stator of the motor.

13. A motor driving control device that performs driving control of a motor, wherein
let an axis parallel to a magnetic flux produced by a permanent magnet forming a rotor of the motor be called a d axis, and
let an axis estimated, for a purpose of control, to correspond to the d axis be called a γ axis,
then the motor driving control device comprises:
a voltage feeder that applies to the motor a voltage to pass therethrough an alternating current or a rotation current having a predetermined frequency as a detection current;
an extractor that extracts, from a γ-axis component of the voltage applied by the voltage feeder, a partly-extracted γ-axis voltage obtained by attenuating at least a direct-current component of the γ-axis component; and a detector that detects a polarity of a magnetic pole of the rotor by a use of the partly-extracted γ-axis voltage.

14. The motor driving control device of claim 13, wherein the voltage feeder applies to the motor the voltage with which a difference between positive and negative amplitudes of a γ-axis component of the detection current is reduced close to zero.

15. The motor driving control device of claim 13, wherein the detector detects the polarity of the rotor based on a γ-axis component of the detection current that is obtained when the detection current is controlled so that a difference between positive and negative amplitudes of the partly-extracted γ-axis voltage is reduced close to zero.

16. A motor driving control device that performs driving control of a motor, wherein let arbitrary two axes that are at right angles to one another be called an x axis and a y axis, then the motor driving control device comprises:

a voltage feeder that applies to the motor a voltage to pass therethrough a rotation current having a predetermined frequency as a detection current;

an extractor that extracts, from an x-axis component of the voltage applied by the voltage feeder, a partly-extracted x-axis voltage obtained by attenuating at least a direct-current component of the x-axis component, and that extracts, from a y-axis component of the voltage, a partly-extracted y-axis voltage obtained by attenuating at least a direct-current component of the y-axis component; and a detector that performs at least one of detection of a polarity of a magnetic pole of a rotor of the motor and detection of a magnetic-pole position within a range of ±π/2 by a use of the partly-extracted x-axis voltage and the partly-extracted y-axis voltage.

17. The motor driving control device of claim 16, wherein the voltage feeder applies to the motor the voltage with which a difference between positive and negative amplitudes of an x-axis component of the detection current and a difference between positive and negative amplitudes of a y-axis component of the detection current are reduced close to zero.

18. The motor driving control device of claim 16, wherein the detector detects the polarity based on a magnitude of the rotation current that is obtained when the rotation current is controlled so that a difference between positive and negative amplitudes of the partly-extracted x-axis voltage and a difference between positive and negative amplitudes of the partly-extracted y-axis voltage are reduced close to zero.

19. The motor driving control device of claim 16, wherein the detector detects the magnetic-pole position within the range of ±π/2 based on an inclination of a major axis of a current vector locus of the rotation current on x-y axes, the inclination obtained when the rotation current is controlled so that a difference between positive and negative amplitudes of the partly-extracted x-axis voltage and a difference between positive and negative amplitudes of the partly-extracted y-axis voltage are reduced close to zero.

20. The motor driving control device of claim 16, wherein the two axes are rotation axes that rotate as the motor rotates, or fixed axes fixed to a stator of the motor.

* * * * *